United States Patent
Ataei et al.

(10) Patent No.: US 10,989,982 B2
(45) Date of Patent: Apr. 27, 2021

(54) SYSTEM, METHOD AND APPARATUS FOR NON-MECHANICAL OPTICAL AND PHOTONIC BEAM STEERING

(71) Applicant: Exciting Technology, LLC, Dayton, OH (US)

(72) Inventors: Abtin Ataei, Dayton, OH (US); Paul F. McManamon, Dayton, OH (US)

(73) Assignee: Exciting Technology, LLC, Dayton, OH (US)

( * ) Notice: Subject to any disclaimer, the term of this patent is extended or adjusted under 35 U.S.C. 154(b) by 0 days.

(21) Appl. No.: 16/916,731

(22) Filed: Jun. 30, 2020

(65) Prior Publication Data

US 2020/0333679 A1 Oct. 22, 2020

Related U.S. Application Data

(63) Continuation of application No. PCT/US2019/057616, filed on Oct. 23, 2019, which
(Continued)

(51) Int. Cl.
*G02F 1/29* (2006.01)
*G02B 27/09* (2006.01)
*G02B 27/10* (2006.01)

(52) U.S. Cl.
CPC ............ *G02F 1/29* (2013.01); *G02B 27/0955* (2013.01); *G02B 27/0977* (2013.01);
(Continued)

(58) Field of Classification Search
CPC . G02C 7/08; G02C 7/083; G02B 3/14; G02B 3/0081; G02B 3/12; G02B 26/08;
(Continued)

(56) References Cited

U.S. PATENT DOCUMENTS 5,223,971 A * 6/1993 Magel ................ G02B 26/0825
359/29
5,943,159 A * 8/1999 Zhu ........................ G02F 1/292
359/254
(Continued)

FOREIGN PATENT DOCUMENTS

WO 2020086111 A1 4/2020
WO 2020086692 A1 4/2020

OTHER PUBLICATIONS

Hatcher, ""Granularity of beam positions in digital phased arrays"", Proceedings of the IEEE (vol. 56, Issue: 11, Nov. 1968), Nov. 1968, 1795-1800.
(Continued)

*Primary Examiner* — Balram T Parbadia
(74) *Attorney, Agent, or Firm* — GTC Law Group PC & Affiliates

(57) ABSTRACT

An example system includes a bulk steering crystal apparatus having a first lens face and a second concave face. The example bulk steering crystal apparatus further includes a number of steering portions interposed between the first lens face and the second concave face, where each of the steering portions includes a bulk substrate portion including an electro-optical material and a corresponding high-side electrode electrically coupled to the corresponding one of the number of steering portions.

39 Claims, 32 Drawing Sheets

Related U.S. Application Data is a continuation-in-part of application No. PCT/US2019/023915, filed on Mar. 25, 2019.

(60) Provisional application No. 62/868,286, filed on Jun. 28, 2019, provisional application No. 62/749,487, filed on Oct. 23, 2018.

(52) U.S. Cl.
CPC ............ *G02B 27/10* (2013.01); *G02F 1/292* (2013.01); *G02F 2001/294* (2013.01); *G02F 2201/122* (2013.01); *G02F 2203/24* (2013.01)

(58) Field of Classification Search
CPC ... G02B 27/283; A61B 3/04; G02F 2001/294; G02F 1/31; G02F 2203/24; G02F 2202/32; G02F 1/29; G02F 1/292; G02F 1/313

See application file for complete search history.

(56) References Cited

U.S. PATENT DOCUMENTS

| | | | |
|---|---|---|---|
| 5,987,041 | A | 11/1999 | Taniguchi et al. |
| 6,373,620 | B1 | 4/2002 | Wang |
| 6,400,855 | B1 | 6/2002 | Li et al. |
| 6,456,419 | B1 | 9/2002 | Winker et al. |
| 6,556,260 | B1 | 4/2003 | Itou et al. |
| 6,746,618 | B2 | 6/2004 | Li et al. |
| 8,654,292 | B2 | 2/2014 | Kubota et al. |
| 10,386,489 | B2 | 8/2019 | Albelo et al. |
| 10,845,671 | B2 | 11/2020 | McManamon et al. |
| 2004/0067013 | A1* | 4/2004 | Gu .................... G02F 1/292 385/31 |
| 2004/0135965 | A1 | 7/2004 | Holmes |
| 2005/0265403 | A1 | 12/2005 | Anderson et al. |
| 2007/0146910 | A1* | 6/2007 | Duston ............. H01L 31/0543 359/834 |
| 2008/0212007 | A1 | 9/2008 | Meredith |
| 2008/0247031 | A1 | 10/2008 | Wasilousky |
| 2015/0378241 | A1* | 12/2015 | Eldada ............... G01S 7/4817 359/15 |
| 2017/0269453 | A1 | 9/2017 | Galstian et al. |
| 2018/0038576 | A1 | 2/2018 | Mao |
| 2018/0101083 | A1* | 4/2018 | Aflatouni ............. G02F 1/293 |
| 2018/0136538 | A1 | 5/2018 | Khan |
| 2018/0180256 | A1* | 6/2018 | Mao .................... F21V 5/007 |
| 2018/0275394 | A1 | 9/2018 | Yeoh et al. |
| 2019/0129275 | A1 | 5/2019 | McManamon et al. |
| 2020/0326606 | A1 | 10/2020 | Ataei et al. |
| 2020/0333680 | A1 | 10/2020 | Ataei et al. |
| 2020/0333682 | A1 | 10/2020 | Ataei et al. |

OTHER PUBLICATIONS

McManamon, et al., ""Broadband optical phased-array beam steering"", Opt. Eng. 44, 128004, 2005, Dec. 2005, 1-5.

McManamon, et al., ""Nonmechanical beam steering for active and passive sensors"", Downloaded From: https://www.spiedigitallibrary.org/conference-proceedings-of-spie on Aug. 22, 2019 Terms of Use: https://www.spiedigitallibrary.org/terms-of-use, 1993, 1-10.

McManamon, et al., ""Optical Phased Array Technology"", Proc. IEEE 84(2), 268-298,, Feb. 1996, 268-298.

PCT/US19/57616, "International Application Serial No. PCT/US19/57616, International Search Report and Written Opinion dated Jan. 13, 2020", Exciting Technology LLC, 10 pages.

PCT/US2019/023915, "International Application Serial No. PCT/US2019/023915, International Search Report and Written Opinion dated Jul. 18, 2019", Exciting Technology LLC, 15 pages.

PCT/US2019/023915, "International Application Serial No. PCT/US2019/023915, Invitation to Pay Additional Fees and, Where Applicable, Protest Fee dated May 29, 2019", Exciting Technology LLC, 2 pages.

Thalhammer, et al., ""Speeding up liquid crystal SLMs using overdrive with phase change reduction"", Jan. 28, 2013 / vol. 21, No. 2 / Optics Express p. 1779 -1797, Jan. 2013, 1779-1797.

Wang, et al., ""Spatial resolution limitation of liquid crystal spatial light modulator"", Liquid Crystal Conference, Great Lakes Photonics Symposium, Cleveland, OH Jun. 7-11, 2004, Oct. 2004, 45-57.

U.S. Appl. No. 16/999,815, filed Aug. 21, 2020, Pending.
U.S. Appl. No. 16/999,816, filed Aug. 21, 2020, Pending.
U.S. Appl. No. 16/999,756, filed Aug. 21, 2020, Pending.

\* cited by examiner

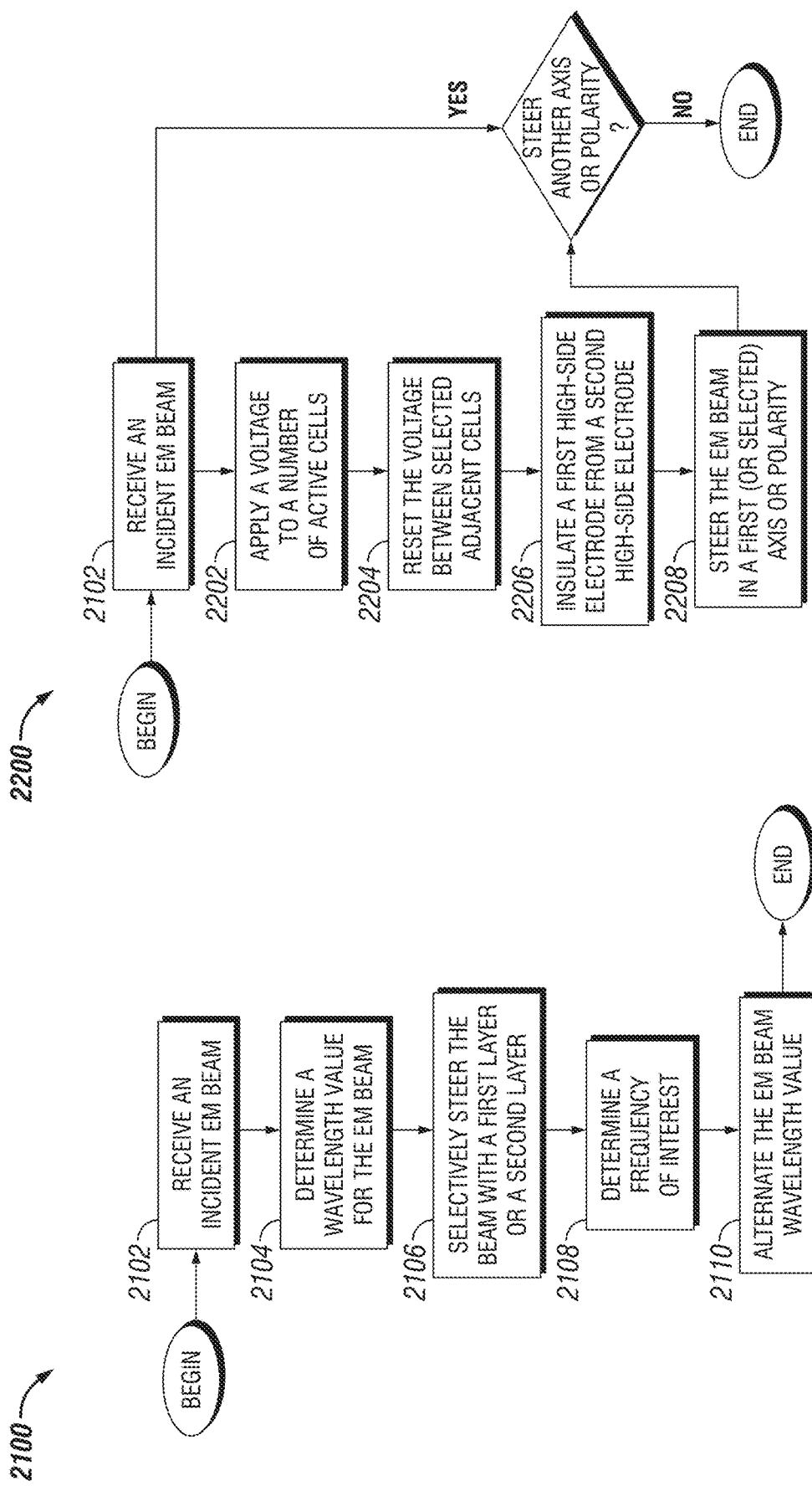

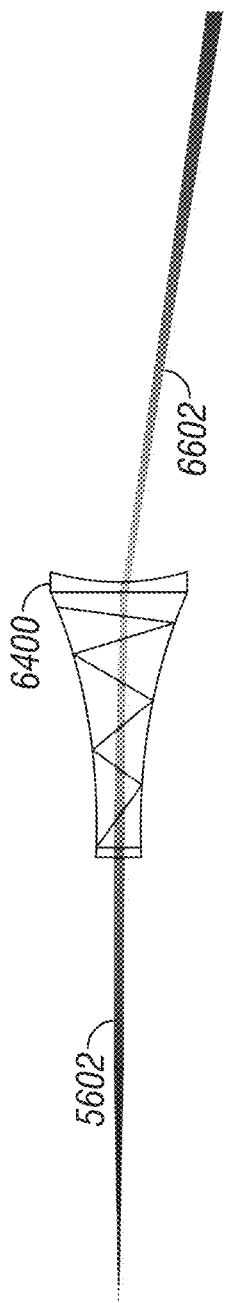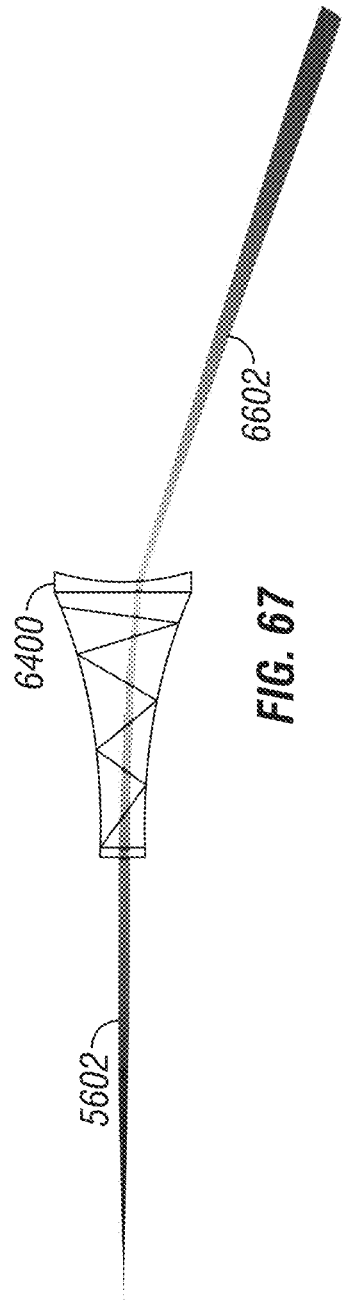

SYSTEM, METHOD AND APPARATUS FOR NON-MECHANICAL OPTICAL AND PHOTONIC BEAM STEERING

CROSS-REFERENCE TO RELATED APPLICATIONS

This application is a continuation of International Application No. PCT/US19/57616, filed Oct. 23, 2019, entitled "SYSTEM, METHOD AND APPARATUS FOR NON-MECHANICAL OPTICAL AND PHOTONIC BEAM STEERING (EXCT-0004-WO).

PCT/US19/57616, filed Oct. 23, 2019 (EXCT-0004-WO) claims priority to U.S. Provisional Patent Application No. 62/868,286, filed on Jun. 28, 2019, entitled "SYSTEM, METHOD AND APPARATUS FOR NON-MECHANICAL OPTICAL AND PHOTONIC BEAM STEERING" (EXCT-0005-P01). PCT/US19/57616, filed Oct. 23, 2019 (EXCT-0004-WO) also claims priority to U.S. Provisional Patent Application No. 62/749,487, filed on Oct. 23, 2018, entitled "SYSTEM, METHOD AND APPARATUS FOR NON-MECHANICAL OPTICAL AND PHOTONIC BEAM STEERING" (EXCT-0002-P01). PCT/US19/57616, filed Oct. 23, 2019 (EXCT-0004-WO) further claims priority to, and is a continuation-in-part of, PCT application PCT/US19/23915, filed on Mar. 25, 2019, and entitled "SYSTEM, METHOD AND APPARATUS FOR NON-MECHANICAL OPTICAL AND PHOTONIC BEAM STEERING" (EXCT-0003-WO).

Each of the foregoing applications is incorporated herein by reference in the entirety for all purposes.

BACKGROUND

Previously known beam steering systems and methods suffer from a number of drawbacks. Mechanically steered systems have a number of moving parts, manufacturing cost and complexity, and have limitations in the response time of the system to effect a beam steering change. Additionally, mechanical systems suffer from reliability issues related to mechanical failures. Previously known beam steering systems without mechanical steering additionally suffer from a number of drawbacks, including limited steering capability, limited steering efficiency, and high voltage differences occurring within the devices.

Operations of a typical previously known beam steering system are described following. a previously known beam steering system includes a film of optically active material positioned between a ground electrode and discrete electrodes with voltages applied. The voltages start from zero, increase to a designed voltage over a number of electrodes, and then reset to zero. The discrete electrodes are separated by a spacing distance, which may be the same throughout the aperture (i.e., across the entire film). The designed voltage will be V_lambda, or the voltage sufficient to provide one optical path difference (OPD) of one wavelength, and will depend upon the properties of the film and the incident wavelength being steered. The voltages applied between adjacent discrete electrodes will be progressive, depending upon how many discrete electrodes are utilized to progress from zero voltage to the V_lambda, except between reset electrodes. At the reset electrodes, the voltage difference would be approximately V_lambda—with a V_lambda voltage on a last discrete electrode of one progression, and approximately zero voltage on a first discrete electrode of the next progression, with a separation of $2\pi n$ before and after reset. The applied electric field is not confined between each discrete electrode and the ground electrode, and further the applied electric field is not parallel outside of the spacing between each discrete electrode and the ground electrode. Accordingly, previously known beam steering systems experience an edge effect and a fringing field causing large steering efficiency losses at the reset position, where the voltage cannot reset sharply to 0V. The distance required to reset to zero is the flyback distance, which can be large in previously known beam steering systems, and can extend across several electrode widths.

Accordingly, improvements in beam steering systems, including systems with limited or no mechanical moving parts, are desirable.

SUMMARY OF THE DISCLOSURE

An example system includes a bulk steering crystal apparatus having a first lens face and a second concave face, and a number of steering portions interposed between the first lens face and the second concave face, where each of the number of steering portions includes a bulk substrate portion including an electro-optical material, and a corresponding high-side electrode electrically coupled to the corresponding one of the number of steering portions.

Certain further aspects of the example system are described following, any one or more of which may be present in certain embodiments. An example system includes where each of the corresponding high-side electrodes are positioned on a side of the bulk steering crystal, and/or a low-side electrode positioned on an opposing side of the bulk steering crystal to at least one of the corresponding high-side electrodes. An example system includes where each of the corresponding high-side electrodes are positioned on a same side of the bulk steering crystal; a low-side electrode positioned on an opposing side of the bulk steering crystal; where the low-side electrode is positioned as the low-side electrode for a number of the steering portions; and/or where the low-side electrode is positioned as the low-side electrode for all of the steering portions.

An example system further includes a bulk steering circuit structured to interpret a steering command value, and to provide voltage commands to each of the corresponding high-side electrodes in response to the steering command value; a low-side electrode positioned on an opposing side of the bulk steering crystal to at least one of the corresponding high-side electrodes, and where the bulk steering circuit is further structured to provide a low-side voltage command to the low-side electrode in response to the steering command value; where the low-side voltage command includes a negative voltage value, and where a corresponding high-side voltage command includes a positive voltage value; and/or where the low-side voltage command includes a same magnitude as the corresponding high-side voltage command.

An example system further includes a first portion of the number of steering portions configured to steer an incident electromagnetic (EM) beam in a first axis, and a second portion of the number of steering portions configured to steer the incident EM beam in a second axis; where the bulk substrate portions corresponding to the first portion of the number of steering portions are oriented in a first direction, and wherein the bulk substrate portions corresponding to the second portion of the number of steering portions are oriented in a second direction; where the bulk substrate portions corresponding to the first portion of the number of steering portions are traversed by the incident EM beam before the second portion of the number of steering portions;

an anti-reflective coating optically interposed between an interface of at least one of the bulk substrate portions corresponding to the first portion of the number of steering portions and at least one of the bulk substrate portions corresponding to the second portion of the number of steering portions; where the bulk substrate portions corresponding to the first portion of the number of steering portions are traversed by the incident EM beam before the second portion of the number of steering portions; at least one of an anti-reflective coating or a half-wave plate optically interposed between an interface of at least one of the bulk substrate portions corresponding to the first portion of the number of steering portions and at least one of the bulk substrate portions corresponding to the second portion of the number of steering portions; and/or where the concave face includes at least one shape such as a spherical cap, an ellipsoid cap, a hyperboloid cap, and/or an elliptic paraboloid cap. An example system includes the concave face having at least one shape such as a circular cross-section; a parabolic cross-section; a hyperbolic cross-section; and/or rotations of any one of the foregoing.

An example system further includes a varifocal lens (VFL) positioned at the first lens face, and a VFL circuit structured to provide a voltage gradient command in response to the steering command value. In certain further embodiments, the example system includes where the VFL circuit is further structured to determine a beam divergence value in response to the steering command value, and to provide the voltage gradient command further in response to the steering command value; where the VFL circuit is further structured to determine a VFL temperature value corresponding to the VFL, and to provide the voltage gradient command further in response to the VFL temperature value; where the bulk steering circuit is further structured to determine a bulk crystal temperature value corresponding to at least one of the bulk steering portions, and to provide the voltage commands to each of the corresponding high-side electrodes further in response to the bulk crystal temperature value; and/or where a low-side electrode is positioned on an opposing side of the bulk steering crystal corresponding to the at least one of the bulk steering portions, and where the bulk steering circuit is further structured to provide a low-side voltage command to the low-side electrode in response to the steering command value and the bulk crystal temperature value.

An example system includes where the bulk steering portions include an increasing width in at least a steered axis, and/or where the increasing width is monotonically increasing between the first lens face and the second concave face. An example system includes the VFL including a VFL substrate including an electro-optical material, a transparent low-side electrode positioned on a first side of the VFL substrate, and a high-side electrode positioned in electrical proximity to a second side of the VFL substrate. In certain further embodiments, the example VFL further includes where the high-side electrode includes a closed loop electrode positioned on the second side of the VFL substrate; where the closed loop electrode is a symmetrically closed loop; where the closed loop electrode is at least one of a circular electrode or an elliptical electrode; where the high-side electrode includes a first high-side electrode positioned along a first edge of a viewing area of the VFL substrate, and a second high-side electrode positioned along a second edge of the viewing area of the VFL substrate; where the first high-side electrode and the second high-side electrode are positioned outside an optical path of the viewing area of the VFL substrate; where the first high-side electrode and the second high-side electrode are positioned within an optical path of the viewing area of the VFL substrate; where the first high-side electrode and the second high-side electrode are transparent; where the VFL circuit is further structured to provide the voltage gradient command by commanding a first voltage value to the first high-side electrode, and by commanding a second voltage value to the second high-side electrode; where the first voltage value and the second voltage value have an equal magnitude, and an opposite sign; where the VFL circuit is further structured to provide the voltage gradient by commanding a third voltage value to the transparent low-side electrode; and/or where the VFL substrate includes a solid material. An example system includes one or more bulk substrate portions including a solid material.

An example apparatus includes a thin beam steering device, including a convex lens portion optically coupled to the thin beam steering device on a first side of the thin beam steering device, and a concave lens portion optically coupled to the thin beam steering device on a second side of the thin beam steering device. Certain further aspects of the example apparatus are described following, any one or more of which may be present in certain embodiments.

An example apparatus includes where the thin beam steering device includes at least one configuration such as: a castle scanner, a castle scanner pro, a chess scanner, and a chess scanner pro. An example apparatus includes where the thin beam steering device utilizes a half-wave voltage profile; where the apparatus is capable to steer an incident electromagnetic beam to a range of at least +/−20 degrees in one axis; where the apparatus is capable to steer an incident electromagnetic beam to a range of at least +/−30 degrees in one axis; where the convex lens portion and the concave lens portion each are formed from separate substrates; where the separate substrates are formed utilizing manufacturing techniques having similar tolerance values; and/or where the convex lens portion and the concave lens portion include a shared substrate.

Another example system includes a beam steering crystal including an electro-optical material, a first lens positioned in optical communication with the beam steering crystal, a second lens positioned in optical communication with the first lens, where the second lens is optically interposed between the first lens and the beam steering crystal, and a beam steering circuit structured to adjust a voltage drop across the beam steering crystal, and thereby steer an electro-magnetic (EM) beam incident on the beam steering crystal. Certain further aspects of the example system are described following, any one or more of which may be present in certain embodiments.

The example system includes where at least one of the first lens or the second lens include a varifocal lens (VFL), and/or where the VFL includes an electro-optical material electrically coupled to a high-side electrode and a low-side electrode, and wherein the beam steering circuit is further structured to adjust a focal length of the at least one of the first lens or the second lens.

Another example apparatus includes a bulk substrate including an electro-optical material, a transparent low-side electrode positioned on a first side of the bulk substrate, a high-side electrode positioned in electrical proximity to a second side of the bulk substrate, and a varifocal lens (VFL) circuit structured to adjust a voltage gradient across the bulk substrate, thereby operating the bulk substrate as a VFL. Certain further aspects of the example apparatus are described following, any one or more of which may be present in certain embodiments.

An example apparatus further includes where the high-side electrode includes a closed loop electrode positioned on the second side of the bulk substrate; where the closed loop electrode includes a symmetrically closed loop; where the closed loop electrode includes a circular electrode; where the high-side electrode includes a first high-side electrode positioned along a first edge of a viewing area of the bulk substrate, and a second high-side electrode positioned along a second edge of the viewing area of the bulk substrate; where the first high-side electrode and the second high-side electrode are positioned outside an optical path of the viewing area of the bulk substrate; where the first high-side electrode and the second high-side electrode are positioned within an optical path of the viewing area of the bulk substrate; where the first high-side electrode and the second high-side electrode are transparent; where the VFL circuit is further structured to adjust the voltage gradient by commanding a first voltage value to the first high-side electrode, and by commanding a second voltage value to the second high-side electrode; where the first voltage value and the second voltage value have an equal magnitude, and an opposite sign; where the VFL circuit is further structured to adjust the voltage gradient by commanding a third voltage value to the transparent low-side electrode; and/or where the bulk substrate includes a solid material.

Another example system includes a pair of opposing varifocal lenses (VFLs) having a spacing distance therebetween, a VFL circuit structured to steer an electromagnetic (EM) beam incident on a first one of the pair of opposing VFLs, and where the steering operation of the VFL circuit includes the VFL circuit further structured to control a first focal length corresponding to the first one of the pair of opposing VFLs and a second focal length corresponding to a second one of the pair of opposing VFLs. Certain further aspects of the example system are described following, any one or more of which may be present in certain embodiments.

An example system further includes a pair of opposing gap extension lenses, where the pair of opposing gap extension lenses are optically interposed between the pair of opposing VFLs; a first gap between a first one of the pair of opposing gap extension lenses and the first one of the pair of opposing VFLs, a second gap between the first one of the pair of opposing gap extension lenses and a second one of the pair of opposing gap extension lenses, and a third gap between the second one of the pair of opposing gap extension lenses and the second one of the pair of opposing VFLs, where the third gap is a largest member of the first gap, the second gap, and the third gap; where at least one of the pair of opposing gap extension lenses includes a VFL; where the pair of opposing gap extension lenses are configured such that the EM beam incident on the first one of the pair of opposing VFLs is directed to the second one of the pair of opposing VFLs; where the pair of opposing gap extension lenses are further configured such that the EM beam incident on the first one of the pair of opposing VFLs is directed to the second one of the pair of opposing VFLs through a selected range of steering angles; where the pair of opposing gap extension lenses are further configured such that the EM beam incident on the first one of the pair of opposing VFLs is directed to the second one of the pair of opposing VFLs through a selected range of incident angles; where the VFL circuit is further structured to adjust at least one gap extension focal length corresponding to at least one of the pair of opposing gap extension VFLs such that the EM beam incident on the first one of the pair of opposing VFLs is directed to the second one of the pair of opposing VFLs; where the VFL circuit is further structured to adjust at least one gap extension focal length corresponding to at least one of the pair of opposing gap extension VFLs such that the EM beam incident on the first one of the pair of opposing VFLs is directed to the second one of the pair of opposing VFLs through a selected range of steering angles; and/or where the VFL circuit is further structured to adjust at least one gap extension focal length corresponding to at least one of the pair of opposing gap extension VFLs such that the EM beam incident on the first one of the pair of opposing VFLs is directed to the second one of the pair of opposing VFLs through a selected range of incident angles.

An example procedure for steering an incident electromagnetic (EM) beam includes an operation to apply a selected convergence amount to an incident EM beam at a lens face of a bulk steering crystal, an operation to progressively steer the incident EM beam through a number of steering portions of the bulk steering crystal, and an operation to emit the incident EM beam from a concave face of the bulk steering crystal. Certain further aspects of the example procedure are described following, any one or more of which may be present in certain embodiments.

An example procedure further includes compensating the selected convergence amount to a divergence value of the EM beam; operating a varifocal lens (VFL) to apply the selected convergence amount; compensating an applied voltage to the VFL in response to a temperature of the VFL; where operating the VFL includes applying a voltage gradient to a VFL substrate; where applying the voltage gradient to the VFL substrate includes applying a quadratic index gradient across the VFL substrate; where applying the voltage gradient to the VFL substrate further includes applying a positive voltage to one side of the VFL substrate, and a negative voltage to the other side of the VFL substrate; progressively steering the incident EM beam through the number of steering portions by applying a selected voltage differential across each of the number of steering portions; compensating the selected voltage differentials in response to at least one of a temperature value for the bulk crystal or a temperature value for one of the number of steering portions; where applying the selected convergence amount includes operating a VFL substrate in a paraelectric region; where the progressively steering includes operating at least one of the number of steering portions in a paraelectric region; and/or where the progressively steering comprises operating at least one of the number of steering portions in a ferroelectric region.

BRIEF DESCRIPTION OF THE FIGURES

FIG. 21 is a schematic flow diagram of a procedure for steering incident EM beams having distinct wavelength values.

FIG. 22 is a schematic flow diagram of a procedure for steering an incident EM beam in more than one axis or polarity.

FIG. 66 is a depiction of illustrative performance of a beam steering device utilizing a concave emission surface and a varifocal lens.

FIG. 67 is another depiction of illustrative performance of the beam steering device utilizing a concave emission surface and a varifocal lens.

DETAILED DESCRIPTION

Figure 1:
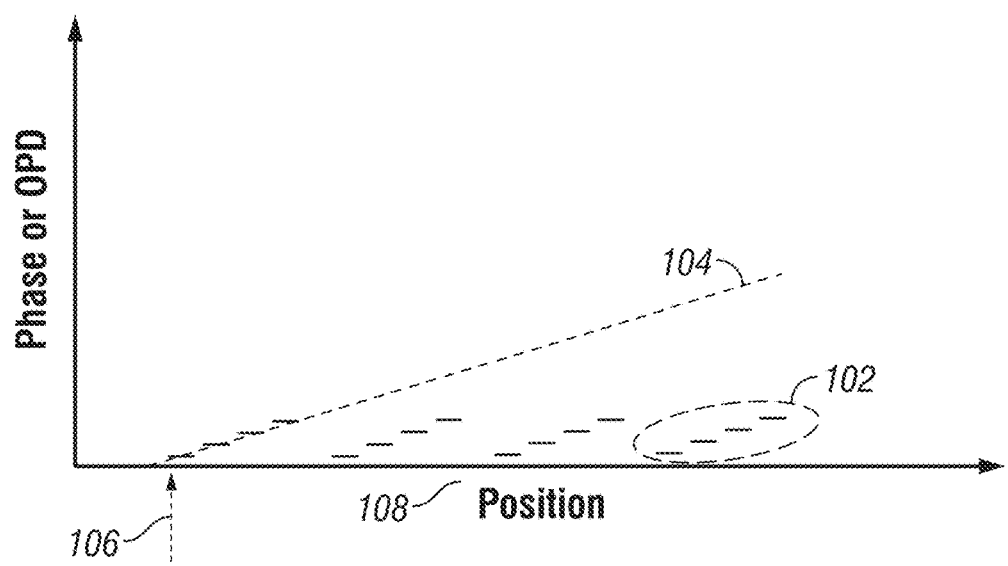
FIG. 1 shows a graph depicting modulo $2\pi$ phase shifting to create beam steering.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

This disclosure relates to the field of optical beam steering and in certain embodiments includes modulo $2\pi n$ and bulk active layer beam steering approaches, with a reduced number of moving parts, and/or no moving parts. More particularly, this disclosure teaches a unique, new, diffraction-based beam steering device made of electro optical crystals, liquid crystals, quantum dot materials, or any other material whose index of refraction can be dynamically changed. Example devices will have no moving parts. In certain embodiments, molecules in the electro-active material move, such as in a nematic liquid crystal.

Steering an optical beam without moving parts requires the ability to change the phase front exiting an optical device compared to the phase front entering a device. The direction a beam is travelling can be perpendicular to the phase front of the beam. Traditionally, the phase front of an optical beam, and the direction the beam is travelling, is changed by moving a mirror, or a transparent optical element with an index of refraction different from air. Two fundamental non-mechanical methods of creating a phase difference across an optical beam resulting in a steered optical beam are described herein. One method is to create an optical path delay ("OPD"), which is equivalent to a phase delay for a certain wavelength, and the other is to directly create a phase delay. An example disclosure of the direct phase approach is set forth in the paper by S. Pancharatnam, in Proceedings of the Indian Academy of Sciences, vol XLI, no. 4, sec. A, 137, 1955. Some of the background for this disclosure is discussed in "A review of phased array steering for narrowband electro-optical systems", by Paul F McManamon, Philip J Bos, Michael J Escuti, Jason Heikenfeld, Steve Serati, Huikai Xie, Edward A Watson. The Pancharatnam paper, which may be referred to as "Reference 1" hereinafter, discusses these technologies, and is incorporated herein by reference in its entirety for all purposes.

Another example method to steer light without mechanical motion includes writing a prism. Certain challenges with this approach include the difficulty in creating an OPD as large as would be required to write a full prism of appreciable width. For example, a 10-cm wide aperture steering to 30 degrees would require >5 cm OPD on the thick side of the prism. However, for a narrow wavelength, it is advantageous that light is a sine wave.

With a sine wave it does not matter if there is a 0, $2\pi$, $4\pi$ or $2n\pi$ phase shift. The unfolded phase profile is the same. Therefore, as one moves across the width of the prism, an OPD can be created that subtracts $2\pi$ of phase, or one wavelength, every time the phase reaches $2\pi$, resulting in a sawtooth OPD and a sawtooth phase profile. When the phase profile is unfolded, it is the same for the design wavelength as the profile resulting from light travelling through a prism. Unfolding the phase front means adding the phase, or OPD, resets back into the prism. Resets of any multiple of $2\pi$, or any multiple of one wavelength, can be used. If resets are created perfectly, the unfolded phase at the design wavelength looks like the phase profile that would result from propagation through a prism and steers light in the same manner as a phase shift resulting from light travelling through a prism.

A modulo $2\pi$ phase profile should be interpreted to mean a $2\pi n$ phase profile, with resets of any multiple of one wavelength of OPD. Discrete increment modulo $2\pi$ beam steering is shown in FIG. 1. In the example shown in FIG. 1, discrete steps are used to build up to one wavelength (or a multiple of wavelengths, $2\pi n$), or $2\pi$ phase shift. For example, discrete steps of 0, 30, 60, 90, 120, 150, 180, 210, 240, 270, 300, and 330 degrees can be used, and then reset (e.g. at position 108) back to 0 degrees instead of going to 360 degrees, because 0 degrees and 360 degrees are the same in a sine wave. This is what would result from individual electrodes imposing an index change on a material, ignoring any fringing field effects. The benefit of using a modulo $2\pi$ phase profile is that the required OPD can be small, on the order of a single wavelength (or a small multiple of the wavelength). In the example of FIG. 1, a number of phase delay progression stages (e.g., group 102) are utilized to build up the $2\pi n$ phase shift, and a reset 108 is performed between each phase delay progression stage 102. The unfolded phase profile 104 is depicted, which is the equivalent phase shift of an incoming undisturbed phase front 106 (defined by the EM beam, and co-located with the position axis). It will be understood that any number of phase delay progression stages 102 may be utilized, each having any number of discrete steps to build them. Additionally, phase delay progression stages 102 may not be discrete, but may be continuous or partially continuous as described throughout the present disclosure.

Additionally, each phase delay progression stage 102 may be distinct from one or more of the other phase delay progression stages 102, for example where a first stage 102 provides a $2\pi$ phase shift, and where a second stage 102 provides a $4\pi$ phase shift (e.g., utilizing twice the distance along the position axis, thereby providing the designed unfolded phase profile 104). Additionally or alternatively, phase delay progression stages 102 need not be in the same plane—for example where the incident EM beam encounters one of the phase delay progression stages 102 on a first plane, and a second one of the phase delay progression stages 102 on a second plane (e.g., reference FIG. 12).

For Modulo $2\pi n$ beam steering the maximum required OPD (i.e., the minimum thickness of the electro-optic (EO) material at the maximum phase shift location) is approximately equal to the wavelength of the light being steered. In certain embodiments, a thicker EO material may be utilized, such as a multiple of the wavelength of light being steered. The modulo $2\pi$ steering approach makes the beam steerer subject to wavelength dependence, or dispersion. The wavelength dependence results in varying wavelengths steered to varying angles. This wavelength dependence is discussed in: P. F. McManamon, E. A. Watson, T. A. Dorschner, L. J. Barnes, "Nonmechanical beam steering for active and passive sensors," SPIE 1417, 110, 1991, p 194. The McManamon paper "Nonmechanical beam steering . . . ", which may be referred to as "Reference 2" hereinafter, is incorporated herein by reference in its entirety for all purposes. The wavelength dependence is further discussed in: P. F. McManamon, J. Shi, and P. Bos, "Broadband optical phased-array beam steering," Opt. Eng. 44, 128004, 2005. The McManamon paper "Broadband optical phased-array beam steering", which may be referred to as "Reference 3" hereinafter, is incorporated herein by reference in its entirety for all purposes.

Wherever a wavelength is recited (e.g., of light, EM radiation, and/or an optical or photonic beam) and/or where $\lambda$ is recited, throughout the present disclosure, it will be understood that the wavelength (or $\lambda$) may be a nominal wavelength, a particular wavelength, and/or an effective wavelength. For example, a nominal wavelength may be the wavelength of a target or considered EM radiation frequency in a vacuum, in air, or under selected conditions. In another example, a particular wavelength may be a wavelength of a target or considered EM radiation frequency at specific conditions, such as through an EO active material at a selected voltage value (e.g., thereby at a selected refractive index for that frequency of EM radiation). In another example, an effective wavelength may be the in-situ wavelength of the EM radiation frequency in the EO active material, an average of certain values (e.g., an average of the high- and low-phase delayed values in a given active cell, etc.), and/or one or more active cells may be configured for distinct $\lambda$ values, even for a particular frequency of EM radiation (e.g., depending upon the current, expected, or designed optical conditions for the one or more active cells). Accordingly, $\lambda$ should be understood throughout the present disclosure to indicate any of these usages. One of skill in the art, having the benefit of the present disclosure and information ordinarily available when contemplating a particular system and/or an aspect of the system, can readily determine which usage of $\lambda$ is relevant for the particular system and/or the aspect of the system. Certain considerations for determining which one or more usage of $\lambda$ applies to a particular system or aspect of the system include, without limitation: the optical characteristics of the EO active material(s) of the system; the phase delay progression planned for the system; the voltage profile and/or optical characteristic profile of the system; the efficiency considerations for the system including the cost of power, the risks related to side lobes, and/or the costs associated with undesired thermal generation in relevant parts of the system; the duty cycle of operating conditions (e.g., power throughput, steering directions and magnitudes, and/or on-time); and/or the steering capability (e.g., degree of steering, number of axes of steering, and/or number of polarities of steering) to be supported by the system.

An important parameter for beam steering is steering efficiency. As used herein, the term steering efficiency should be understood broadly. Various options and configurations described throughout the present disclosure affect different aspects of the steering efficiency, and accordingly it will be understood by one of skill in the art, having the benefit of the present disclosure, how to determine which aspects of the present disclosure are important to varying embodiments. Without limitation, steering efficiency can be understood to include energy transport considerations, cost considerations, risk considerations, and/or capability considerations. Without limitation, steering efficiency can be understood to be any one or more of the following: the amount of incident energy of the EM on the beam steering device that reaches the targeted location; the similarity of the phase profile of the steered EM beam on reach the target relative to the incident EM beam and/or relative to an idealized prism; the amount of energy of the incident EM beam that does not reach the target location (e.g., side lobes and/or heating losses); the amount of energy of the incident EM beam that creates an undesirable effect (e.g., a concentrated side lobe); the amount of energy of the incident EM beam that dissipates as heat and/or where the heat is dissipated; the number of electro-optical (EO) layers utilized to achieve a given steering capability; the cost of manufacture (e.g., materials, fabrication, testing, etc.) for a particular design; the opportunity cost of a lower system capability (e.g., steering amount, wavelengths supported, profile consistency, etc.); the capital and/or operating cost of a higher system capability; and/or the risk cost of a particular steering device (e.g., due to side lobes and/or the particular arrangements of the side lobes, wavelength selections which may have varying risks, and/or system reliability or power consumption which may put certain applications at risk).

Certain considerations to determine which steering efficiency factors are important for a particular application include, without limitation: the utilization environment for the beam steering device including robustness to side lobes; EM wavelength values to be utilized; capital cost sensitivity; operating cost sensitivity; costs and availability of power for the beam steering device in use; costs and availability of computing power for the beam steering device in use; costs, availability, and capability for manufacturing including materials and fabrication; the critical mission aspects for a particular application such as targeting capability, response time, and similarity of phase profile requirements; and/or the sensitivity of parts of the beam steering device and/or the utilization environment to heating and/or side lobe energy from beam steering operations. One of skill in the art, having the benefit of the disclosure herein and information ordinarily available when contemplating a particular system, can readily determine which factors of steering efficiency determinations are important to a particular embodiment, and further which features of systems and/or techniques described throughout the present disclosure relate to those factors of steering efficiency. The foregoing sets forth an example of certain considerations for certain systems, and any other considerations set forth throughout the present disclosure may also be utilized in configuring a particular embodiment of the present disclosure.

The terms optical light, optical, EM radiation, EM beam, light, photonic beam, and other similar terms as used throughout the present disclosure should be understood broadly. The present disclosure contemplates steering EM radiation of any type depending upon the application and the available materials. In certain embodiments, EM radiation as utilized herein contemplates optical light, or light that is within the visible spectrum. In certain embodiments, optical light additionally includes at least a portion of the ultra-violet spectrum, and/or at least a portion of the infra-red spectrum. In certain embodiments, optical light and/or EM radiation includes one or more contemplated wavelengths and/or portions of the EM spectrum, and does not include portions of the EM spectrum that may otherwise be considered "optical light" outside the context of the particular system. It will be understood that various electro-magnetic wavelengths of interest are contemplated herein, including wavelengths that are not visible, and/or are not typically described as optical wavelengths or "light." Without limitation, the terms optical and light, as used herein, include at least infrared, visible, and ultra-violet frequencies, and in certain embodiments may include frequencies of the electromagnetic spectrum that are outside these ranges. One of skill in the art, having the benefit of the present disclosure and information ordinarily available when contemplating a particular system, can readily determine the EM radiation, optical light, light, and/or EM beam parameters for the system. Certain considerations when determining the EM radiation, optical light, light, and/or EM beam parameters for a system include, without limitation: the available materials for fabricating EO layers, substrates, reflective materials, and/or electrodes; the transmissivity and/or optical change characteristics for materials at frequencies of interest; the EM frequency requirements for an application (e.g., eye safety, resolution requirements, and/or available EM sources); and/or the available thickness of materials as fabricated (e.g., limiting the steerable wavelengths of EM radiation such as at longer wavelengths).

Figure 2:
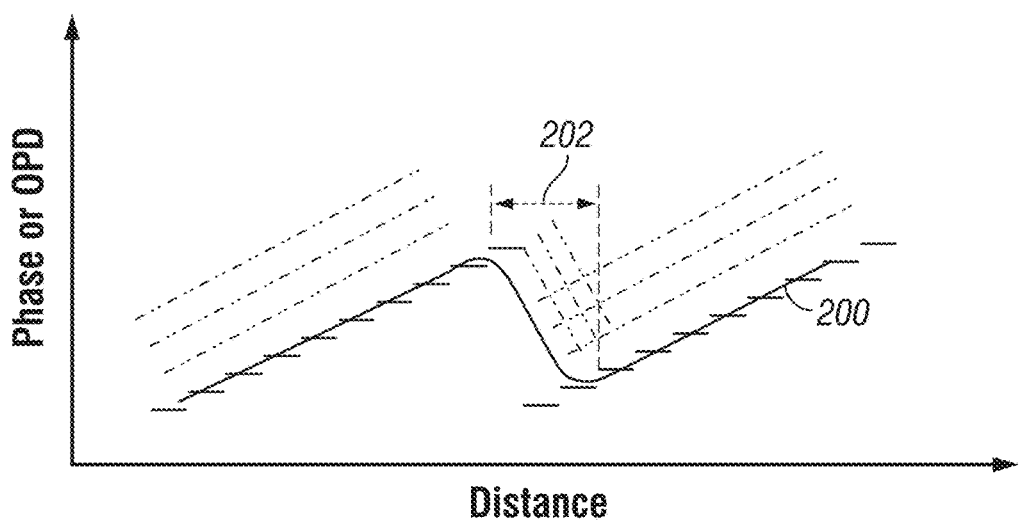
FIG. 2 shows a graph depicting the effect of fringing fields on phase profile associated for a previously known electro optical thin film scanner.

One issue with any modulo $2\pi$ beam steering system that affects the steering efficiency is "fly-back," which refers to the spatial distance required to reduce the OPD by a $2\pi n$ wavelength (e.g., a "reset", such as from approximately a multiple of one wavelength, or $2\pi n$ phase shift, to near zero). Reducing the OPD from that which results in a $2\pi n$ phase shift to zero means from approximately $2\pi n$ to approximately zero. There are various embodiments and techniques for specifying the exact OPD level from which a reset subtracts OPD. While each of these techniques reduce the OPD by $2\pi n$ in phase for the design wavelength, they do not all start at exactly an OPD that is equivalent to a $2\pi n$ phase shift, but can start at somewhat higher or lower values that are close to $2\pi n$, and can end at values that are somewhat higher or lower than zero. For example, referencing FIG. 2, a phase shift curve 200 depicts an example reset portion 202. An ideal reset 202 would show the phase shift curve 200 dropping vertically from a phase shift profile that followed an ideal prism profile to a value shifted by $2\pi n$ to the selected reset state (which may be a non-zero voltage value), and the progressing again at an ideal prism angle in the next stage. However, previously known modulo $2\pi$ beam steering system have a significant fly-back effect as depicted in FIG. 2, where the pre-reset profile falls off of the ideal prism profile before reaching the reset portion, and does not fall all the way to the designed reset value before returning to the prism curve. The fly-back effect causes a loss of steering efficiency, where a portion of the incident EM beam is not steered to the desired location, and further can cause heating, side lobes, or other undesired effects as the improperly steered energy of the EM beam is dissipated in another portion of the system or the environment.

The example of FIG. 1 depicts an idealized modulo $2\pi n$ system having no fly-back effect, while the example of FIG. 2 depicts an example previously known modulo $2\pi n$ system having a nominal fly-back effect. Various features throughout the present disclosure have been found to greatly reduce the fly-back effect, including without limitation the utilization of insulators, vertical spatial changes between adjacent phase delay progression stages (e.g., reference FIG. 12 and FIG. 18), enhanced insulation at reset positions, and/or control or modulation of electrodes. In certain embodiments, systems and/or methods for performing modulo $2\pi n$ beam steering described throughout the present disclosure can approximate the unfolded phase profile 104 depicted in FIG. 1.

Figure 6:
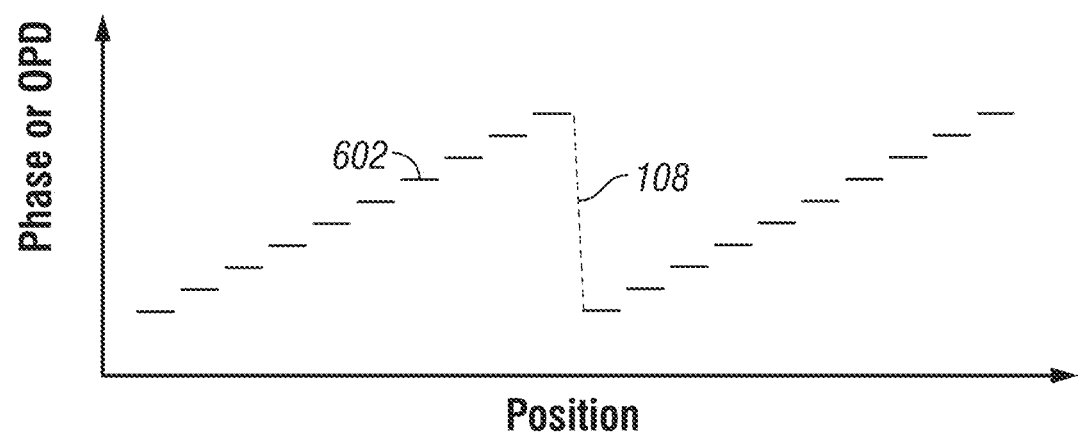
FIG. 6 is a graph depicting step increments of two phase delay progressions with a reset therebetween, using conductive electrodes.

FIG. 6 is an example depiction of a realistic phase profile 602 which, according to modeling and calculations, it is believed to be achievable using various aspects of the present disclosure. The example of FIG. 6 utilizes conductive electrodes. The representation of FIG. 6 is non-limiting: certain systems may have a less ideal phase profile 602 than that depicted in FIG. 6 and nevertheless realize certain benefits of the present disclosure, and certain systems may have a more ideal phase profile 602 than that depicted in FIG. 6, such as by combining aspects of the present disclosure, utilizing higher capability materials, more elaborate configurations of electrodes, controllable electrodes, tilted or contoured electrodes, and/or by increasing the number of steps in one or more of the phase delay progressions.

Figure 8:
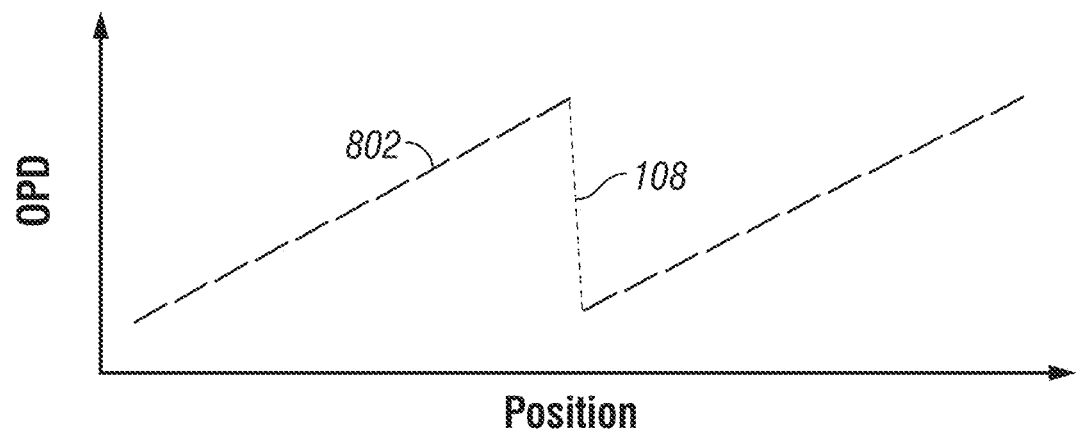
FIG. 8 is a graph depicting step increments of two phase delay progressions with a reset therebetween, using resistive or tilted electrodes.

FIG. 8 is an example depiction of a realistic phase profile 802 which, according to modeling and calculations, it is believed to be achievable using various aspects of the present disclosure. The example of FIG. 8 utilizes resistive electrodes. The representation of FIG. 8 is non-limiting: certain systems may have a less ideal phase profile 802 than that depicted in FIG. 8 and nevertheless realize certain benefits of the present disclosure, and certain systems may have a more ideal phase profile 802 than that depicted in FIG. 8, such as by combining aspects of the present disclosure, utilizing higher capability materials, more elaborate configurations of electrodes, controllable electrodes, tilted or contoured electrodes, and/or by increasing the number of steps in one or more of the phase delay progressions.

Disclosed herein are example modulo $2\pi n$ active material steering approaches, where a modulo $2\pi n$ active material will be from sub-micron level thickness to many tens, or even hundreds, of microns thick. Certain example modulo $2\pi n$ active material beam steering approaches taught use resets to limit the thickness of the active layer. An example embodiment utilizes an active single layer with thin insulators between electrodes going through the active material. Certain features described herein enhance efficiency throughput, such as, use of an insulator, an optically active material, and/or a substrate transparent to the incoming light and/or having respective refractive indexes in a configured manner, such as refractive indexes that are similar. The insulators between the electrodes may, or may not, be all the way through the active layer. In certain embodiments, insulators may not be transparent to the incoming light.

The term transparent, as used herein, should be understood broadly, and includes at least materials that allow transmission of electromagnetic radiation of selected wavelengths: to a selected degree, virtually completely, above a threshold level, and/or sufficiently to perform the underlying task. The amount of transmission that is transparent, for example sufficient to perform the underlying task, will be understood to one of skill in the art having the benefit of the present disclosure. Without limitation, certain considerations to determine an amount of transmission that is transparent include: the cost and availability of manufacturing materials; the cost of fabricating a given device; the utilization of the device including required resolutions, detection thresholds, and the like; the criticality of the device relative to a system or application of the device; heat dissipation constraints and/or considerations of the device; and/or the availability of processing resources to enhance the capability of the device in the presence of reduced transmission of EM radiation through the transparent components of the device. A transmission level that is transparent for one embodiment in the full context of a particular device or system may be considered not transparent in the full context of another device or system—for example a same insulator component that is transparent for one device may be reflective or not transparent in the context of another device.

In certain embodiments, materials are described throughout the present disclosure as having a close optical value or characteristic (and/or a similar optical value or characteristic), such as birefringence and/or an index of refraction. Optical values that are close depend upon the specific system. In certain embodiments, optical values that provide for sufficient transmission of light therethrough, and that do not disturb the EM beam such that a target steering capability and/or steering efficiency can be met are within the scope of close optical values as understood herein. In certain embodiments, EO active materials have varying optical characteristics, while insulators, substrate, and/or electrode materials have non-varying (or not intentionally varied) optical characteristics, and thereby a static optical characteristic is being matched ("close") with a varying optical characteristic. In certain embodiments, the static optical value is selected to be a value between the ranges of the varied optical characteristic. In certain embodiments, the static optical value is selected to be a value near a more important portion of the varying optical characteristic range, for example close to the unsteered value, close to a maximum steering value, and/or close to a frequently occurring steering value. In certain embodiments, a static optical value may be outside of the range of the varied optical characteristic and nevertheless be close to the varied optical characteristic as contemplated herein. In certain embodiments, materials may be considered to have close or similar optical characteristics at EM frequencies of interest, even if they do not have close or similar optical characteristics away from EM frequencies of interest. In certain embodiments, as described throughout the present disclosure, anti-reflective materials may be utilized in addition to, or as a replacement for, the utilization of materials having closely matched optical characteristics. Example and non-limiting ranges for materials having a close optical characteristic include: materials which are the same (e.g., although one may have variance applied as an EO material), and/or materials which have a selected optical property at a selected wavelength or range of wavelengths (e.g., index of refraction at 9.4 µm) within a specified range (e.g., sufficient to support steering efficiency targets) at a specified condition (e.g., during selected steering operations). One of skill in the art, having the benefit of the present disclosure and information ordinarily available when contemplating a particular system, can readily determine materials having a close optical characteristic for the system. Certain considerations for determining whether materials have a close optical characteristic include, without limitation: the cost and availability of suitable materials (including material cost and/or fabrication considerations); the frequency(ies) of interest of steered EM beams; the target steering efficiency values; the target steering capability; the duty cycle of steering for the application (e.g., the range of steering values expected, and/or the time or power throughput at each steering value); and/or the availability of mitigating techniques for the system to compensate for optical differences (e.g., electrode configurations to recover steering efficiency, number of layers of active elements, the thickness of active and inactive elements, and/or utilization of "chess", "castle", or other configurations).

One design consideration is the thinness of the insulators between the active material. Thicker insulators generally provide for improved isolation between phase delay progression stages, and reduce fly-back at the reset position. Thinner insulators generally provide for enhanced active fill. Depending upon the materials for the active material, the insulator, and the substrate, either thinner or thicker insulators may increase the overall cost of the beam steering device, including effects on material costs and/or fabrication costs.

In certain embodiments, the ground (or low-side) electrode may be continuous (e.g., reference FIG. 9, 10, or 12), and can be either reflective, or transparent to the incoming light. In certain embodiments, the electrically hot electrodes (or high-side) are discrete. In certain embodiments, the electrically hot electrodes are transparent to the incoming light. Alternately or additionally, one or more discrete electrodes could be embedded with, or behind, a reflective layer. In certain embodiments, the discrete electrodes are conductive.

An example second embodiment includes discrete electrodes that are resistive. Certain embodiments reduce the fringing field effect. An embodiment which has conductive electrodes, at least without further adjustments as described herein, will in general suffer from the quantization loss. In certain embodiments, the utilization of tilted and/or profiled electrodes can reduce or eliminate quantization losses, with or without the use of resistive electrodes. In certain embodiments, resistive electrodes can reduce or eliminate quantization losses. In certain embodiments, combinations of tilted and/or profiled electrodes with conductive and/or resistive electrodes may be utilized to support reduction or elimination of quantization losses, other system losses such as electrical losses, and/or to support various fabrication techniques. In an example embodiment having resistive electrodes, two voltages are applied to the resistive electrode, resulting in a tilted (or progressive) electric field, and a tilted (or progressive) index change. Example embodiments having resistive electrodes reduce quantization loss, for example by achieving a phase delay progression stage 102 with fewer electrodes, or even with a single electrode. In certain embodiments, two or more voltages are applied at selected locations across the electrode (e.g., using solid state devices electrically coupled to various positions of an electrode). The use of multiple voltages can achieve a non-linear slope of the voltages, for example to achieve a linear OPD change across the EO material or to be responsive to a non-linear electrode resistivity profile.

Figure 12:
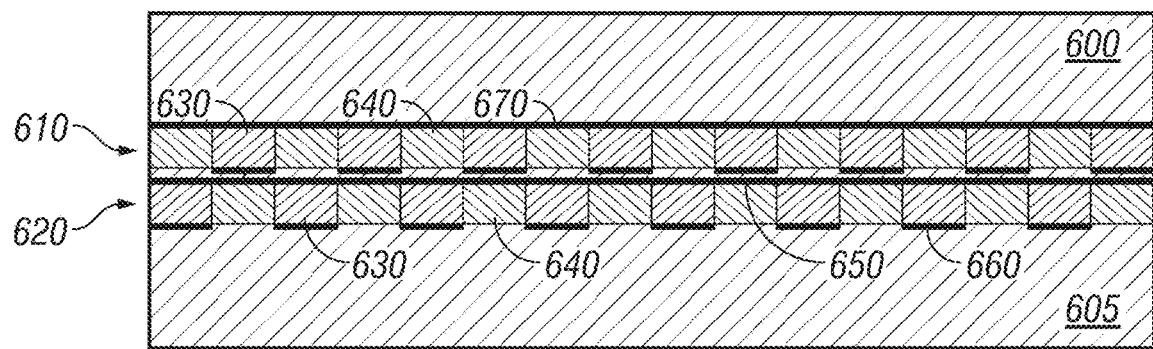
FIG. 12 depicts an embodiment for a two-layer embodiment having a common or continuous low-side electrode.
Figure 13:
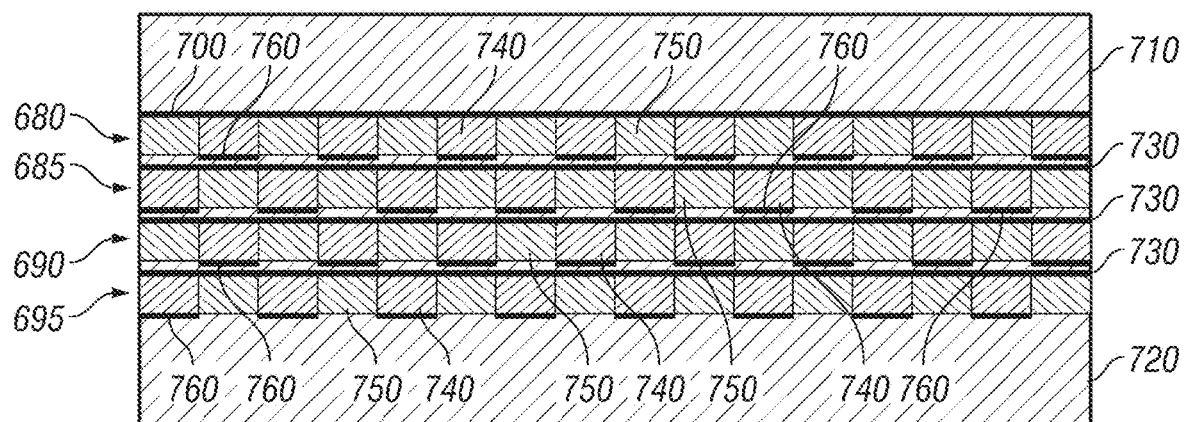
FIG. 13 depicts an embodiment for a four-layer embodiment having common or continuous low-side electrodes.

Another example embodiment includes at least two optically active rows 630 interposed between two substrates 600, 605, as shown in FIG. 12. The example of FIG. 12 utilizes two, or a multiple of two, layers, alternating a transparent insulator with a transparent active layer, providing a 100% fill factor (or arbitrarily close to 100%, if desired) of active electro-optic (EO) material capable of causing an OPD change in the radiation. The example of FIG. 12 or similar arrangements can be utilized to avoid the profile gaps in the unfolded phase profile such as depicted in FIG. 6 or 8, which contribute to steering efficiency losses (e.g., by having an increased active layer fill factor). The example of FIG. 13 depicts a multiple of two layers, although any number of layers may be utilized. It will be understood that where an incident EM beam has portions that intersect a different number of layers (e.g., an embodiment having an odd number of active layers with alternating cells, where a first portion intersects two active layers and a second portion intersects three active layers), the OPD in one or more layers may be manipulated (e.g., using varying voltages and/or electrode configurations) to ensure that all steered portions of the incident EM beam are steered to the same degree. An example of FIG. 12 may utilize conductive electrodes or resistive electrodes. The example of FIG. 12 has reduced loss due to fringing fields.

A further example embodiment includes resistive electrodes and two, or more, voltages on one side (and/or a voltage progression), to reduce, or eliminate the quantization loss. The further example embodiment includes an effective 100% fill factor, negligible fringing field loss, and negligible quantization loss. For example, referencing FIGS. 12 and 13, the utilization of resistive electrodes can reduce or eliminate quantization losses in the active cells. The example of FIG. 13 shows 4 device layers, but in certain embodiments more device layers could be used.

Figure 7:
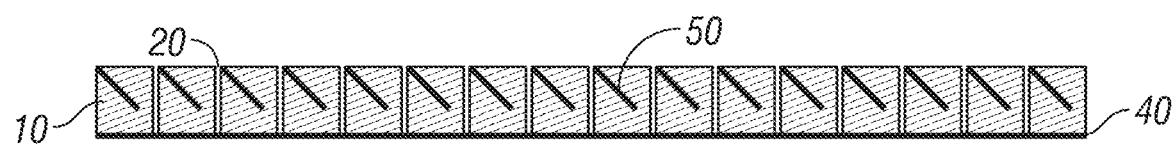
FIG. 7 is a plan view of an embodiment having tilted electrodes and insulators to reduce fringing field effects.

The example of FIG. 7 shows tilted electrodes 50. Tilted electrodes 50 can have a similar effect as resistive electrodes by creating a voltage variance across the active cell. In certain embodiments, the tilted electrodes 50 may be more difficult to fabricate, and the amount of tilt of the tilted electrodes 50 may not be adjustable at run-time. However, in certain embodiments, constructing the tilted electrodes 50 may provide for a field variance that more reliably achieves a design variance than a resistive electrode embodiment, and/or that provides for improved operation as wear and aging affect the resistance profile of the electrodes. Additionally or alternatively, example embodiments include adjustments to the tilted electrodes 50, such as providing more than one tilted electrode 50 per active cell, where selection of an active one of the tilted electrodes 50 provides for run-time adjustment of the electric field. The tilted electrodes 50 are depicted as a linear tilt, but the progression of the electrode and the spacing between the high-side electrode and the low-side electrode may be any shape, for example to account for a non-linear EO active material response and/or a non-linear resistance in the electrodes. In certain embodiments, given active cells may include tilted electrodes 50 and/or resistive electrodes. In certain embodiments, a first active cell may have a first tilted electrode 50 and/or resistive electrode configuration, and a second active cell may have a second tilted electrode 50 and/or resistive electrode configuration. In certain embodiments, the utilization of tilted electrodes 50 can produce a phase profile 802 similar to that depicted in FIG. 8.

The example of FIG. 7 depicts the tilted electrode 50 progressing through the EO active material 10 at a selected trajectory. It will be understood that the tilted electrode 50 can be on a first side of the EO active material 10, for example with a shaped active cell rather than having the tilted electrode 50 traverse through the EO active material 10. The example of FIG. 7 depicts insulators 20 between active cells at a reset position, which may be configured as any insulator described throughout the present disclosure, including fully dividing active cells, partially dividing active cells, and/or the insulators 20 being a part of a substrate (not shown in FIG. 7). The example of FIG. 7 depicts a common ground electrode 40, although any ground electrode configuration described throughout the present disclosure may be utilized with tilted electrodes 50.

Figure 14:
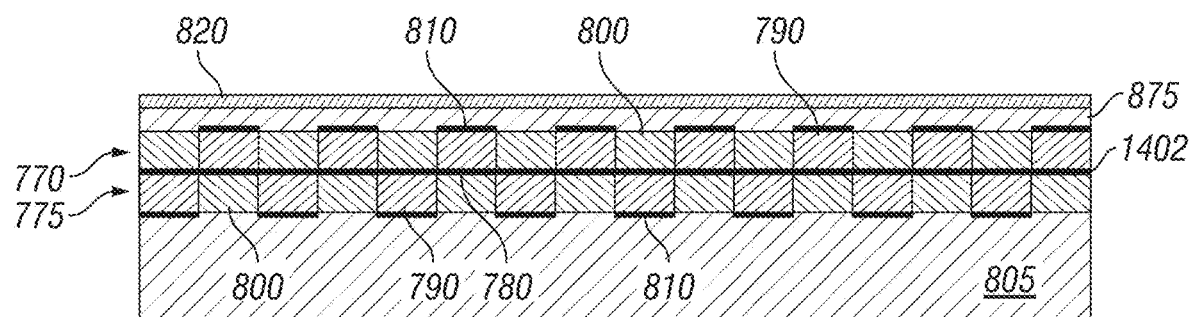
FIG. 14 depicts an embodiment for a two-layer embodiment having a shared common or continuous low-side electrode.
Figure 15:
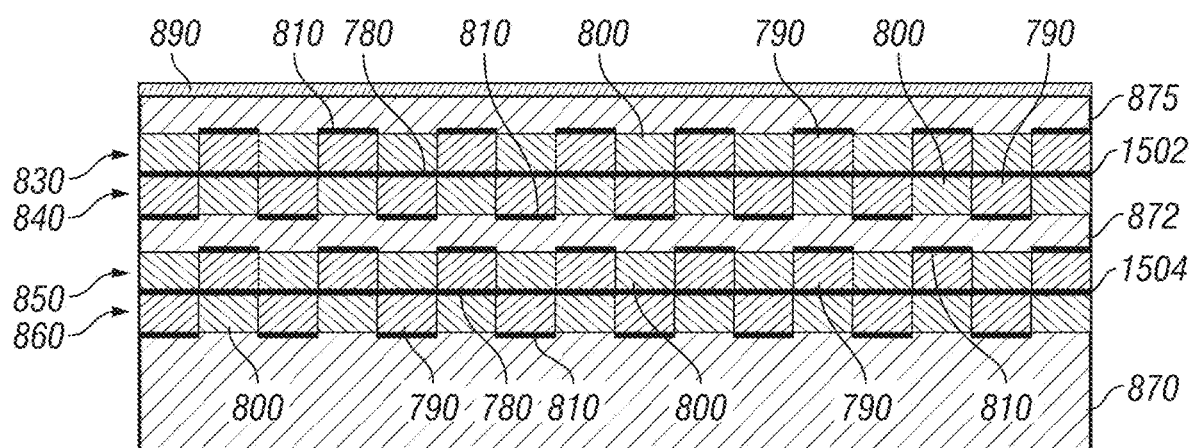
FIG. 15 depicts an embodiment for a four-layer embodiment having shared common or continuous low-side electrodes.

Yet another example embodiment includes at least two optically active rows separated by a continuous ground electrode, for example consistent with the depiction in FIG. 14 for two optically active rows, and in FIG. 15 for more than 2 optically active rows. Example embodiments include each active layer having an array of active cells. In the examples, an active cell is the EO active material positioned between the continuous ground electrode and a discrete electrode, and an insulator cell is positioned between each two active cells.

Figure 11:
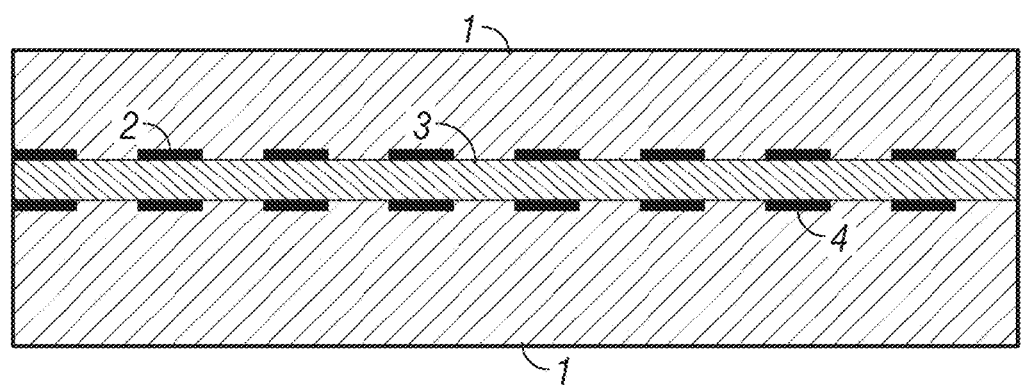
FIG. 11 is a schematic depiction of an EO active layer having a number of active cells with discrete low-side electrodes.

Referencing FIG. 11, an EO active layer 3 is positioned between a row of discrete low-side electrodes 4 and a corresponding row of discrete high-side electrodes 2, and positioned within a substrate 1. The example of FIG. 11 utilizes the EO active material as an insulating gap between active cells and the substrate 1 as an insulating gap between high-side electrodes, where the active cells are the EO active layer 3 portions between the electrode pairs 4,2. It can be seen that the embodiment of FIG. 11, while not necessarily depicted to scale, may have a relatively low active fill factor, where a significant fraction of the incident EM beam does not pass through an active cell. In certain embodiments, the steering efficiency losses in an embodiment such as depicted in FIG. 11 are nevertheless acceptable. In certain embodiments, an embodiment such as depicted in FIG. 11 may additionally include another steering layer having an EO active material, high-side electrodes, and low-side electrodes (which may be shared with a different steering layer). The high-side electrodes 2 in FIG. 11 may be conductive or resistive. In certain embodiments, a configuration such as that depicted in FIG. 11 is not sufficiently capable to provide EM beam steering with acceptable steering efficiency for certain applications.

Referencing FIG. 12, an example beam steering device includes a number of active cells 630, each positioned between a discrete high-side electrode 660 and a low-side electrode 650, 670. The low-side electrode 650, 670 in the example of FIG. 12 is a common ground electrode, with one common ground electrode 650, 670 for each active layer 610, 620. In the example of FIG. 12, an upper substrate 600 and lower substrate 605 are provided, which may structurally define the beam steering device. In certain embodiments, one of the substrates 600, 605 may be reflective and/or include a reflective layer. In certain embodiments, ground electrode 670 may be reflective and/or include a reflective layer. The example beam steering device further includes a number of insulators 640, the insulators 640 positioned between each adjacent active cell 630. The insulators 640 may be a transparent material, and/or may have an optical characteristic that is close to the optical characteristic of the active cells 630. In certain embodiments, the insulators 640 may be air. In certain embodiments, the active cells 630 are arranged to apply a progressive phase delay to an incident EM beam, for example within a cell 630 (e.g., utilizing a resistive electrode or other aspect to apply a voltage gradient across the cell), and/or across several of the active cells 630, with the active cells 630 forming phase delay progression stages. It can be seen that a phase delay progression may begin with an active cell 630 in a first active layer 610, and continue with an active cell 630 in the second active layer 620. In the example of FIG. 12, resets may occur at each active cell 630 (e.g., a next cell resets the phase delay by $2\pi n$), or between adjacent cells 630 at the boundary several active cells 630 forming phase delay progression stages. In certain embodiments, both the geometry of the active cells 630 creating distance between the high-side electrodes 660, and the insulators 640 of the beam steering device, cooperate to provide for sharp resets that have greatly reduced fly-back effect and subsequent steering efficiency losses.

Referencing FIG. 13, an example beam steering device is depicted having a number of active layers 680, 685, 690, 695. Each active layer 680, 685, 690, 695 includes active cells 740 including an EO active material positioned between a discrete high-side electrode 760 and a low-side electrode. The low-side electrodes 730 in the example of FIG. 13 are common ground electrodes, with one common ground electrode provided for each active layer 680, 685, 690, 695. The example beam steering device further includes substrates 710, 720, and insulators 750. The example beam steering device of FIG. 13 depicts multiple stacked active layers 680, 685, 690, 695, allowing for greater steering capability and/or greater steering efficiency of the device.

Referencing FIG. 14, an example beam steering device is depicted having two active layers 770, 775. Each active layer 770, 775 includes active cells 790 including an EO active material positioned between a discrete high-side electrode 810 and a low-side electrode. The low-side electrode 1402 in the example of FIG. 14 is a common ground electrode, with two active layers 770, 775 sharing the common ground electrode. The example beam steering device includes a first substrate 805 on an incident side of the beam steering device, and a reflective layer 820 on the opposing side of the beam steering device. The use of a reflective layer 820 provides for additional steering capability, essentially doubling the effective steering capability of the active layers 770, 775.

Referencing FIG. 15, an example beam steering device is depicted having four active layers 830, 840, 850, 860. Each active layer 830, 840, 850, 860 includes active cells 790 including an EO active material positioned between a discrete high-side electrode 810 and a low-side electrode. The low-side electrodes 1502, 1504 in the example of FIG. 15 are common ground electrodes, with two active layers (830, 840 and 850, 860, respectively) each sharing the common ground electrode. The example beam steering device includes a first substrate 870 on an incident side of the beam steering device, and a reflective layer 890 on a second substrate 875 on the opposing side of the beam steering device.

Yet another example embodiment includes at least two optically active rows (or active layers) separated by a continuous ground electrode, having resistive high-side electrodes and two, or more, voltages (and/or voltage gradients) provided across the active cells. Certain embodiments having at least two optically active rows separated by a continuous ground electrode have an effective 100% fill factor (e.g., the amount of the incident EM beam that is directed into active cells in at least one of the active layers), and/or an effective fill factor that is arbitrarily close to 100%, including greater than 90%, greater than 95%, greater than 97%, or greater than 99%. In certain embodiments, negligible fringing field loss and/or negligible quantization loss. In certain embodiments, there are even number of active rows, each active row including an array of active cells with an insulator cell located between each two active cells. Additionally or alternatively, an odd number of rows may be present in certain embodiments as will be understood by one of skill in the art having the benefit of the present disclosure. An example embodiment includes the positions of active cells and insulator cells in the neighboring rows that are opposite. In certain embodiments, the size and position of each active cell is selected in response to the size of the corresponding insulator cell in the next row—for example sized the same and aligned. In certain embodiments, active cells within a layer, and/or active cells in distinct layers, may be varied in size and/or thickness.

In certain embodiments, the active cells, thickness of active cells, electrodes, and applied voltages, are configured such that an incident EM beam of a selected wavelength (or frequency) experiences an identical or a sufficiently similar (e.g., consistent with the designed steering efficiency for the beam steering device) phase delay progression across the area of the EM beam such that the EM beam is steered to a desired degree at the selected steering efficiency. In certain embodiments, the active cells, thickness of active cells, electrodes, and applied voltages, are configured such that the steered portions of the EM beam (e.g., not the portions lost to an effective fill factor less than 100%) experience the identical or the sufficiently similar (e.g., consistent with the designed steering efficiency for the beam steering device) phase delay progression across the area of the EM beam. In certain embodiments, the active cells, thickness of active cells, electrodes, and applied voltages, are configured such that an incident EM beam of one of a number of selected wavelengths (or frequencies), and/or steered portions of such incident EM beams, experience an identical or a sufficiently similar (e.g., consistent with the designed steering efficiency for the beam steering device) phase delay progression at each of the selected frequencies. For example, and without limitation, an example beam steering device includes one or more active layers configured to steer a first selected frequency and to be transparent (or sufficiently transparent) to other selected frequencies, and further includes one or more other active layers configured to steer a second selected frequency and to be transparent (or sufficiently transparent) to the first selected frequency. In certain embodiments, an active layer can be configured to steer more than one frequency—for example where the steered frequencies are multiples of a same wavelength, such as when a thickness of an active cell is the same as a higher wavelength, and double (for example) the thickness of a lower wavelength.

In certain embodiments throughout the present disclosure, active cells in adjacent layers are offset (e.g., reference FIGS. 12-15) from each other in an alternating pattern. For the purpose of the present disclosure, such arrangements may be referenced as a Chess Scanner or a Chess Pattern. Certain embodiments having resistive discrete high-side electrodes and a Chess Pattern arrangement may be referenced as a Chess Scanner Pro (or a Chess Pattern Pro). The embodiments of FIGS. 12 to 15 depict two active layers cooperating to provide the effective fill area of the beam steering device in the Chess Pattern, but it will be understood that three or more layers, and/or randomized or pseudo-randomized layers can be arranged to provide the effective fill area of the beam steering device. The terminology of Chess Scanner or Chess Scanner Pro embodiments is used for convenience and clarity of the description herein. It will be understood that, in certain embodiments, the sizing, alignment, and/or arrangement of cells may vary such that the arrangement of the active cells and the insulator cells do not resemble a chess board. Without limitation, variance of sizing, alignment, and/or arrangement may include less than complete coverage of the optical area with cells, oblique, curved, or other non-perpendicular arrangements of cells, and/or cells having non-square shapes and/or varying shapes and sizes.

In certain embodiments, the substrates, active material, and/or insulators are transparent to the incoming optical wave to be deflected by the scanner, and/or have a similar refractive index between the two materials. It will be understood that transparency and/or refractive index similarity may improve the throughput of the device. In certain embodiments, materials may be non-transparent, transparent at selected wavelengths, and the like. An example embodiment includes an optional reflective layer added, which may be the last layer of the scanner (and/or the last optically active layer of the scanner). The reflective layer may be the last layer, and/or may be after a transparent last layer of the beam steering device. In certain embodiments, the continuous ground electrode in certain embodiments, and/or the last ground electrode in certain embodiments, may be reflective. The inclusion of a reflective layer causes the optical wave to traverse the scanner a second time, effectively doubling the thickness of the active layers, and increasing the steering capability and/or steering efficiency.

Each optically active row contains a series of cells made of an electro optically active material, such as an EO crystal (which could be KTN, PMN-PT, $BaTIO_3$, SBN, or some other crystal material), a quantum dot material, a liquid crystal, and/or any other optically active material. In certain embodiments, distinct layers and/or distinct cells within a layer may include distinct materials from other layers or cell in a device. Each material whose index of refraction can be changed dynamically is sandwiched between two electrode layers. One layer can be ground, and one layer can apply a voltage other than ground. Alternately, both layers can apply a voltage different from zero. In certain embodiments it may be advantageous to use more than a single active material type.

Example electrodes are transparent to an incoming wave and can be either conductive, using only one applied voltage, or resistive using two or more applied voltages, while creating a linear, or non-linear, voltage ramp between the location where the two voltages are applied. The resistive layer will provide a varying voltage, from the lowest to the highest voltage applied to the electrode. In certain embodiments, portions of the high-side electrode may be resistive, and other portions of the high-side electrode may be conductive. In certain embodiments, the resistance of the high-side electrodes may be controllable—for example with multiple resistive elements provided across the high-side electrode, where a controller can configure the resistive arrangement during operations of the beam steering device. In a further example, solid state switches, Zener diodes, OP Amps, and/or other solid state devices may be used to provide suitable control of the high-side electrode resistances with a response time configured to meet the functions of the beam steering device.

In certain embodiments, the electrodes are fabricated from transparent conductor materials, such as In—Sn oxide or and In—Sn alloy. If a reflective layer is used on one side, then that side could be made with a conductor that is not transparent to optical radiation. The level of conductivity can be any of a wide variety of levels. A ground (or low-side) electrode can be continuous or discrete, but the high-side electrodes imposing spatially varying voltage are discrete and/or separated by insulator cells and/or geometric spacing providing an insulating function. In certain embodiments, insulator cells are made of the same material as the substrate, or some other material with a similar index of refraction as the substrate. As an alternative the insulator material could be air.

In certain embodiments, the refractive indices of the substrate, active material, and/or insulator have similar optical properties, and/or an anti-reflective coating can be used where material discontinuity occurs. The utilization of similar optical properties in materials can improve the throughput of the beam steering device. Using anti-reflection coatings can improve steering efficiency. In certain embodiments, an insulator cell is positioned between each of the optically active cells. In one embodiment, the arrangement of EO cells and insulators are reversed in each row. In certain embodiments, the active cells, whose index of refraction can be electronically modified, have the same size as the corresponding insulators in the next row. Alternately multiple active cells could be used, such that sum of the width of the cells is the same as the width of an insulator. In certain embodiments, the insulators, and substrate, are made of the same material, such SrTiO3 or infra-red glass to not only separate electrodes under different voltages but also to transmit the incoming EM wave. As an alternative one or more, or all, of the insulators may be air. In certain embodiments, the transparent insulator and active region above or below are the same size, and the next pair of insulator/active region materials are a distinct size.

For improved throughput the refractive indices of substrate, active and insulator cells should be close, and/or an anti-reflective coating can be used on any edges where material discontinuity occurs to improve steering efficiency. An ideal steering device would re-direct 100% of the impinging light. In one embodiment a high efficiency beam steering may redirect >90% of the light impinging on a device to exit at the steered angle. Various beam steering applications can make use of different levels of steering efficiency. In one embodiment, the optical waves can be in the visible through long wave infrared. In one embodiment, the surface figure of the substrate, insulators and electrodes should be at least $1/50$ of the wavelength of the incoming wave which in a UV, optical, or infrared, embodiment can be a wavelength of 0.25 to 12 microns. In certain embodiments, the optically active cells provide at least approximately one wavelength of phase delay, and thus have a depth or layer thickness of at least one wavelength divided by the index change ratio. In certain embodiments, a beam steering device having a reflective layer includes optically active cells providing at least approximately one-half wavelength of phase delay, and thus have a depth or layer thickness of at least one-half wavelength divided by the index change ratio. In certain embodiments, the thickness of the optically active cells progresses with the phase change delay, and/or may further include features to ensure that steering occurs in a single direction across the array of active cells (e.g., through mechanical control of the array facing, and/or control of the incident EM beam where such control is possible). The width of each active cell can be selected to adjust the deflection angle of the scanner, and further depends upon the phase delay progression scheme of a particular beam steering device.

In one embodiment, if the scanner is designed to steer a wave with 1.5-micron wavelength light to an angle of up to 30 degrees, the width of each EO cell (or active cell) would be 3 microns or less. If EO cells are of varying sizes then the largest cell will have a width of 3 microns. In the example, the size of insulator cells, which are between every two EO cells, are the same as the corresponding active cells in the next row.

An example includes the second optically active row of the scanner that is similar to the first row with the exception that the positions of the active, and insulator cells, are opposite. The alignment of electrodes and insulators in the two rows are very important to provide an optimum phase delay for the whole incoming wave. After an incoming optical or photonic wave traverses both layers the complete wave will have experienced a phase delay with discrete phase shifts based on the total shift of the two layers. Layer 1 will shift the optical or photonic wave in its active regions, then where layer 1 has an insulator, layer 2 will shift the wave in its active regions, and the shift will continue in this manner across the beam steering device.

Those active index changing layers that use a resistor, instead of a conductor, can vary the voltage across the active cell in a manner to match the waveform tilt resulting from the imposition of a series of discrete index change steps. In this manner, quantization loss, as explained in References 1 and 2, can be reduced or eliminated and approximately one wavelength of OPD can be provided in a single resistive electrode width, to deflect the incoming light to the maximum angle.

In one embodiment, each of the electrode layers can have thousands of discrete electrodes in one row, and each phase reset can contain one or more electrodes. Larger deflection angles require fewer electrodes of a certain width between resets, because the spatial period between resets is smaller. In the case of resistive electrodes, the reset period can be as small as one resistive electrode width. In case of having conductive electrodes, the reset period may, for one embodiment, include a discrete number of conductive electrodes for the largest angle, and more electrodes for a smaller angle. An eight-cell configuration would limit loss due to quantization to 5%, as explained in Reference 1. Depending upon the desired steering efficiency, certain embodiments may have as few as a three-cell configuration, although any number of cells may be provided including six, eight, ten, fifteen, or twenty cells before each reset period. As the modulation of the optical or photonic wave by the optically active cells is accumulative, an optional reflective layer can be added as the last layer of the scanner to provide either more deflection angle, or smaller cell thickness, by having the optical or photonic wave pass through the phase delay areas a second time.

An example embodiment includes the scanner made of at least two optically active layers interposed between two substrates. Each optically active row contains an array of cells whose index of refraction can be changed in one or both polarizations, such as liquid crystal, quantum dot, or EO crystals, such as SBN, PMN-PT, KTN, and/or $BaTiO_3$. An example embodiment includes each active cell sandwiched between electrodes that are either conductive, or resistive. In the example embodiment, there is an insulator cell between every optically active cell in each row, and the arrangement of optically active cells and insulator cells is opposite in each row. In one embodiment the width of any corresponding cells in the different rows is exactly the same, so light undergoes an OPD associated with one active layer for each pair of active layer/insulator sections. The corresponding cells are aligned so one layer provides OPD, which for a given wavelength corresponds to a given phase shift, in one cell pair, and the second layer provides OPD, or phase shift, in the second cell pair.

In certain embodiments, the insulator cells, and substrates, are made of a material which has the same or a similar index of refraction, and is transparent (or sufficiently transparent) to the incoming optical wave. In one embodiment, all layers of the scanner are planarized to a surface flatness of one fiftieth (1/50) or better of the wavelength of the incident EM wave. The indices of refraction of the substrate, the active material, and the insulator cells should be similar, or it will be advantageous to apply an anti-reflecting coating on every discontinuity between materials to enhance the steering efficiency. A transmissive optical or photonic beam scanner can be made reflective if the last electrode is reflective, or a reflective layer is coated on one of the substrates. In certain embodiments, for example where accurate optical quality of the steered EM beam is not required for a particular application, the insulator cells, substrates, and/or active cells may have optical characteristics that are not similar, or that vary significantly.

In another embodiment of the present disclosure, the scanner can be made of two or any even number of optically active rows. In the example embodiment, each two optically active rows are interposed between two substrates, and/or a number of optically active rows are bounded by two substrate layers at opposing ends of the beam steering device. Each two rows are separated from each other by a common continuous transparent ground electrode. Each row comprises an array of optically active cells sandwiched between two electrodes that are either conductive or resistive, and an insulator cell is positioned between adjacent EO cells. In the example embodiments, the arrangement of EO cells and insulators are reverse in each row, and the size of the active cells in each row will be the same as the size of the corresponding insulator cells in the next row.

In certain embodiments, the insulator cells and substrates are made of a material with the same index of refraction and are transparent to the incoming optical or photonic wave like IR glass or $SrTiO_3$. The EO cells are made of any materials whose index of refraction can be electronically changed in one or both polarizations, like liquid crystal, quantum dot, or EO crystals like SBN, PMN-PT, KTN, $BaTiO_3$. In certain embodiments, the layers of the scanner are planarized to a selected surface flatness to achieve the desired optical quality and/or steering efficiency. Example and non-limiting surface flatness values include a surface flatness of one-tenth, one-twentieth, one-fortieth, and/or one-fiftieth or better of the target wavelength. The indices of the substrate, active and insulator cells are close otherwise an anti-reflecting coating may be required on every edge where material discontinuity occurred. That agile transmissive optical or photonic wave scanner can be realized as reflective one if a reflective layer is coated on one of the substrates and/or on a common ground electrode.

One approach to determine the value from which OPD is subtracted (e.g., for a reset) is given in Gregor Thalhammer, Richard W. Bowman, Gordon D. Love, Miles J. Padgett, and Monika Ritsch-Marte, "Speeding up liquid crystal SLMs using overdrive with phase change reduction," 28 Jan. 2013/Vol. 21, No. 2/OPTICS EXPRESS p 1779-1797. The Thalhammer paper is incorporated herein by reference in the entirety for all purposes. Fine angular beam steering may also result in subtracting the reset from a value not exactly an increment of $2\pi n$ phase shift. The article by Burrell R. Hatcher, "Granularity of beam positions in digital phased arrays," Proceedings of the IEEE (Volume: 56, Issue: 11, November 1968, teaches very fine angular steering using a phased array, but initiating the subtraction of a multiple of one wavelength of OPD from a value that is not an exact multiple of one wavelength of OPD, or $2\pi n$ of phase. The Hatcher paper, which may be referred to as "Reference 5" hereinafter, is incorporated herein by reference in the entirety for all purposes. The fly-back effect is a result of the inability of the device to change its voltage profile instantaneously between two sets of electrodes, which is shown in FIG. 2. The fly-back region in FIG. 2 is the region for which the OPD or phase decreases as the distance increases.

Many modulo 2π steering embodiments, such as liquid crystals, or an electro-optical crystal, create an index change in one polarization as a result of applying an Electric, or E, field in the device as is shown in FIG. 11. Other materials, such as quantum dots, can change the index in both polarizations when voltage is applied. An external electric field will be applied on the medium by applying voltages on those electrodes. The external electric field manipulates the refractive index of the medium in one, or more, polarizations. The medium must be transparent (or sufficiently so) to the incoming light and can be liquid crystal, an electro optical crystal, a quantum dot material or any other materials whose refractive index can be manipulated by applying an external electric field. Monochromatic light can be deflected if a sawtooth phase profile is provided. The inability to precisely control those electric fields due to fringing effects results in similar inability to rapidly change phase shifts, and an inability to create a sharp index change, and a sharp OPD change, therefore an inability to rapidly change OPD. The fly-back region reduces the fill factor of the optical grating where fill factor is defined as the percentage of the beam steered in the desired direction.

Fringing fields are the main reason for a fly-back region greater than zero. For liquid crystals there can also be an inability of the liquid crystal to change orientation quickly, but fringing fields are often a more limiting effect. FIG. 2 shows that during the fly-back portion of the phase profile the beam steers in the wrong direction. The following equation gives the efficiency due to fly-back effects.

$$\eta = \left(1 - \frac{\Lambda_F}{\Lambda}\right)^2. \quad \text{Equation 1}$$

In equation 1, $\eta$ is efficiency, $\Lambda_F$ is the width of the fly-back region, and $\Lambda$ is the width between resets. Equation 1 is taken from P. F. McManamon, T. A. Dorschner, D. C. Corkum, L. J. Friedman, D. S. Hobbs, M. K. O. Holz, S. Liberman, H. Nguyen, D. P. Resler, R. C. Sharp, and E. A. Watson, "Optical Phased Array Technology," Proc. IEEE 84(2), 268-298, 1996. The McManamon reference "Optical Phased Array Technology", which may be referred to as "Reference 4" hereinafter, is incorporated herein by reference in the entirety. This is the fringing field limited steering efficiency.

The following equation provides fly-back distance vs steering efficiency, for steering efficiency limited by fly-back.

$$\Lambda_F = \Lambda(1 - \sqrt{\eta}) \quad \text{Equation 2.}$$

FIG. 2 shows fringing fields make it impossible in a traditional thin steering device to impose an electric field that results in one electrode, or less, wide resets while using small electrodes and steering to large angles with commercially available materials having normal index change ratios. As a rule of thumb, the narrowest width of a reset is about the thickness of the device layer between the electrodes and the ground plane, as discussed in X. Wang, B. Wang, P. F. McManamon, J. J. Pouch, F. A. Miranda, J. E. Anderson, P. J. Bos, "Spatial resolution limitation of liquid crystal spatial light modulator," Liquid Crystal Conference, Great Lakes Photonics Symposium, Cleveland, Ohio Jun. 7-11, 2004. The Wang reference "Spatial resolution limitation . . . " is incorporated herein by reference in the entirety.

Fringing fields can have a significant limiting effect on presently known modulo 2π beam steering devices. For transmissive beam steering the cell must be at least approximately as thick as required to obtain one wavelength, or generate 2π phase, of OPD. A birefringence of 0.3 means the cell must be about 3.3 times one wavelength in thickness. Table 1 gives the fringing field effect on the steering efficiency for a 0.35 index of refraction change using transmissive beam steering. For electro-optic active materials having an index of refraction change lower than 0.35, the steering efficiency values will be lower than those depicted in Table 1.

TABLE 1

Efficiency vs. Angle limited by fringing field effects for previously known modulo 2π beam steering devices

| Angle (deg) | Angle (rad) | Index change | Efficiency |
| --- | --- | --- | --- |
| 20 | 0.349 | 0.35 | 0.0% |
| 15 | 0.262 | 0.35 | 6.3% |
| 10 | 0.175 | 0.35 | 25.0% |
| 5 | 0.087 | 0.35 | 56.5% |
| 2.5 | 0.044 | 0.35 | 76.4% |
| 1.5 | 0.026 | 0.35 | 85.7% |
| 1 | 0.017 | 0.35 | 90.5% |
| 0.625 | 0.011 | 0.35 | 93.8% |
| 0.25 | 0.004 | 0.35 | 97.7% |
| 0.15 | 0.003 | 0.35 | 98.3% |
| 0.1 | 0.002 | 0.35 | 98.9% |

Table 1 shows that efficiency drops off rapidly for previously known modulo 2π beam steering at significant steering angles. If high efficiency is desired, then the steering angles used for previously known modulo 2π beam steering devices must be limited to very small angles. The fringing field efficiency losses are incurred for each steering event—for example if a 1 degree steering in both azimuth and elevation is performed, then the realized efficiency will be (0.905)^2, or about 82% resulting efficiency. An example modulo 2π steering device consistent with the present disclosure utilizes a reflective beam steering, light goes into the device, bounces off a reflecting surface, and returns. As a result, the active device layer is half as thick and the fly-back region is half as wide, thus increasing the steering efficiency.

In certain embodiments, an optical phased array (OPA) non-mechanical beam steering includes the ability to point to less than $\frac{1}{100}^{th}$ of a diffraction limited angular spot size very accurately. For many applications, including high-energy applications and/or operations performed in sensitive areas, the ability to steer to the desired angles is very important. Modulo 2π beam steering using OPA technology can enable very precise steering, for example as explained in Reference 5.

Another factor is the steering efficiency due to quantization, which is described in the following equation from Reference 3:

$$\eta = \left[\frac{\sin\left(\frac{\pi}{q}\right)}{\left(\frac{\pi}{q}\right)}\right]^2. \quad \text{Equation 3}$$

In equation 3, $\eta$ is the steering efficiency, and q is the number of steps for each 2π phase shift progression of the steering device. Accordingly, eight (8) steps result in 95% steering efficiency from quantization, and ten (10) steps result in 96.8%. Any loss for quantization is additional loss compared to loss from fringing fields. Actual loss due to quantization for a few selected step values will be as shown in table 2:

TABLE 2

Quantization loss.

| No of steps | Efficiency |
|---|---|
| 2 | 41% |
| 3 | 68% |
| 5 | 88% |
| 6 | 91% |
| 8 | 95% |
| 10 | 96.8% |
| 12 | 97.7% |
| 16 | 98.7% |
| 20 | 99.2% |

Another background issue is the effect of magnification. A beam deflector having a small beam passing through it, when magnified, will decrease the steering angle, as shown in the following equation:

$$\vartheta_f = \frac{\vartheta_i}{M}. \quad \text{Equation 4}$$

In equation 4, $\vartheta_f$ is the final steering angle, M is the magnification, and $\vartheta_i$ is the initial steering angle. For example, a 5 mm wide beam passing through a crystal and magnified to a 100 mm wide beam requires a magnification factor of 20. Therefore, a 10-degree steering angle is reduced to a half of a degree for this example with a magnification of 20.

Figure 3:
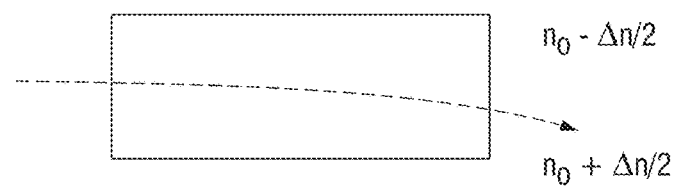
FIG. 3 is a plan view of a previously known bulk beam steering system.

Referencing FIG. 3, a previously known bulk beam steering device is depicted to illustrate certain differences relative to various systems and methods in the present disclosure. In bulk beam steering, light passes through an EO crystal, and is steered. Under current practice, incident light with linear polarization in the proper direction is deflected and the angle of steering is varied by the application of an electric field. The angle of deflection for the conventional bulk beam deflector is calculated as:

$$\theta_f = \frac{L\Delta n}{W}. \quad \text{Equation 5}$$

In equation 5, $\theta_f$ is the deflection angle, $\Delta n$ is the index change occurred by the applied voltage and L and W are length and width of the rectangular beam deflector.

Previously known bulk beam steering devices suffer from a number of drawbacks. For example, when the optical beam is larger than a crystal, the beam is focused into the crystal and is expanded afterward. That requires large magnification, which reduces the effective steering angle as discussed preceding. Additionally, previously known bulk beam steering devices require significant voltages to be developed within the crystal, which may be thousands of volts. These high voltages are undesirable and introduce a number of challenges in management of the operating device, material selection and device design, and potential safety issues. The beam steered by a bulk beam steering device such as in FIG. 3 will likely be collimated when it traverses the crystal.

Figure 4:
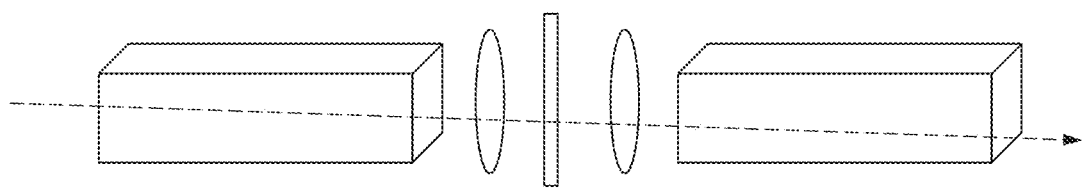
FIG. 4 is a plan view of a previously known 2-dimensional bulk beam steering system.

FIG. 4 depicts a previously known bulk beam steering device performing a two-dimensional beam steering using two bulk crystals, and a half waveplate between. In addition to the necessity of a half wave plate to rotate the polarization direction of the incident light by 90 degrees, some lenses may also be required between the two crystals to ensure the beam enters the second crystal.

As seen in FIG. 4, one dimension will be steered first, possibly in one crystal, and then the other dimension will be steered, possibly in a second crystal. The linearly polarized light deflected in one-dimension travels through the second crystal to be steered in another dimension after its polarization direction is rotated by the half wave plate. Therefore, when the beam exits the first crystal it is deflected to a certain angle. That beam direction is maintained in the second crystal. A difficulty with this geometry is that the deflection angle must be kept small, or the beam will hit the side wall of the second crystal. The deflection of the beam inside of a crystal, resulting in the possibility of hitting the wall, is often called beam walk off by those practiced in the art.

Referring to FIG. 11, an example modulo $2\pi n$ scanner comprises an active row made of an EO layer 3 (e.g., an EO active layer that changes an optical characteristic in response to an applied voltage) sandwiched between two sets of transparent discrete electrodes. The EO material may be any type of material that changes an optical characteristic in response to an applied voltage, including at least an EO crystal, a crystal layer, multiple crystal layers, an EO crystal layer, multiple EO crystal layers, a liquid crystal, a polymer, a quantum dot device, a crystal that responds to an applied electric field with a linear change in an index of refraction, and/or a crystal that responds to an applied electric field with a quadratic change in an index of refraction. An optical characteristic that changes in response to an applied voltage includes a change in birefringence and/or refractive index in response to an applied electric field. In certain embodiments the change may be dependent upon wavelength, polarization, and/or propagation direction of the steered EM beam. In certain embodiments, the change may be linear or non-linear. Without limitation to any other aspect of the present disclosure, it will be understood that descriptions utilizing an EO active layer, an active layer, an EO material, and/or a crystal may additionally or alternatively include any other EO active materials described throughout the present disclosure.

One of skill in the art, having the benefit of the disclosure herein, can readily select an appropriate EO material for a particular system. Certain considerations for material selection include, without limitation: the cost of materials, the steering capability (e.g., required electric field and/or optical change amount), the response time of the material in changing an optical characteristic, the cost of the material, fabrication considerations for the material (e.g., including available methods of fabrication, capability of the fabrication process for the material to achieve a particular design state, and/or cost of the fabrication process), the physical strength of the material as configured in a beam steering device, and/or thermal capability of the material (e.g., ability to withstand heat generation and/or support heat rejection). Certain considerations of a system when contemplating particular materials include, without limitation: the amount of steering desired; capital costs versus operating cost trade-offs; the energy throughput of the application; the available configurations for EM beam direction, polarization, and/or wavelength options; the desired accuracy and precision of beam steering direction, energy delivery, and/or optical characteristics of the steered beam; the availability of computing power in the device or accessible to the device to provide compensation, control, and/or analysis of electrical components and/or optical components in the device; and/or the size of the beam steering device (e.g., influencing the size of each layer, the number of layers, and/or the geometric configuration of the fabricated layer).

In the example of FIG. 11, the upper electrodes 2 are high-side electrodes making up a high-side electrode layer, and the lower electrodes 4 are low-side electrodes making up a low-side electrode layer. In the example, the lower electrodes 4 may be at a ground state voltage, or another low voltage or baseline voltage value. The upper electrodes 2 may be at selected voltages thereby providing selected voltage differentials across the portions of the EO layer 3, thereby creating active cells of the EO layer 3. The EO layer 3 is interposed between two substrates 1 in the example of FIG. 11. The description of upper electrodes 2 and lower electrodes 4 is an electrical description and not a geometrical description, and the upper electrodes 2 may be on a vertically upper side or vertically lower side of the EO layer 3, or on a side, oblique, or any other arrangement. In certain embodiments, one or more of the lower electrodes 4 may instead be a continuous or uniform electrode, such as a uniform ground electrode (e.g. reference FIG. 12 with ground electrode 670). In certain embodiments, the lower electrodes 4 (and/or uniform ground electrode 670) may be transparent, sufficiently transparent at selected EM wavelengths, reflective, and/or includes or is coupled with a reflective layer. In certain embodiments, the substrate 1 is transparent, sufficiently transparent at selected EM wavelengths, and/or includes or is coupled with a reflective layer. In the example of FIG. 11, Light is propagating perpendicular to the substrate 1 through the EO crystal layer 3, and may progress through the upper electrodes 2 or the lower electrodes 4 first, and then through the other of the upper electrodes 2 or the lower electrodes 4 second.

Figure 5:
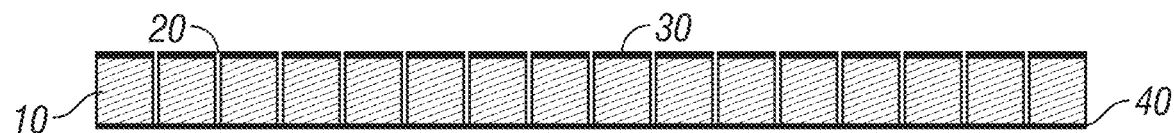
FIG. 5 is a plan view of a single layer of active EO material and insulator material to reduce fringing field effects.

Referring to FIG. 5, an embodiment of this disclosure comprises a set of transparent discrete electrodes 30 and a ground electrode 40 located on opposite sides of an EO active layer 10. The ground electrode can be either reflective or transparent to the incoming light. Discrete electrodes 30 can be either conductive or resistive. The discrete electrodes may replace the uniform ground electrode 40 in some embodiments. Light is propagating perpendicular to the EO crystal layer 10, or at some angle with respect to the ground electrode 40, through the EO crystal layer 10, toward the discrete electrodes.

Note, the terms "crystal," "EO crystal," "crystal layer" and "EO crystal layer" are used interchangeably herein and refer to any media who's index of refraction, or birefringence, can be changed by the application of an electric field. The crystals of this disclosure may include crystals with either a linear, or quadratic, change in index of refraction with respect to an applied field. The term crystals may also include liquid crystals, or any media whose index of refraction can be changed by application of an electric field. If transparent electrodes are used on both side of the structure shown in FIG. 5, then to achieve larger steering angles one embodiment could use multiple stacked structures.

In FIG. 5, Ground electrode 40 can be either transparent or reflective. In case of having transparent ground electrode 40, it may be a single electrode as shown, or may be a series of electrodes similar to discrete electrodes 30 located on the other side of the EO crystal layer 10. If the ground electrode 40 is a series of electrodes, said series of electrodes 40 do not have to all be set at zero voltage, even though the term ground is used.

The use of insulators 20 between electrodes 30 reduces the fly-back discussed in the background section for modulo $2\pi$ beam steering devices. This will allow steering to larger angles at high efficiency, because it will reduce the fringing field effects on the electric field. In certain embodiments, the insulators 20 may be a dielectric material, and/or include a dielectric material or layer as a part of the insulators 20. In previously known modulo $2\pi$ beam steering devices, there is significant spreading of the electric field, referred to as fringing fields, which is a primary contributor to the fly-back effect. The example embodiment of FIG. 5, having the insulator 20 between electrodes 30, reduces the spreading of the electric field between electrodes. The transparent discrete electrodes 30 can be conductive or resistive. In both cases the fly-back distance will be reduced significantly but the phase diagram will be different whether those are conductive or resistive. As described preceding, FIG. 6 shows an example phase diagram and the sharp reset provided when discrete electrodes 30 are conductive, and FIG. 8 shows the phase diagram and the sharp reset provided when the discrete electrodes 30 are resistive discrete electrodes and/or electrodes configured to provide an optimum set of voltages across the active cells.

In one embodiment, the crystal layer 10 may have a resistivity that may be much lower than the insulator 20, for example 100 times lower. This is estimated to reduce the fringing electric field spreading effect by for example a factor of approximately 100 times in the insulator 20. The width of the insulator 20 can influence the amount of fringing field reduction. The quality of the insulator may also influence the amount of fringing field reduction, with a less conductive insulator providing more reduction in fringing fields. The insulator 20 may extend completely through the crystal layer 10 whose index can be changed by an electric field or the insulator 20 may only extend part way through the crystal layer 10. For example, the insulator 20 may extend anywhere from less than 10% to more than 80% through the crystal layer 10, or it can extend 100% of the way through the crystal. As a result, sharper resets are realized when the OPD is reduced during a reset from approximately a multiple of one wave, or a multiple of one wavelength, to approximately zero. Consequently, an OPD profile with sharper resets results, and higher steering efficiency is realized.

Comparing FIG. 2 with FIG. 6 shows that the electric field will increase in more discrete step increments than without the insulator 20 separating the discrete electrodes 30, rather than being smoothed by fringing fields, and the resets will be much sharper. An example embodiment utilizes partial penetration of the crystal layer 10 by the insulators 20 to retain and/or configure some smoothing of the fringing fields on the increasing phase ramp. An example embodiment utilizes partial penetration of the crystal layer 10 by the insulators 20 as a practical consideration in creating the insulators 20 within the crystal layer 10—for example to enable easier fabrication and/or an improved mechanical structure of the beam steering device. In certain embodiments, insulators 20 provided at a reset position are enhanced (e.g., higher resistance and/or impedance, greater thickness, and/or a greater penetration of the crystal layer 10), providing for smoothing effects on the increasing phase ramp portion with greater fringing field resistance at a reset position.

Referring to FIG. 7, another embodiment of this disclosure comprises tilted electrodes 50 instead of electrodes on the surface of the EO crystal layer 10. This embodiment will reduce, or eliminate, the quantization effect of the steps in building up the electric field. This embodiment further comprises an EO crystal layer 10, a ground electrode 40 and insulators 20. Ground electrode 40 includes, but is not limited to transparent ground electrodes. The transparent ground electrode 40 may be a single electrode as shown, or may be a series of electrodes. Once again, insulators 20 may extend fully or partially through EO crystal layer 10. The tilted electrodes 50 may progress in any configured manner through the EO crystal layer 10, as described throughout the present disclosure.

For the tilted electrode embodiment shown in FIG. 7, the electric field on adjacent discrete tilted electrodes 50 is made continuous, or near continuous, by reducing the distance between the discrete electrodes 50 and the ground electrodes 40 using a fixed tilt angle. While the fixed electrode tilt angle may not be ideal for all steering angles, it will reduce the quantization effect over a wide range of steering angles. As shown in FIG. 8, an increase in applied voltage is compensated by the distance change to provide a continuous, or near continuous, electric field at any adjacent discrete tilted electrode 50 before reset.

Another embodiment (not shown) using the insulators would be to implement modulo $2\pi$ beam steering using liquid crystals to cause a change in index of refraction. Any material that can have an index of refraction change in one polarization could be used with the insulators between conductive or resistive electrodes. The insulators can also be located between the electrodes with a depth between zero to the liquid crystal thickness, depending on the desired steering efficiency.

Figure 9:
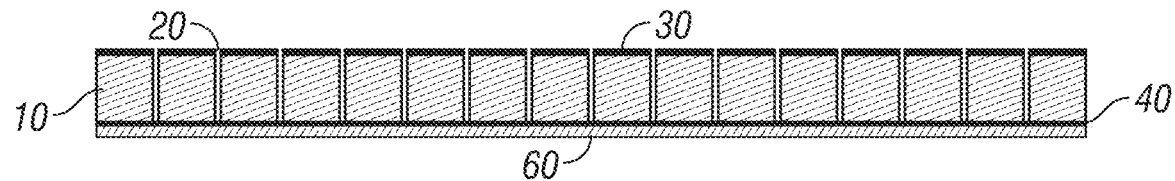
FIG. 9 is a plan view of a single layer of active EO material and insulator material, having a reflective layer.
Figure 10:
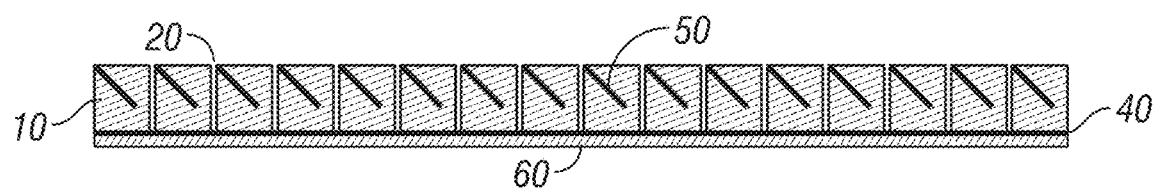
FIG. 10 is a plan view an embodiment having tilted electrodes and insulators, having a reflective layer.

As seen in FIG. 9 and FIG. 10, a mirror layer 60 can be added after the ground electrode layer 40 and/or as a layer on the substrate. If a stack of structures is used the mirror layer would be after the full stack of device layers. This will increase the deflection angle allowed at a certain steering efficiency by reducing the required cell thickness, and the fly-back region distance.

An example embodiment consistent with the depiction of FIG. 12 is described following. An embodiment comprises two optically active rows 610, 620 interposed between two substrates 600, 605. Each row contains an array of active cells 630 which active cells are separated from each other by insulator cells 640. The active cells 630 are made of an optically active material, and are sandwiched between a continuous ground electrode 650 and discrete electrodes 660. The discrete electrodes may be either conductive or resistive. The arrangement of active cells 630 and insulator cells 640 is opposite in each row. The size of an active cell 630 in a row 610, 620 is the same as the size of the corresponding insulator cell 640 in the next row. The last ground electrode 670 can be either reflective or transparent to the incoming light to be deflected by the scanner.

An example embodiment consistent with the depiction of FIG. 13 is described following. An embodiment depicted in FIG. 13 is similar to the embodiment shown in FIG. 12 but comprises four active rows 680, 685, 690 and 695. The four active rows 680, 685, 690 and 695 are interposed between two substrates 710 and 720. The embodiment can comprise any even number of active rows, and/or may include odd numbers of active rows, for example with one or more repeating rows. Each active row comprises a ground electrode 730, with the last ground electrode 700 being either reflective, or transparent, to the incoming light to be deflected by the scanner. Similar to the embodiment shown in FIG. 12, each of the active rows contain an array of active cells 740. The active cells are separated from each other by insulator cells 750. The active cells 740 are made of an optically active material and are sandwiched between a continuous ground electrode 700, 730 and discrete electrodes 760, which may be either conductive or restrictive. The ground electrode could be in discrete elements in another embodiment. The arrangement of active cells 740 and insulator cells 750 is opposite in each row. The size of an active cell 740 in a row 680, 685, 690 and 695 is the same as the size of the corresponding insulator cell 750 in the next row. While FIG. 13 shows two pairs of rows, for a total of 4 rows, the number of rows may be any number, including any multiple of two rows or other arrangements.

An example embodiment consistent with the depiction of FIG. 14 is described following. An embodiment of a scanner comprises two optically active rows 770, 775 separated by a common transparent continuous ground electrode 780. Each of the active rows 770, 775 are interposed between two substrates 805, 807. Each row contains an array of active cells 790. The active cells 790 are separated from each other by insulator cells 800. The active cells are made of an optically active material and are sandwiched between a continuous ground electrode 780 and discrete electrodes 810, which may be either conductive or resistive. The arrangement of active cells 790 and insulator cells 800 is opposite in each row. The size of an active cell 790 in a row 770, 775 is the same as the size of the corresponding insulator cell 800 in the neighboring row. A reflective layer 820 can be located on a surface of the substrate 805 to make the scanner reflective.

An example embodiment consistent with the depiction of FIG. 15 is described following. An embodiment of a scanner depicted in FIG. 15 is similar to the embodiment shown in the FIG. 14 but comprises four active rows 830, 840, 850, and 860 instead of just two active rows. The embodiment can comprise any even number of active rows, and/or may include odd numbers of active rows, for example with one or more repeating rows. Each two rows are separated by a transparent continuous ground electrode 780 and each pair of rows is interposed by two substrates. More specifically, a first pair of rows is interposed between substrates 870 and 872 and a second pair of rows is interposed between substrates 872 and 875, as shown in FIG. 15. Each row contains an array of active cells 790. The active cells 790 are separated from each other by insulator cells 800. The active cells are made of an optically active material and are sandwiched between a continuous ground electrode 780 and discrete electrodes 810, which may be either conductive or resistive. The arrangement of active cells 790 and insulator cells 800 is opposite in each row. The size of an active cell 790 in a row is the same as the size of the corresponding insulator cell 800 in the neighboring row. A reflective layer 890 may be located on a surface of the substrate 870 to make the scanner reflective. While FIG. 15 shows two pairs of rows, for a total of 4 rows, the number of rows may be any number, including any multiple of two rows or other arrangements.

In FIGS. 12-15, the light is initially propagating perpendicular to the substrate through the active cells, toward the discrete electrodes, or at some initial input angle to perpendicular. In FIGS. 12-15, the discrete electrodes can be either conductive or resistive. In the case of conductive discrete electrodes, only one voltage at the same time is applied on each discrete electrode and a reset will usually contain eight or more discrete electrodes in order to achieve 95% steering efficiency, or better, based on quantization loss. In case of resistive electrodes, two, or more, different voltages at the same time may be applied on each discrete electrode, and a reset may contain only one or more discrete electrodes. Moreover, in the embodiments depicted in FIGS. 12-15, the active cells are made of any transparent material whose refractive index can be changed by applying voltages on the discrete electrodes. Such transparent materials include but are not limited to EO crystals like PMN-PT, KTN, SBN, PBN, PZT, BaTiO$_3$, liquid crystals, and/or quantum dot materials.

Figure 16:
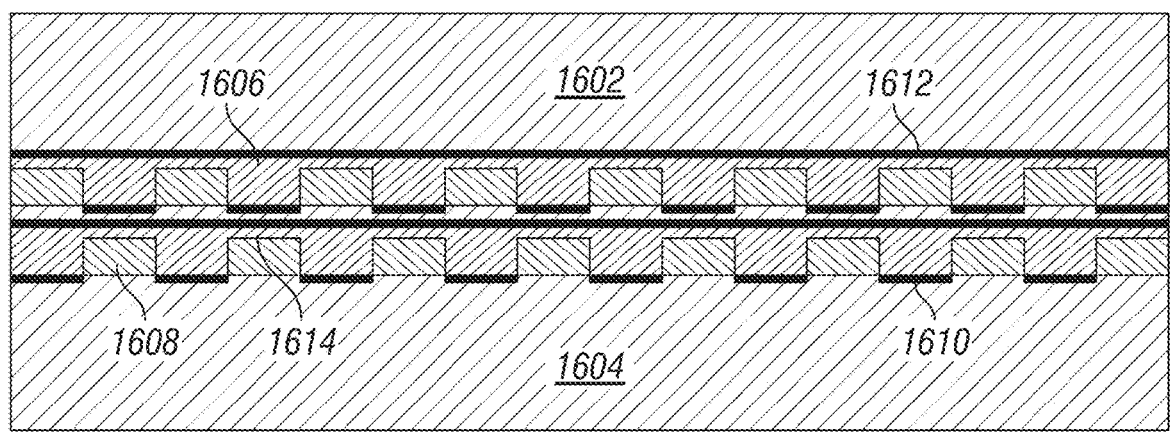
FIG. 16 depicts a two-layer embodiment having a common or continuous low-side electrode.

Referencing FIG. 16, an example embodiment of a beam steering device is depicted. The example of FIG. 16 includes two active layers, with an EO active material 1606 providing a number of active cells, each active cell positioned between one of a number of discrete high-side electrodes 1610 and a low-side electrode 1612 (depicted as a common ground electrode in the example of FIG. 16). The example beam steering device includes insulators 1608 positioned between each of the high-side electrodes 1610, and a substrate 1602, 1604 provided on each side of the active layer. The example of FIG. 16 may additionally include more active layers, and the substrate 1602, 1604 may be positioned between each active layer and/or book-end the active layers. The example of FIG. 16 is similar to a Chess Pattern beam steering device, with offset active cells in adjacent active layers, such that an incident EM beam passes through one or the other of the active layers. FIG. 16 includes a bridging portion 1614 of the EO active material 1606 across the insulation region (1608), which may provide for ramp smoothing of the progressive phase delay, and/or may provide for easier fabrication and/or improved mechanical properties of the beam steering device.

Figure 17:
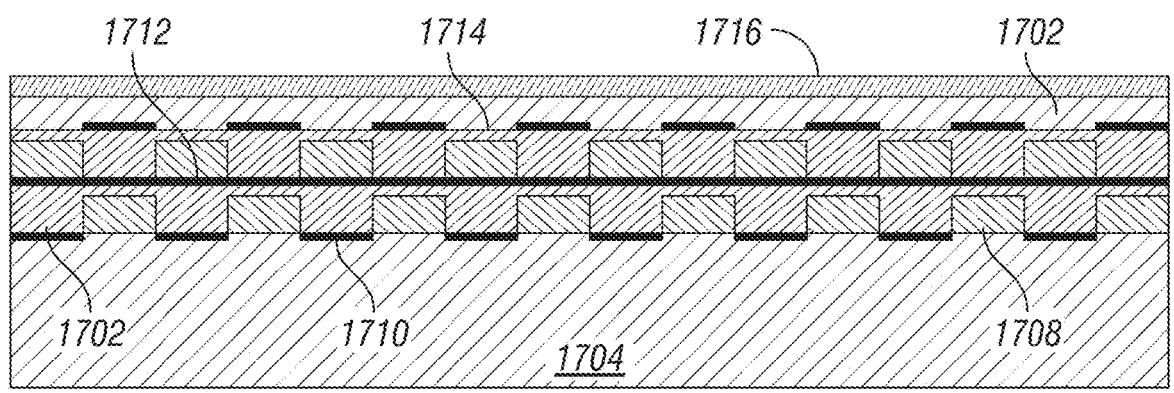
FIG. 17 depicts a two-layer embodiment having a shared common or continuous low-side electrode.

Referencing FIG. 17, an example embodiment of a beam steering device is depicted. The example of FIG. 17 includes two active layers, with an EO active material 1706 providing a number of active cells, each active cell positioned between one of a number of discrete high-side electrodes 1710 and a low-side electrode 1712 (a shared common ground electrode in the example of FIG. 17). The example beam steering device includes insulators 1708 positioned between each of the high-side electrodes 1710, and a substrate 1702, 1704 provided on each side of the active layer. The example of FIG. 17 further includes a reflective layer 1716. The example of FIG. 17 may additionally include more active layers, and the substrate 1702, 1704 may be positioned between each active layer and/or book-end the active layers. The example of FIG. 17 is similar to a Chess Pattern beam steering device, with offset active cells in adjacent active layers, such that an incident EM beam passes through one or the other of the active layers. FIG. 17 includes a bridging portion 1714 of the EO active material 1706 across the insulation region (1708), which may provide for ramp smoothing of the progressive phase delay, and/or may provide for easier fabrication and/or improved mechanical properties of the beam steering device.

Figure 18:
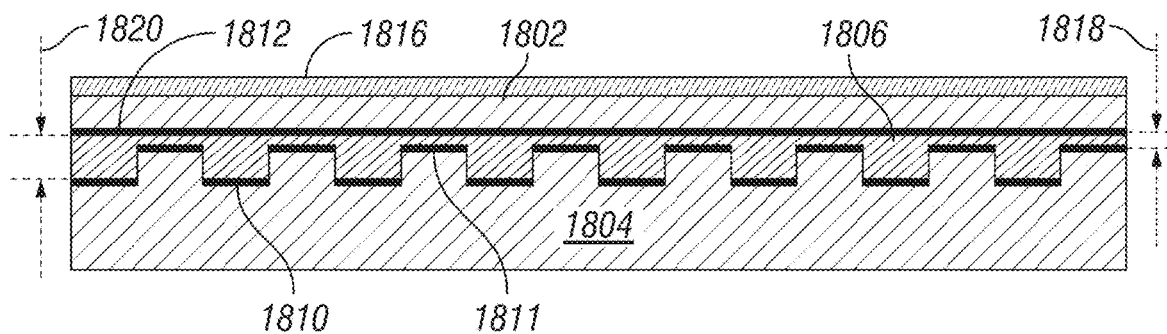
FIG. 18 depicts a single layer of active EO material having active cells with varying thicknesses and a common or continuous low-side electrode.

Referencing FIG. 18, an example embodiment of a beam steering device is depicted. The example of FIG. 18 includes one active layer providing approximately 100% fill efficiency within a single active layer. The example of FIG. 18 includes an EO active material 1806 providing a number of active cells, each active cell positioned between one of a number of discrete high-side electrodes 1810, 1811 and a low-side electrode 1812 (a common ground electrode in the example of FIG. 18). The example beam steering device includes a substrate 1804—in the example of FIG. 18, the substrate 1804 provides an insulating function for the active layer, and portions of the substrate 1804 positioned between high-side electrodes 1810 may be considered insulators as described throughout the present disclosure. The example of FIG. 18 further includes a substrate 1802 opposing the substrate 1804, and a reflective layer 1816 coupled to the substrate 1804. The example of FIG. 18 includes a number of active cells formed from a single active EO substrate 1806, having varying thicknesses 1818, 1820. An example beam steering device includes the first thickness 1818 being a wavelength of a target EM beam, one-half of a wavelength of the target EM beam (e.g., in embodiments having a reflective layer 1816), and/or being a discrete number of wavelengths and/or half wavelengths of the target EM beam. The example beam steering device further includes the second thickness 1820 being at least one-half wavelength greater than thickness 1818, or one full wavelength greater than thickness 1818. In certain embodiments, thickness 1818 is one wavelength ($\lambda$), and thickness 1820 is two wavelengths ($2\lambda$). In certain embodiments, the voltage applied across each active cell is adjusted to provide the desired phase delay profile, and/or the width of the active cells having varying thicknesses 1818, 1820 is varied to provide the desired phase delay profile. In certain embodiments, a beam scanner having two (or more) active thicknesses within a single active layer, such as depicted in FIG. 18, is described as a Castle Scanner and/or Castle Pattern. In certain embodiments, where resistive high-side electrodes 1810, 1811 are utilized with a Castle Pattern, such a beam scanner is described as a Castle Scanner Pro or a Castle Pattern Pro. The terminology of Castle Scanner or Castle Scanner Pro embodiments is used for convenience and clarity of the description herein. The example of FIG. 18 provides for a number of advantages in certain embodiments of the present disclosure, including a simplification of fabrication of the beam steering device, enhanced mechanical integrity of the beam steering device, and/or a smaller vertical footprint of the scanner (e.g., along the axis of propagation of the incident EM beam) for a given steering capability.

The present disclosure throughout provides for specific examples for clarity of description and to show the interoperability of various features of the disclosure. Embodiments described may be combined in whole or part, and/or certain described features may be omitted, according to the capabilities desired for a particular system. For example, resistive electrodes may be utilized for some or all of the high-side electrodes in any of the described embodiments. Active cell thicknesses may be progressed and may vary in any active layer, or between active layers, in any of the described embodiments. Insulators may be provided as an explicit device (e.g., as in FIG. 12 or 16) and/or may be included as an air gap or a substrate portion (e.g., as in FIG. 18). Low-side electrodes may be at any voltage value, including a baseline or zero reference voltage, any voltage lower than the high-side electrodes (during steering operations), and/or at a negative reference voltage. Electrodes may be provided as tilted or contoured electrodes in one or more portions of the beam steering device, or throughout the beam steering device. All or portions of the beam steering device may be provided as a Chess arrangement, a Castle arrangement, or any other arrangement described throughout the present disclosure.

The present disclosure describes active layers steering an incident EM beam. It is understood that the steering of the EM beam may be in a single direction (e.g., X or Y, azimuth or elevation, etc.) and/or for a single polarity of the EM beam, and that additional layers may be provided to include additional steering in other directions, in another polarity, and/or to provide incremental steering for the first direction and/or polarity.

Certain further example systems are described following. While certain example embodiments and figures of the present disclosure may be recited for clarity of the description, it will be understood that any of the systems, devices, techniques, or processes throughout the present disclosure may be incorporated into and/or performed by the described example systems. An example system includes a high-side electrode layer having a number of discrete electrodes, a low-side electrode layer, and an electro-optic (EO) layer including an EO active material at least partially positioned between the high-side electrode layer and the low-side electrode layer. The system thereby forms a number of active cells of the EO layer. The high-side electrode layer may be selectively energized (e.g., with a supplied voltage), including at selected voltage levels and/or with a voltage progression across the high-side electrode layer (or a stage of the high-side electrode layer), thereby providing a voltage differential progression across the active cells and a selected phase delay progression for an incident EM beam. Each of the number of active cells of the EO layer includes a portion of the EO layer positioned between 1) a first one of the number of discrete electrodes of the high-side electrode layer, and 2) the low-side electrode layer. In certain embodiments, an active cell may be discrete from other active cells (e.g., reference FIG. 5, 7, 9, or 10), and/or an active cell may form a portion of a continuous EO active material where the active cells are the portions of the material between the high-side discrete electrodes and the low-side electrode layer (e.g., reference FIG. 16, 17, or 18). In certain embodiments, for example where a number of steering layers of a beam steering device are included, an active cell may be considered an active cell for certain operating conditions or systems (e.g., where an active cell is only utilized for certain wavelengths of light and/or for certain steering angles), and not an active cell for other wavelengths of light. Accordingly, a system can be constructed that supports multiple wavelengths of incident EM beams, that supports flexible steering capability, and/or that can be configured for a number of common wavelengths, where a single beam steering device can then be configured after manufacture or even at run-time to support the steering requirements for the application. The example system includes an insulator operationally coupled to the active cells of the EO layer, and at least partially positioned between a first one of the active cells and a second one of the active cells. For example, insulators may be partially positioned between each active cell, positioned to completely separate each active cell, and/or have a range of insulating coverage in a given EO layer (e.g., to support increased insulation capability at a reset and/or to smooth the phase delay profile using the flyback effect in a configured manner). In certain embodiments, one or more active cells may not have insulators on one or more sides—for example a terminating active cell may not have an insulator on a side that does have an adjacent active cell, and/or the utilization of the flyback effect on one or more active cells may be desirable in certain instances as described in the present disclosure.

Certain further aspects of an example system are described following, any one or more of which may be present in certain embodiments. An example system includes the EO layer having at least six (6) active cells, at least eight (8) active cells, and/or between three (3) and twenty (20) active cells. As described in the present disclosure, the number of active cells utilized in a phase delay progression stage results in a change to the quantization efficiency, allowing for a configurable quantization efficiency value to support the goals of the system for a particular application. It can be seen that trade-offs between manufacturing constraints or costs, steering efficiency goals, and other parameters described herein and that are ordinarily available to one of skill in the art contemplating a particular system can be utilized to select the number of active cells in a phase delay progression stage. An example system includes the high-side discrete electrodes including conductive electrodes, resistive electrodes, or a combination of conductive or resistive electrodes. In certain embodiments, a given electrode can be configurable to be conductive or resistive, for example using a solid state device responsive to commands from a controller.

In certain embodiments, a system includes a selected number of the active cells of the EO layer structured to apply a progressive phase shift to an incident electro-magnetic (EM) beam, and/or where a next one of the active cells of the EO layer after the selected number of active cells is configured to reset the progressive phase shift of the incident EM beam by reducing the progressive phase shift by $2\pi$, and/or by $2\pi n$. In the example, the n includes a small positive integer value, for example between 1 and 10 inclusive. The selection of the n value results in certain configuration changes for the beam steering device, including a thickness of the EO active layer or portions of the EO active layer, and/or a voltage difference experienced within the beam steering device. In certain embodiments, a low n value provides for a very thin EO active layer with very low voltage differences in the device. In certain embodiments, even selecting a high n value provides for a thinner EO active layer and lower voltage differences in the beam steering device relative to previously known systems. For example, depending upon the wavelength of the incident EM beam to be steered and the optical characteristics of the EO active material, an n value exceeding 10 or even 20 can nevertheless keep device thicknesses below 20 μm (e.g., 700 nm infrared*20=14 μm), and voltages in a reasonable range below 100V. It will be seen that the achievable thickness for the EO active layer, at least in portions thereof, will be on the order of $n*\lambda$, or ½ of $n*\lambda$ (for a reflective system), and voltages will be determined by the maximum steering voltage prior to the reset. Example phase shift values for each progressive phase shift may be about $2\pi$, or $2\pi n$. For example, a phase delay progression stage may provide for a phase delay progression varying from 0 to $2\pi$ over the course of the stage. However, the phase delay progression stage may start at a value higher or lower than a 0 phase shift, and end with a value higher or lower than $2\pi n$ (e.g., ending before or after a 360° phase shift in the cycle). Example and non-limiting phase shift values for a phase delay progression stage include: a value between $1.5\pi n$ and $2.5\pi n$, a value between $1.8\pi n$ and $2.2\pi n$, a value between $1.9\pi n$ and $2.05\pi n$, a value of about $2\pi n$, and a value of $2\pi n$. A value of about $2\pi n$, and other phase delay approximations as described herein, include at least variations from $2\pi n$ (or another baseline value) that are close enough to support the desired steering efficiency for a given application (e.g., including as part of an error stack-up of multiple effects), a value that accommodates variation in manufacturing (e.g., EO layer thickness, surface profile, material variation, electrode variance, etc.) for the beam steering device such that the phase delay approximation is not the limiting error in the system, and/or a value that is within one significant digit of the nominal value (e.g., $1.9\pi n$ to $2.1\pi n$, where $2\pi n$ is the baseline value).

An example system includes where each of the number of insulators includes at least one of a size or a resistivity selected in response to a voltage difference value of the corresponding active cells of the EO layer, and/or where each one of the number of insulators positioned between a last one of the selected number of active cells and the next one of the active cells is a reset insulator, and where the reset insulator includes at least one of an increased insulation area or an increased resistivity value. For example, a non-linear EO active layer (e.g., non-linear optical response to an electric field) may result in increased voltage differences between active cells, which may be compensated with increased insulator capability at those positions. In another example, voltage differences at a reset position may be higher than between other active cell pairs in the system, which may be compensated with increased insulator capability at those positions. In certain embodiments, insulators may be capable of sufficiently isolating any voltage differences in the system—for example to provide for convenient manufacturing and/or to allow for configurability at design time or run-time.

An example system includes where the EO layer has a thickness of at least one wavelength corresponding to a target electro-magnetic (EM) frequency, and/or a thickness of one-half wavelength corresponding to the target EM frequency (e.g., for a reflective system). In certain embodiments, the EO layer includes a progressive thickness value, where a thickest portion of the progressive thickness value includes a thickness of at least one wavelength corresponding to a target electro-magnetic (EM) frequency. In certain embodiments, a configuration with tilted electrodes (e.g., reference FIG. 7) provides for an EO layer having a progressive thickness value, as the distance of the high-side electrode to the low-side electrode is varied across the active EO cell. An example system includes the EO layer including at least one material such as: an EO crystal, a crystal layer, multiple crystal layers, an EO crystal layer, multiple EO crystal layers, a liquid crystal, a polymer, a quantum dot device, a crystal that responds to an applied electric field with a linear change in an index of refraction, and/or a crystal that responds to an applied electric field with a quadratic change in an index of refraction.

An example system includes where the high-side electrode layer, the low-side electrode layer, and the EO layer together make up a first phase delay progression stage, and where the system further includes a second phase delay progression stage. The second phase delay progression stage includes: a second high-side electrode layer including a number of discrete electrodes; a second low-side electrode layer; a second EO layer including an EO active material at least partially interposed between the second high-side electrode layer and the second low-side electrode layer, thereby forming a number of active cells of the second EO layer. Each of the number of active cells of the second EO layer includes a portion of the second EO layer positioned between 1) a first one of the number of discrete electrodes of the second high-side electrode layer; and 2) the second low-side electrode layer. The example system further includes a second insulator operationally coupled to the active cells of the second EO layer, and at least partially positioned between a first one of the active cells and a second one of the active cells. In certain further aspects, an example system includes where the first phase delay progression stage and the second phase delay progression stage are configured to additively steer an incident electro-magnetic (EM) beam (e.g., where the incident EM beam first passes through the first phase delay progression stage, and then passes through the second phase delay progression stage). In certain embodiments, the first phase delay progression stage steers an incident electro-magnetic (EM) beam along a first axis, and where the second phase delay progression stage is configured to steer the incident EM beam along a second axis, where the first axis is distinct from the second axis. In certain embodiments, the first axis may be perpendicular to the second axis (e.g., first steering in a horizontal axis, and then in a vertical axis). It will be understood that the first and second steering axes may not be perpendicular, but may be selectively arranged for any steering configuration desired, and further it will be understood that the orientations of the first phase delay progression stage and the second phase delay progression stages may be changed, such that the axis of the stage and the steering axis of the incident EM beam is not the same for each of the steering layers. In certain embodiments, the first axis corresponds to a first polarization of the incident EM beam, and the second axis corresponds to a second polarization of the incident EM beam. In certain embodiments, the system includes a half wave plate layer interposed between the first phase delay progression stage and the second phase delay progression stage, where the half wave plate layer is structured to selectively rotate a polarization of the incident EM beam.

In certain embodiments, the low-side electrode layer includes a continuous electrode across all or a portion of the EO active layer, and/or that may be shared by adjacent EO active layers (e.g., as depicted in FIGS. 14 and 15). In certain embodiments, the low-side electrode layer may be at a ground voltage, a zero relative voltage, or another voltage lower than the high-side electrode layer. In certain embodiments, the low-side electrode layer voltage may be a negative relative voltage, and/or may be an adjustable voltage—for example where the low-side electrode layer voltage is pulled down during steering operations to a lower voltage value.

Certain embodiments include multiple EO layers (e.g., two or more EO layers), where the multiple EO layers cooperate to steer an incident EM beam in more than one axis (e.g., steering a first axis in a first layer, and a second axis in a second layer), to steer the incident EM beam in more than one polarity (e.g., steering a first polarity in a first layer, and a second polarity in a second layer), and/or to steer incident EM beams of more than one selected wavelength. In certain embodiments, steering incident EM beams of more than one selected wavelength may include configuring the active layers (e.g., using high-side electrodes responsive to a controller) to steer utilizing selected layer(s) from the multiple EO layers that are configured for a current incident EM beam wavelength, while leaving other layer(s) that are configured for other incident EM beam wavelengths inactive during the steering of the current incident EM beam wavelength. In certain embodiments, the system to steer incident EM beams with more than one wavelength includes operations to switch between steered wavelengths, including switching which incident EM beam wavelength is being directed through the beam steering device, and which layers of the multiple EO layers are currently active. In certain embodiments, switching frequencies may be high enough such that the target of the steered EM beam cannot distinguish that different EM beam wavelengths are being switched (e.g., where the target exhibits a capacitive aspect in absorbing steered EM energy). In certain embodiments, the switching is performed to utilize multiple wavelengths of steered EM beams, and the effect on the target, or noticeable by the target, is not a consideration.

Figure 19:
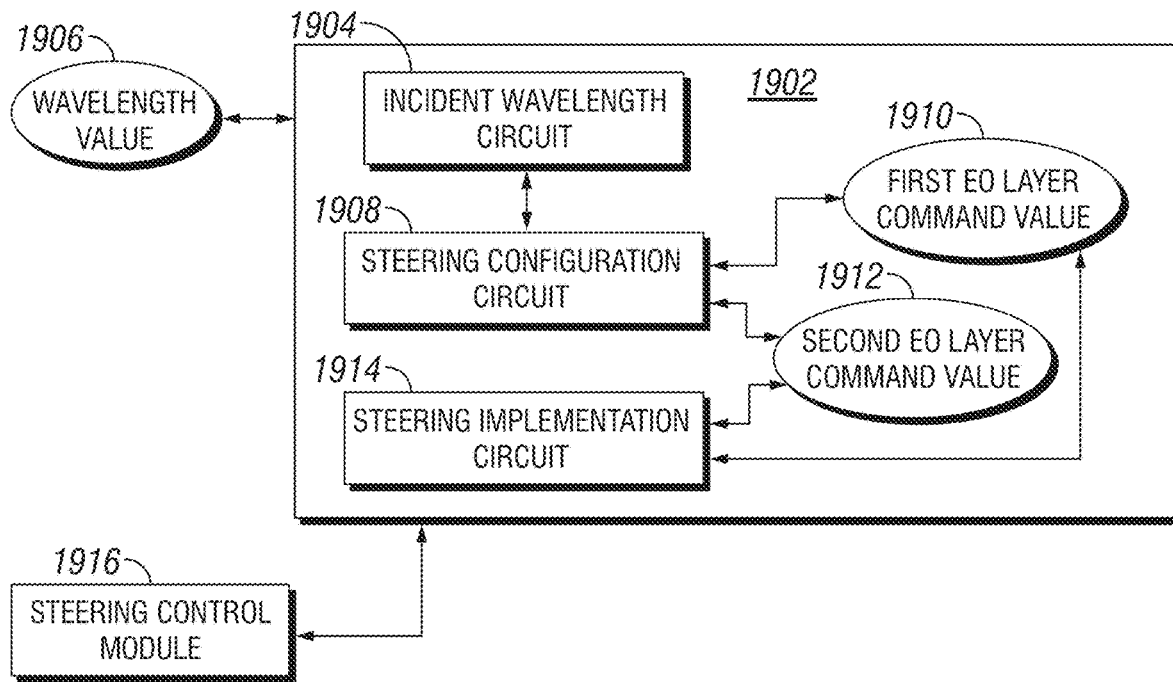
FIG. 19 is a schematic diagram of a controller for steering an incident EM beam.

Referencing FIG. 19, an example controller 1902 structured to perform certain operations for steering multiple EM wavelengths is schematically depicted. The controller 1902 is depicted as a single device for clarity of description, although aspects of the controller 1902 may be distributed across multiple devices, implemented in hardware and/or as instructions stored on a computer readable medium, as sensors or actuators present in the system, and/or through network communications and/or remote processing capabilities.

An example controller 1902 includes a number of circuits structured to functionally execute certain operations of the controller 1902. Certain operations are described in specific reference to FIG. 19, but any operations, procedures, or techniques throughout the present disclosure may be implemented by, or performed by, a controller such as controller 1902. The example controller 1902 includes an incident wavelength circuit 1904 that determines a wavelength value 1906 of an incident EM beam, a steering configuration circuit 1908 that determines a first EO layer command value 1910 and a second EO layer command value 1912 in response to the incident EM beam. A given system may include any number of EO layers, and/or an EO layer may be a logical arrangement of active cells within one or more physical layers, for example with an area of active cells distributed across multiple physical layers making up an EO layer. An EO layer command may include multiple commands to be provided to multiple electrodes, including voltage commands to high-side electrodes, and/or pull-down commands to low-side electrodes (e.g., where one or more low-side electrodes are pulled to a lower voltage during steering operations), such that a selected phase delay progression is provided across the EO layer when the EO layer commands are executed. In certain embodiments, EO layer commands further include a timing value that coordinates the EO layers—for example when the controller 1902 is steering multiple EM wavelengths in a sequenced and/or pulse-width modulated (PWM) operation. The example controller 1902 further includes a steering implementation circuit 1914 that provides at least one of the first EO layer command value 1910 or the second EO layer command value 1912 to a steering control module 1916.

Operations of the controller 1902 may be performed during run-time or design time, or a combination of these. For example, where the wavelength of the incident EM beam to be steered is predetermined, operations of the incident wavelength circuit 1904 may be performed at design time, for example in the material selection and configuration of active cells, the geometry of active cells, the thickness of the EO layer, the utilization (or not) of a reflective layer, the selected parameters for insulators, and the design voltages of the electrodes (high-side and/or low-side). In the example, the EO layer commands 1910, 1912 may be predetermined for the selected wavelength, and the operations of the steering configuration circuit 1908 include providing a lookup of the EO layer commands 1910, 1912 (e.g., considering the wavelength value 1906, the configurations of one or more EO layers in the system, and/or the amount and direction of steering that is commanded). In the example, the steering implementation circuit 1914 provides the EO layer commands 1910, 1912 to the steering control module 1916 when the incident EM beam is active, during selected operating periods, and/or continuously. In the example, the steering control module 1916 controls the electrode voltages to implement the EO layer commands 1910, 1912 in response to the commands provided by the steering implementation circuit 1914.

In another example, such as when the wavelength of the incident EM beam is configurable, selectable, and/or varies after initial construction of the beam steering device (e.g., to support multiple steering configurations with a single hardware device, and/or to steer multiple EM beam wavelengths with a single hardware device), one or more operations of the incident wavelength circuit 1904 may be performed at run-time. In the example, the incident wavelength circuit 1904 determines the wavelength value 1906 at run-time, for example using any sensing technique known in the art, and/or by determining that another system parameter is indicating that a particular wavelength value 1906 is being utilized (e.g., a network parameter, a parameter provided by another controller, an active state of a particular EM source, or the like). In the example, the steering configuration circuit 1908 determines the EO layer commands 1910, 1912 (e.g., considering the wavelength value 1906, the configurations of one or more EO layers in the system, and/or the amount and direction of steering that is commanded). In the example, the steering control module 1916 controls the electrode voltages to implement the EO layer commands 1910, 1912 in response to the commands provided by the steering implementation circuit 1914.

Certain examples of operations of the controller 1902 are provided for clarity of the present description. It will be understood that operations of the controller 1902 may be provided in any combination of design-time and/or run-time operations, and further that operations of the controller 1902 may be adjusted in response to the operating conditions of the system, a change in the application of the beam steering device including the controller 1902 (e.g., a change in the steered wavelength, a change in the desired steering capability, and/or a change in the timing of multiple-layer steering operations), and/or in response to a change in a hardware configuration of the beam steering device (e.g., a change in the EO layer, voltages of the system, and/or a wavelength of an EM source).

An example steering control module 1916 provides selected voltages to at least one of the first high-side electrode layer or the second high-side electrode layer in response to the at least one of the first EO layer command value 1910 or the second EO layer command value 1912. An example steering control module 1916 further includes a solid state circuit that applies selected voltages to each electrode of the first high-side electrode layer and the second high-side electrode layer. An example solid state circuit further selectively couples a power source to each electrode of the first high-side electrode layer and the second high-side electrode layer, and/or selectively couples the power source using a pulse-width modulation (PWM) operation. In certain embodiments, a steering control module 1916 includes hardware elements configured to execute operations to implement the EO layer command values 1910, 1912, for example solid state switches that are responsive to commands from the steering implementation circuit 1914. In certain embodiments, the steering control module 1916 may be a smart controller, structured to provide commands to implement the EO layer command values 1910, 1912 as provided by the steering implementation circuit 1914. In certain embodiments, aspects of the steering control module 1916 may be implemented on the controller 1902. Accordingly, it will be seen that the EO layer command values 1910, 1912 may vary, from low-level hardware commands (e.g., ON/OFF, or a voltage value sourced from or switched from the controller 1902) to high-level steering commands (e.g., steer 5 degrees in the X axis with EO layer 2, and 7 degrees in the Y axis with EO layer 3), combinations of these, and/or intermediate parameters between these (e.g., voltage values indicating an amount of steering and/or a layer to be controlled, simple state values which the steering control module 1916 is configured to be responsive to, or the like). In certain embodiments, the steering control module 1916 may receive the EO layer command values 1910, 1912 as physical values (e.g., voltages, frequencies, pressures, or another physical value), as network communicated parameters from the controller 1902, and/or as parameters retrieved from the controller 1902 memory by the steering control module 1916 (e.g., in a selected memory location that is populated by the steering implementation circuit 1914). The example steering control module 1916 hardware and operational examples are non-limiting, and provided for clarity of the present description.

An example system includes an EO substrate layer including an EO active material and further including a number of thin elements alternating with a number of thick elements, a high-side electrode layer including a number of discrete electrodes, each of the number of discrete electrodes associated with one of the number of thick elements and positioned on a first side of the EO substrate layer, and a low-side electrode layer positioned on a second side of the EO substrate layer. The example system further includes an insulator layer operationally coupled to the EO substrate layer, and at least partially positioned between each of the number of thick elements. In certain embodiments, the thin elements may additionally be active cells (e.g., reference FIG. 18), or the thin elements may not be active cells (e.g., reference FIG. 16). Where the thin elements are active cells, the thin elements may have a thickness of at least ½ λ (e.g., with a reflective layer) or a thickness of at least λ (e.g., with no reflective layer). In certain embodiments, the thick elements have a thickness of at least ½ λ more than the thin elements (e.g., with a reflective layer) or a thickness of at least λ more than the thin elements. It will be seen that the thickness between the thin elements and the thick elements may be varied—for example when the thick elements are a part of a first active layer (e.g., cooperating with active cells in another physical layer of the beam steering device to provide beam steering of the incident EM beam) and the then elements are a part of a second active layer (e.g., cooperating with active cells in another physical layer of the beam steering device to provide beam steering of the incident EM beam), such that no particular relationship between the thin elements and the thick elements is required. In certain embodiments, such as when the thin elements and the thick elements cooperate to form an active layer of the beam steering device, the thickness of the thick elements and the thin elements may vary by a multiple of λ or ½ λ. An example system includes both the thin elements and the thick elements having active cells, with the thin elements having a thickness of λ and the thick elements having a thickness of 2λ. In certain embodiments, a thick element of a first physical layer may be thinner than a thin element of a second physical layer.

An example system includes a number of the EO substrate layers, where each of the number of thin elements includes a thickness of x wavelengths corresponding to a target electro-magnetic (EM) frequency, where each of the number of thick elements includes a thickness of y wavelengths corresponding to the target EM frequency, where each of x and y comprise integer values, and where the y value for each of the number of thick elements is at least one greater than the x value for an adjacent one of the number of thin elements. In certain embodiments, the x value is one (1), and/or the y value is two (2). In certain embodiments, a first one of the number of thick elements includes a y value that is smaller than an x value for a first one of the number of thin elements, for example where the first one of the number of thick elements is not adjacent to the first one of the number of thin elements. In certain embodiments, the first one of the number of thick elements is in a different one of the number of EO substrate layers as the first one of the number of thin elements. In certain embodiments, for example where multiple physical layers are provided to steer different target EM frequencies, the λ value for a first layer (e.g., used to determine the thickness of thick and thin elements for a first active layer) is different than a λ value for a second layer.

An example system includes an EO substrate layer including an EO active material, and further including a number of active elements. The example system includes adjacent ones of the number of active elements having a thickness value varying by at least one wavelength corresponding to a target electro-magnetic (EM) frequency. The example system further includes a high-side electrode layer including a number of discrete electrodes, each of the number of discrete electrodes associated with one of the number of active elements and positioned on a first side of the EO substrate layer; a low-side electrode layer positioned on a second side of the EO substrate layer; and an insulator layer operationally coupled to the EO substrate layer, and at least partially positioned between geometric gaps of the number of active elements.

Certain further aspects of an example system are described following, any one or more of which may be present in certain embodiments. An example system includes where the number of discrete electrodes are resistive electrodes; a number of the EO substrate layers, and where two adjacent ones of the number of the EO substrate layers share a low-side electrode layer; where a terminating one of the number of EO substrate layers is associated with a reflective low-side electrode layer; and/or where the number of EO substrate layers are arranged such that a perpendicular line through the number of the EO substrate layers passes through a configured thickness of the active elements of the number of the EO substrate layers, the configured thickness including a thickness selected to apply a progressive phase shift to an incident EM beam.

In certain embodiments, EO active layers having thick and thin elements are referenced as a castle configuration herein. In certain embodiments, a castle configuration includes both the thick and thin elements making up active cells of the beam steering device (e.g., having an associated discrete high-side electrode). In certain embodiments, a castle configuration includes adjacent physical layers of the beam steering device having alternating thick and thin elements, such as that depicted in FIG. 16. In certain embodiments, a beam steering device in a castle configuration having one or more resistive high-side electrodes may be referenced as a castle pro configuration herein.

An example system includes a first EO layer including an EO active material, and further including: a first number of active elements; a second EO layer including the EO active material, and further including a second number of active elements; a first high-side electrode layer including a first number of discrete electrodes, each of the first number of discrete electrodes associated with one of the first number of active elements and positioned on a first side of the first EO layer; a second high-side electrode layer including a second number of discrete electrodes, each of the second number of discrete electrodes associated with one of the second number of active elements and positioned on a first side of the second EO layer; and a low-side electrode arrangement such as: a first low-side electrode layer positioned on a second side of the first EO layer and a second low-side electrode layer positioned on a second side of the second EO layer; a low-side electrode layer positioned on a second side of the first EO layer and further positioned on a second side of the second EO layer; and a number of low-side electrodes, each positioned on a second side of the first EO layer or a second side of the second EO layer. In the example system, each active element of the first number of active elements and the second number of active elements has an associated one of the number of low-side electrodes. The example system further includes where the first EO layer and the second EO layer are arranged such that the first number of active elements are not aligned with the second number of active elements. For example, and without limitation, FIGS. 12-15 depict example systems having such an arrangement.

An example system further includes: a first number of insulating elements, each of the first number of insulating elements positioned between adjacent ones of the first number of active elements; a second number of insulating elements, each of the second number of insulating elements positioned between adjacent ones of the second number of active elements; and/or an insulator layer operationally coupled to the second EO layer, and having a number of insulating portions extending at least partially between each of the second number of active elements. An example system further includes: at least one additional EO layer including an additional number of active elements; at least one additional high-side electrode layer corresponding to each of the at least one additional EO layers, each of the at least one additional high-side electrode layers including an additional number of discrete electrodes, each of the additional number of discrete electrodes associated with one of the additional number of active elements and positioned on a first side of the corresponding additional EO layer. In a further example, the low-side electrode arrangement further includes one of: an additional low-side electrode layer or a number of additional low-side discrete electrodes; such that each of the additional number of active elements is operationally coupled to a low-side electrode on a second side of the corresponding additional EO layer. An example system further includes a number of the additional EO layers, and may further include: where alternating adjacent pairs of the EO layers each share one of the low-side electrode layers; where the first EO layer, the second EO layer, and the at least one additional EO layer are arranged such that a perpendicular line through all of the EO layers passes through an equal thickness of active elements (and/or selected active elements corresponding to intended steering elements for a particular target EM frequency or wavelength) of all of the EO layers; where the first EO layer, the second EO layer, and the at least one additional EO layer are arranged such that a perpendicular line through all of the EO layers passes through a configured thickness of the active elements (and/or selected active elements corresponding to intended steering elements for a particular target EM frequency or wavelength) of all of the EO layers, the configured thickness including a thickness selected to apply a progressive phase shift to an incident electro-magnetic (EM) beam; and/or where a terminating one of the first EO layer, the second EO layer, or the at least one additional EO layer is associated with a reflective low-side electrode layer.

In certain embodiments, EO active layers having alternating active cells are referenced as a chess configuration herein. In certain embodiments, a chess configuration includes adjacent physical layers of the beam steering device alternating such that an incident EM beam passes through one or the other of the active cells from one of the EO active layers. In certain embodiments, a chess configuration includes active cells from adjacent layers being sized the same (e.g., thickness, width, or both). In certain embodiments, a beam steering device in a chess configuration having one or more resistive high-side electrodes may be referenced as a chess pro configuration herein.

Figure 20:
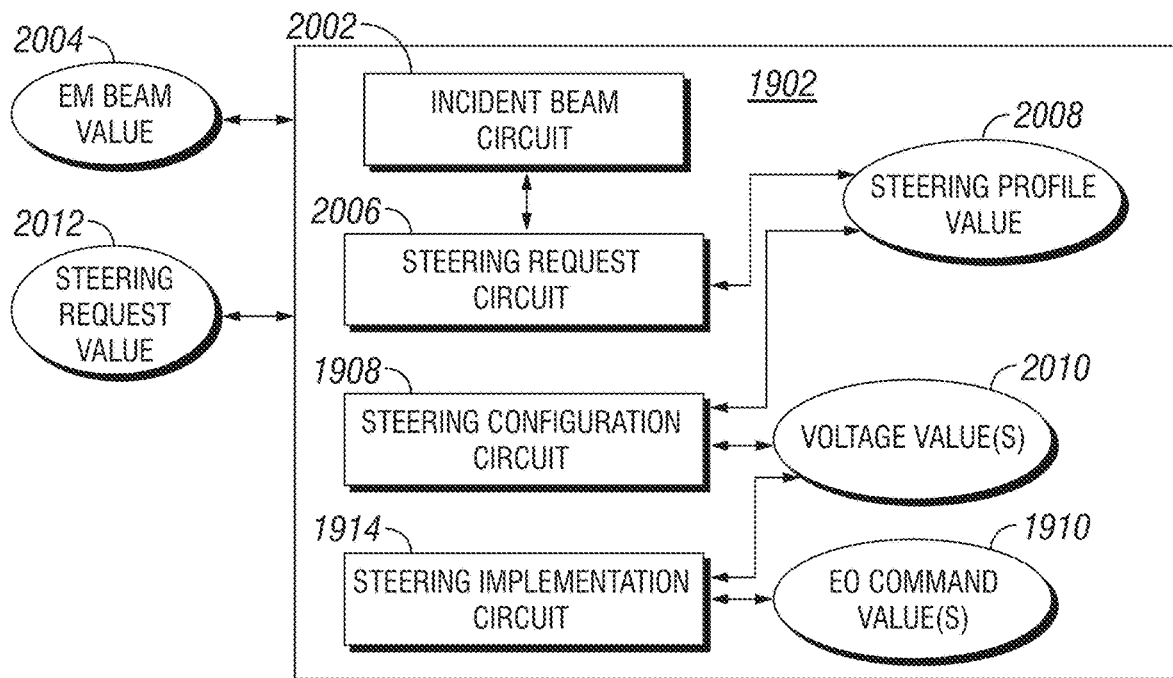
FIG. 20 is a schematic diagram of another embodiment of a controller for providing EM beam steering commands.

Referencing FIG. 20, an example apparatus 1902 includes an incident beam circuit 2002 that interprets an EM beam value 2004 (e.g., a wavelength and/or frequency of an incident EM beam to a beam steering device), a steering request circuit 2006 that interprets a steering profile value 2008, and a steering configuration circuit 1908 that determines a number of voltage values 2010 in response to the steering profile value 2008. In certain embodiments, the steering request circuit 2006 determines the steering profile value 2008 in response to the EM beam value 2004 and/or a steering request value 2012. An example steering profile value 2008 includes steering instructions (e.g., wavelengths and/or polarities to be steered, and a steering direction that may be determined in response to a steering target location and/or a steering amount). An example steering configuration circuit 1908 determines the number of voltage values 2010 in response to the steering profile value 2008—for example determining voltage values 2010 that provide configurations of active cells of a beam steering device to steer an incident EM beam in a manner consistent with the steering profile value 2008.

In certain embodiments, the number of voltage values 2010 correspond to a number of active cells of an EO material, where the number of voltage values 2010 include at least one progressive voltage value and a voltage reset value (e.g., a voltage trajectory across one or a number of active cells, and a voltage reset value that resets at each active cell and/or after a selected number of active cells). The example apparatus 1902 further includes a steering implementation circuit 1914 that provides an EO command value 1910 in response to the number of voltage values 2010.

Certain further aspects of an example apparatus are 1902 described following, any one or more of which may be present in certain embodiments. An example apparatus 1902 includes where the voltage reset value includes a voltage adjustment between two adjacent ones of the number of active cells to apply a $2\pi n$ phase shift between a first one of the adjacent ones of the active cells and a second one of the adjacent ones of the of active cells, where n includes a small positive integer value. An example steering profile value 2008 includes: a target location for an EM beam; a target steering angle for an EM beam; a first target steering angle for a first steering axis for an EM beam and a second target steering angle for a second steering axis for the EM beam; and/or any of the foregoing for a selected polarity of the EM beam. An example EM beam value 2004 includes at least one EM beam value such as: a wavelength value of an incident EM beam, a presence of an incident EM beam, and a characteristic of an incident EM beam (e.g., a polarity, energy level, timing value, incident angle, or the like). An example apparatus 1902 includes the steering configuration circuit 1908 further determining the number of voltage values 2010 for a number of layers of active cells of the EO material. In certain embodiments, the steering implementation circuit 1914 provides the EO command value(s) 1910 to a device to implement the beam steering, for example to a steering control module 1916.

The following descriptions reference schematic flow diagrams and schematic flow descriptions for certain procedures and operations according to the present disclosure. Any such procedures and operations may be utilized with and/or performed by any systems of the present disclosure, and with other procedures and operations described throughout the present disclosure. Any groupings and ordering of operations are for convenience and clarity of description, and operations described may be omitted, re-ordered, grouped, and/or divided, in whole or part, unless explicitly indicated otherwise.

Referencing FIG. 21, an example procedure 2100 includes an operation 2102 to receive an incident electromagnetic (EM) beam at a multi-layer beam steering device, an operation 2104 to determine a wavelength value of the incident EM beam, and an operation 2106 to selectively steer the EM beam with a first layer or a second layer of the multi-layer beam steering device in response to the determined wavelength value of the incident EM beam.

Certain further aspects of an example procedure are described following, any one or more of which may be present in certain embodiments. An example procedure further includes the operation 2106 to selectively steer by: applying selected voltages to a selected one of the first layer or the second layer, applying a voltage gradient across the selected one of the first layer or the second layer, and/or by applying resets at selected intervals across the selected one of the first layer or the second layer. An example procedure further includes an operation 2108 to determine a selection frequency of interest, and an operation 2110 to alternate the wavelength value of the incident EM beam at a frequency at least equal to the selection frequency of interest.

Referencing FIG. 22, an example procedure 2200 includes an operation 2102 to receive an incident electromagnetic (EM) beam at a number of active cells of an electro-optic (EO) material; an operation 2202 to apply a voltage to the number of active cells, thereby selectively adjusting an optical characteristic of each of the number of active cells; and an operation 2204 to reset a voltage between at least two adjacent ones of the number of active cells, thereby steering the incident EM beam. In certain embodiments, the number of active cells between reset operations 2204 is a single active cell—for example where resistive high-side electrodes, tilted electrodes, and/or other configurations described throughout the present disclosure provide for a configuration where a voltage gradient can be applied across a single active cell. In certain embodiments, even where a voltage gradient can be applied across a single active cell, the operation 2204 to reset the voltage may be performed after a number of active cells greater than one (1) cell, for example, where a voltage gradient is continued into a second cell (e.g., to reduce the number of resets across the beam steering device, to keep a voltage gradient across a single cell below a selected value, to keep a voltage gradient across a single cell within a linear or other selected region for a conductive resistor, etc.).

Certain further aspects of an example procedure 2200 are described following, any one or more of which may be present in certain embodiments. An example procedure includes the operation 2204 to reset the voltage including one or more of: resetting the voltage by an amount to apply a $2\pi$ phase shift between a first one of the number of active cells and an adjacent second one of the number of active cells; resetting the voltage by an amount to apply a $2\pi n$ phase shift between a first one of the number of active cells and an adjacent second one of the number of active cells, where n includes a small positive integer value; and/or resetting the voltage to a value applying a negative phase shift. An example procedure 2200 further includes operation 2202 to apply the voltage to the number of active cells to: apply a progressive phase shift to the incident EM beam; and/or to apply the progressive phase shift by applying progressive voltages to adjacent ones of the number of active cells, and resetting the progressive voltages at selected intervals of the number of active cells. In certain embodiments, the selected intervals of the number of active cells between resets include at least six (6) of the number of active cells in each of the selected intervals. In certain embodiments, operation 2202 to apply the voltage to the number of active cells includes: applying a uniform voltage to each of the number of active cells, and further applying a distinct uniform voltage to adjacent ones of the number of active cells; applying a voltage gradient to each of the number of active cells; and/or applying a distinct voltage gradient to adjacent ones of the number of active cells.

An example procedure 2200 further includes an operation 2206 to insulate a first high side electrode corresponding to a first one of the number of active cells from a second high side electrode corresponding to a second one of the number of active cells, where the first one of the number of active cells is adjacent to the second one of the number of active cells. In certain embodiments, the operation 2206 includes enhancing the insulating in response to the first one of the number of active cells and the second one of the active cells including the at least two of the number of active cells corresponding to the resetting the voltage (e.g., providing enhanced insulating between a final active cell of a first progressive phase delay stage having a maximum phase shift/voltage, and an initial active cell a second progressive phase delay stage having a minimum phase shift/voltage). An example procedure 2200 further includes an operation 2208 to steer the incident EM beam in a first axis, thereby providing a first axis steered EM beam. In certain embodiments, the procedure 2200 further includes an operation 2210 to determine whether additional axes and/or additional polarities of the incident EM beam are to be steered, and to repeat operations 2102, 2202, 2204, and 2206, thereby steering the in a second axis and/or a second polarity. For example, procedure 2200 further includes, in response to operation 2210 determining YES, an operation 2102 to receive the first steered EM beam (e.g., from a previous iteration of procedure 2200) at a second number of active cells of the EO material, an operation 2202 to apply a voltage to the second number of active cells, thereby selectively adjusting an optical characteristic of each of the second number of active cells; and/or an operation 2204 to reset a voltage between at least two adjacent ones of the second number of active cells, thereby steering the incident EM beam in a second axis (and/or second polarity) distinct from the first axis (and/or first polarity). In certain embodiments, procedure 2200 further includes an operation 2206 to insulate a first high side electrode corresponding to a first one of the second number of active cells from a second high side electrode corresponding to a second one of the second number of active cells, where the first one of the second number of active cells is adjacent to the second one of the second number of active cells. It can be seen that the operations of the example procedure 2200 provide a two-axis steered and/or two-polarity steered EM beam.

Figure 23:
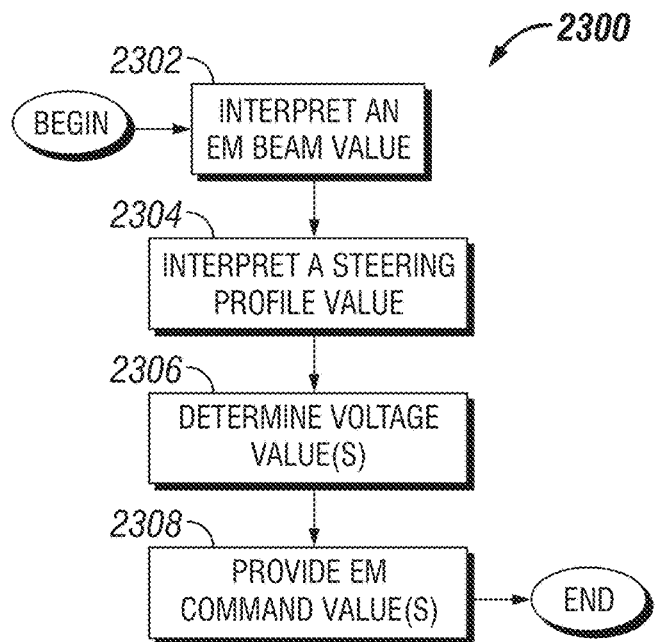
FIG. 23 is a schematic flow diagram of a procedure for steering an incident EM beam.

Referencing FIG. 23, an example procedure 2300 includes an operation 2302 to interpret an electro-magnetic (EM) beam value, an operation 2304 to interpret a steering profile value, and an operation 2306 to determine a number of voltage values in response to the steering profile value. The number of voltage values correspond to a number of active cells of an EO material, and the number of voltage values include at least one progressive voltage value and a voltage reset value. In certain embodiments, progressive voltage values may be within an active cell, and/or stepped between active cells. The example procedure 2300 further includes an operation 2308 to provide an EO command value in response to the number of voltage values.

Certain further aspects of an example procedure are described following, any one or more of which may be present in certain embodiments. An example procedure 2300 further includes: where the voltage reset value includes a voltage adjustment between two adjacent ones of the number of active cells to apply a $2\pi n$ phase shift between a first one of the adjacent ones of the active cells and a second one of the adjacent ones of the of active cells, where n includes a small positive integer value. An example steering profile value includes a target location for an EM beam and/or a target steering angle for the EM beam; where the steering profile value includes a first target steering angle for a first steering axis for an EM beam and a second target steering angle for a second steering axis for the EM beam; where the steering profile value includes a first target steering angle for a first polarity of the EM beam and a second target steering angle for a second polarity of the EM beam; and/or where the EM beam value includes at least one EM beam value such as: a wavelength value of an incident EM beam, a presence of an incident EM beam, and a characteristic of an incident EM beam. An example procedure 2300 further includes the operation 2306 to determine the number of voltage values for a number of layers of active cells of the EO material.

Figure 24:
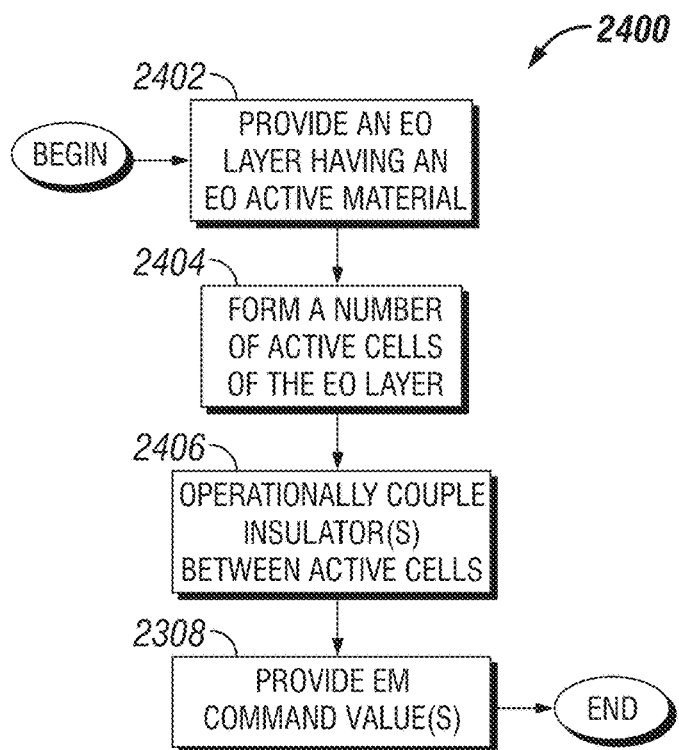
FIG. 24 is a schematic flow diagram of a procedure for making and using an EM beam steering device.

Referencing FIG. 24, an example procedure 2400 includes an operation 2402 to provide an EO layer including an EO active material, and an operation 2404 to form a number of active cells of the EO layer, where the forming includes: operationally coupling a high-side electrode layer including a number of discrete electrodes to a first side of the EO layer; and operationally coupling a low-side electrode layer to a second side of the EO layer. The example procedure 2400 further includes an operation 2406 to operationally couple an insulator to the number of active cells of the EO layer, where the insulator is at least partially positioned between a first one of the active cells and a second one of the active cells.

Certain further aspects of an example procedure 2400 are described following, any one or more of which may be present in certain embodiments. An example procedure 2400 further includes: operation 2402 including providing the EO layer in a castle configuration; operation 2402 including providing a number of EO layers in a chess configuration; operation 2404 including operationally coupling the high-side electrode layer by providing the number of discrete electrodes as resistive electrodes; operation 2404 including operationally coupling the high-side electrode layer by providing the number of discrete electrodes as tilted electrodes; and/or operation 2404 including operationally coupling the high-side electrode layer by providing the number of discrete electrodes as electrodes having a selected geometric arrangement. An example procedure 2400 further includes: operation 2402 including providing the EO layer by providing a number of EO layers, and operation 2404 further including forming the number of active cells of the EO layer by operationally coupling each one of a number of high-side electrode layers to a corresponding one of the number of EO layers; and/or operation 2404 further including forming the number of active cells of the EO layer by operationally coupling a low-side electrode layer such that the low-side electrode layer is shared by adjacent ones of the number of EO layers. An example procedure 2400 further includes: operation 2402 further including providing the EO layer by utilizing a contiguous substrate of the EO material for the EO layer; operation 2406 further including operationally coupling the insulator by utilizing a contiguous substrate of insulator material for the insulator; operation 2404 further including operationally coupling the low-side electrode layer by utilizing a reflective low-side electrode layer; operation 2404 further including operationally coupling the high-side electrode layer by providing the number of discrete electrodes as resistive electrodes having a selectable resistance profile; and/or operation 2404 further including providing the number of discrete electrodes as resistive electrodes having a selectable resistance profile by providing the number of discrete electrodes as solid state electrodes.

Figure 25:
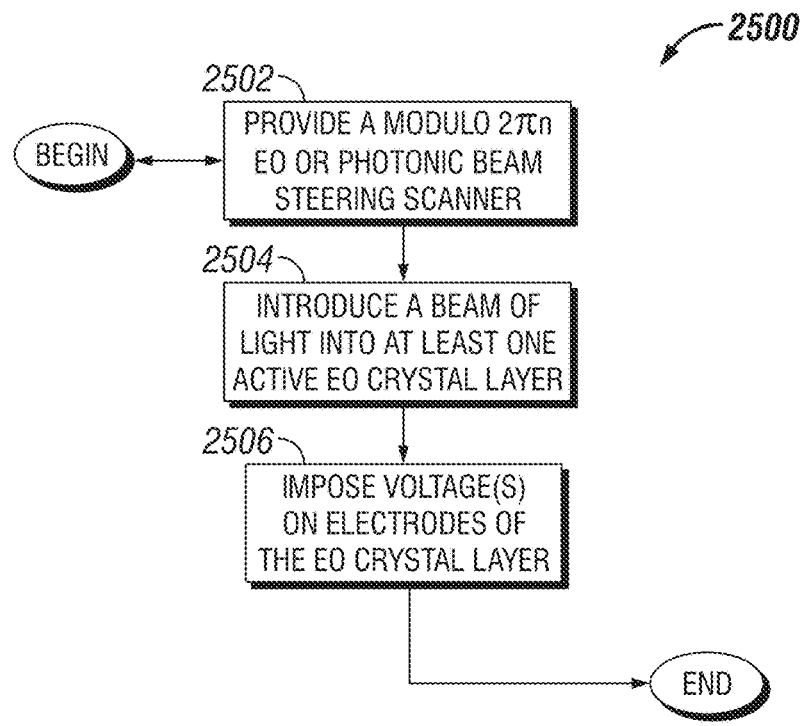
FIG. 25 is a schematic flow diagram of a procedure for operating an EM beam steering device.

Referencing FIG. 25, an example procedure 2500 for implementing an improved modulo $2\pi n$ electro-optical or photonic beam steering scanner includes an operation 2502 to provide a modulo $2\pi n$ electro-optical or photonic beam steering scanner, an operation 2504 to introducing a beam of light to at least one active EO crystal layer of the scanner, and an operation 2506 to impose one or more voltages on conductive or resistive discrete electrodes of the scanner to change an index of refraction sufficient to cause an OPD change to the beam of light traveling through the scanner.

Without limitation to any other aspect of the present disclosure; a first example improved modulo $2\pi n$ electro-optical or photonic beam steering scanner usable with procedure 2500 includes at least one active EO layer having a first side and an opposing second side; at least one conductive or resistive discrete electrode, arranged along the first side; at least one ground electrode arranged along the second side, and at least one insulator arranged to extend at least partially into the active EO layer; and a second example improved modulo $2\pi n$ electro-optical or photonic beam steering scanner usable with procedure 2500 includes at least two active rows arranged between two substrates, the substrates transparent to an incoming optical or photonic wave, each active row having a first side and an opposing second side, where each active row includes at least two active cells separated by at least one insulator cell, at least one ground electrode arranged between two of the at least two active rows; each of the at least two active rows having at least one discrete conductive or resistive electrode arranged along the first side or second side of each active row opposite the at least one ground electrode; and where an arrangement of the at least two active cells and insulator cells in one of the at least two active rows is opposite to the arrangement of the at least two active cells and insulator cells in the other of the at least two active rows.

Certain aspects of the present disclosure are set forth as a means for steering an incident EM beam on a beam steering device without mechanically moving parts. Without limitation to any other aspect of the present disclosure, certain examples of a means for steering an incident EM beam on a beam steering device without mechanically moving parts are described following. An example system includes a number of active cells of an EO active material formed between a number of discrete high-side electrodes and low-side electrode(s), where the low-side electrodes may be continuous, discrete, or a combination of those. The example system further includes the high-side electrodes being either conductive, resistive, or a combination of those. The example system further includes insulating elements positioned at least partially between adjacent active cells, and/or further includes insulating elements configured with insulation capability configured for a voltage differential between the adjacent active cells. Example and non-limiting insulating elements include: electrically insulating materials, geometric arrangements that provide for distance between adjacent high-side electrodes (e.g., a castle and/or a chess arrangement), a dielectric material, and/or an air gap. An example system includes high-side electrodes that have one or more of the following features: a configurable conductivity/resistance profile, and/or a tilt or other geometric progression across one or more of the active cells. An example system includes a number of layers of EO active material, where each layer is configured to steer an incident EM beam, and/or where two or more layers cooperate together to steer the incident EM beam. An example system includes the EO active material including one or more of: EO crystals, liquid crystals, and/or quantum dot materials; and/or where the EO crystals include a material such as PMN-PT, KTN, SBN, PBN, PZT, and/or $BaTiO_3$. An example system includes a reflective layer provided on a low-side electrode layer and/or on a substrate layer. An example system includes real-time control of the voltages of the high-side electrodes, thereby steering the EM beam to a selected angle, and/or controlling one or more selected ones of an axis of steering, a polarity of steering, and/or steering a wavelength of interest. An example system includes active cells of the EO active material having a thickness of ½ $\lambda$, $\lambda$, not greater than 2$\lambda$, not greater than 5$\lambda$, not greater than OX, and/or not greater than 100$\lambda$, where $\lambda$ corresponds to wavelength of interest for a selected EM beam to be steered. An example system includes one or more of an insulator, an electrode (high-side and/or low-side), a substrate, and/or an active EO material having a similar optical characteristic. An example system includes providing a phase delay progression across one or more active cells of the EO active layer, and resetting the phase delay progression at selected active cells of the EO active layer. An example system includes resetting the phase delay progression by a value of about 2$\pi$n. An example system includes resetting the phase delay progression to a value of zero phase delay, to a value of about zero phase delay, and/or to a value below a zero phase delay. An example system includes providing a number of steps in the phase delay progression stage to improve a quantization steering efficiency of the beam steering device. An example system includes utilizing selected flyback effects in a staged beam steering device to smooth the phase delay profile of the beam steering device.

Certain aspects of the present disclosure are set forth as a means for steering an incident EM beam in two distinct axes. Without limitation to any other aspect of the present disclosure, certain examples of a means for steering an incident EM beam in two distinct axes are described following. An example system includes steering the incident EM beam in a first axis with a first active EO layer, and steering the incident EM beam in a second axis with a second active EO layer. An example system includes either one or both of the first active EO layer and the second active EO layer being distributed across more than one physical layer of active cells. An example system includes active cells of the first active EO layer sharing a physical layer of active cells with active cells of the second active EO layer. An example system includes a means for steering the incident EM beam in two distinct polarities in a similar manner to means for steering the incident EM beam in two distinct axes.

Certain aspects of the present disclosure are set forth as a means for steering at least two incident EM beams having distinct wavelengths. Without limitation to any other aspect of the present disclosure, certain examples of a means for steering at least two incident EM beams having distinct wavelengths are described following. An example system includes a first active EO layer configured to steer a first wavelength, and a second active EO layer configured to steer a second wavelength, and a controller that operates voltages provided to high-side electrodes of the first active EO layer and the second active EO layer such that the selected wavelength is steered, and the not selected wavelength is not steered. An example system includes an active EO layer capable to steer more than one distinct wavelength—for example where the distinct wavelengths have $\lambda$ values in an integer ratio of each other.

Certain aspects of the present disclosure are set forth as a means for steering an incident EM beam at a steering efficiency exceeding 90%. Without limitation to any other aspect of the present disclosure, certain examples of a means for steering an incident EM beam at a steering efficiency exceeding 90% are described following. An example system includes a beam steering device having resistive, tilted, and/or geometrically arranged high-side electrodes sufficient to reduce quantization losses and thereby support a 90% steering efficiency. An example system includes a beam steering device having insulating elements positioned at least partially between adjacent active cells, and/or further includes insulating elements configured with insulation capability configured for a voltage differential between the adjacent active cells sufficient to reduce flyback losses and thereby support a 90% steering efficiency. Example and non-limiting insulating elements include: electrically insulating materials, geometric arrangements that provide for distance between adjacent high-side electrodes (e.g., a castle and/or a chess arrangement), a dielectric material, and/or an air gap. An example system includes one or more of an insulator, an electrode (high-side and/or low-side), a substrate, and/or an active EO material having a similar optical characteristic sufficient to reduce redirection losses and thereby support a 90% steering efficiency. An example system includes an anti-reflective material at a material discontinuity in the beam steering device, sufficient to reduce redirection losses and thereby support a 90% steering efficiency.

Certain aspects of the present disclosure are set forth as a means for steering an incident EM beam at a steering efficiency exceeding 95%. Without limitation to any other aspect of the present disclosure, certain examples of a means for steering an incident EM beam at a steering efficiency exceeding 95% are described following. An example system includes a beam steering device having resistive, tilted, and/or geometrically arranged high-side electrodes sufficient to reduce quantization losses and thereby support a 95% steering efficiency. An example system includes a beam steering device having insulating elements positioned at least partially between adjacent active cells, and/or further includes insulating elements configured with insulation capability configured for a voltage differential between the adjacent active cells sufficient to reduce flyback losses and thereby support a 95% steering efficiency. Example and non-limiting insulating elements include: electrically insulating materials, geometric arrangements that provide for distance between adjacent high-side electrodes (e.g., a castle and/or a chess arrangement), a dielectric material, and/or an air gap. An example system includes one or more of an insulator, an electrode (high-side and/or low-side), a substrate, and/or an active EO material having a similar optical characteristic sufficient to reduce redirection losses and thereby support a 95% steering efficiency. An example system includes an anti-reflective material at a material discontinuity in the beam steering device, sufficient to reduce redirection losses and thereby support a 95% steering efficiency.

The present disclosure teaches a number of systems and techniques for creating and using a high diffraction efficiency modulo $2\pi n$ optical beam scanner. In certain embodiments, a scanner includes at least two optically active rows interposed between two substrates with an optional reflective layer as the last layer. Each optically active row contains at least two active cells made of an electro optically active material whose index of refraction or other optical characteristics can be dynamically changed in one, or both, polarizations. The active cells are arranged between two electrode layers. One electrode layer can be ground, and at least one layer may have one or more voltages applied. The electrodes can be transparent to an incoming optical wave, and/or have selected transmissivity to selected electro-magnetic (EM) frequencies, and can be conductive or resistive. In certain embodiments, adjacent active cells are at least partially separated by an insulator. Example insulators and substrates are made of a material with the same or a similar index of refraction, and/or are transparent (and/or have selected transmissivity to selected EM frequencies) to the incoming optical or photonic wave intended for deflection by the scanner.

An example system includes a high-side electrode layer having a number of discrete electrodes, a low-side electrode layer, and an electro-optic (EO) layer including an EO active material at least partially positioned between the high-side electrode layer and the low-side electrode layer, thereby forming a number of active cells of the EO layer. Each of the number of active cells of the EO layer includes a portion of the EO layer positioned between 1) a first one of the number of discrete electrodes of the high-side electrode layer, and 2) the low-side electrode layer. The example system includes an insulator operationally coupled to the active cells of the EO layer, and at least partially positioned between a first one of the active cells and a second one of the active cells.

Certain further aspects of an example system are described following, any one or more of which may be present in certain embodiments. An example system includes: where the EO layer includes at least six (6) active cells, where the system further includes a number of the insulators, and where each of the number of insulators is positioned between two of the at least six (6) active cells; where the EO layer includes at least eight (8) active cells, the system further including a number of the insulators, and where each of the number of insulators is positioned between two of the at least eight (8) active cells; where the EO layer includes between three (3) active cells and twenty (20) active cells, inclusive; and/or where the system further includes a number of the insulators, and where each of the number of insulators is positioned between two of the active cells. An example system includes: where at least one of the number of discrete electrodes includes a conductive electrode; where at least one of the number of discrete electrodes includes a resistive electrode; where a selected number of the active cells of the EO layer are structured to apply a progressive phase shift to an incident electro-magnetic (EM) beam; and/or where a next one of the active cells of the EO layer after the selected number of active cells is configured to reset the progressive phase shift of the incident EM beam by reducing the progressive phase shift by $2\pi$, and/or by $2\pi n$, where n can be a relatively small positive integer value. An example system includes where a last one of the selected number of active cells includes a phase shift such as: a value between $1.5\pi n$ and $2.5\pi n$, a value between $1.8\pi n$ and $2.2\pi n$, a value between $1.9\pi n$ and $2.05\pi n$, a value of about $2\pi n$, and a value of $2\pi n$. In certain embodiments, n includes a value between 1 and 10, inclusive. An example system includes where each of the number of insulators includes at least one of a size or a resistivity selected in response to a voltage difference value of the corresponding active cells of the EO layer; and/or where each one of the number of insulators positioned between a last one of the selected number of active cells and the next one of the active cells is a reset insulator, and where the reset insulator includes at least one of an increased insulation area or an increased resistivity value. An example system includes where the EO layer has a thickness of at least one wavelength corresponding to a target electro-magnetic (EM) frequency; and/or where the EO layer includes a progressive thickness value, where a thickest portion of the progressive thickness value includes a thickness of at least one wavelength corresponding to a target electro-magnetic (EM) frequency. An example system includes the EO layer including at least one material such as: an EO crystal, a crystal layer, multiple crystal layers, an EO crystal layer, multiple EO crystal layers, a liquid crystal, a polymer, a quantum dot device, a crystal that responds to an applied electric field with a linear change in an index of refraction, and/or a crystal that responds to an applied electric field with a quadratic change in an index of refraction.

An example system includes where the high-side electrode layer, the low-side electrode layer, and the EO layer together make up a first phase delay progression stage, and where the system further includes a second phase delay progression stage. The second phase delay progression stage includes: a second high-side electrode layer including a number of discrete electrodes; a second low-side electrode layer; a second EO layer including an EO active material at least partially interposed between the second high-side electrode layer and the second low-side electrode layer, thereby forming a number of active cells of the second EO layer. Each of the number of active cells of the second EO layer includes a portion of the second EO layer positioned between 1) a first one of the number of discrete electrodes of the second high-side electrode layer; and 2) the second low-side electrode layer. The example system further includes a second insulator operationally coupled to the active cells of the second EO layer, and at least partially positioned between a first one of the active cells and a second one of the active cells. In certain further aspects, an example system includes where the first phase delay progression stage and the second phase delay progression stage are configured to additively steer an incident electro-magnetic (EM) beam; where the first phase delay progression stage is configured to steer an incident electro-magnetic (EM) beam along a first axis, and where the second phase delay progression stage is configured to steer the incident EM beam along a second axis, and where the first axis is distinct from the second axis, and/or where the first axis is perpendicular to the second axis; where the first axis corresponds to a first polarization of the incident EM beam, and where the second axis corresponds to a second polarization of the incident EM beam; and/or the system further including a half wave plate layer interposed between the first phase delay progression stage and the second phase delay progression stage, where the half wave plate layer is structured to selectively rotate a polarization of the incident EM beam. An example system includes where the low-side electrode layer includes a continuous electrode, where the low-side electrode layer includes a ground voltage electrode; and/or where the ground voltage electrode includes a zero relative voltage electrode.

An example system includes a high-side electrode layer including a number of discrete conductive electrodes, a low-side electrode layer, and an EO layer including an EO active material at least partially positioned between the high-side electrode layer and the low-side electrode layer, thereby forming a number of active cells of the EO layer. Each of the number of active cells of the EO layer includes a portion of the EO layer positioned between 1) a first one of the number of discrete electrodes of the high-side electrode layer, and 2) the low-side electrode layer. The example system further includes an insulator operationally coupled to the active cells of the EO layer, and at least partially positioned between a first one of the active cells and a second one of the active cells.

Certain further aspects of an example system are described following, any one or more of which may be present in certain embodiments. An example system includes where the EO layer includes at least eight (8) active cells, where the system further includes a number of the insulators, and where each of the number of insulators is positioned between two of the at least eight (8) active cells. An example system includes where the EO layer includes a number of active cells, the number of active cells including at least a number of cells such as: eight (8), ten (10), twelve (12), sixteen (16), and twenty (20), where the system further includes a number of the insulators, and where each of the number of insulators is positioned between two of the active cells. An example system includes: where a selected number of the active cells of the EO layer are structured to apply a progressive phase shift to an incident electro-magnetic (EM) beam; where a next one of the active cells of the EO layer after the selected number of active cells is configured to reset the progressive phase shift of the incident EM beam by reducing the progressive phase shift by $2\pi$; where a last one of the selected number of active cells includes a phase shift selected such as: a value between $1.5\pi$ and $2.5\pi$, a value between $1.8\pi$ and $2.2\pi$, a value between $1.9\pi$ and $2.05\pi$, a value of about $2\pi$, and a value of $2\pi$; where a next one of the active cells of the EO layer after the selected number of active cells is configured to reset the progressive phase shift of the incident EM beam by reducing the progressive phase shift by $2\pi n$, where n includes a small positive integer value; and/or where n includes a value between 1 and 10 inclusive. An example system includes: where each of the number of insulators includes at least one of a size or a resistivity selected in response to a voltage difference value of the corresponding active cells of the EO layer; where each one of the number of insulators positioned between a last one of the selected number of active cells and the next one of the active cells includes a reset insulator, and where the reset insulator includes at least one of an increased insulation area or an increased resistivity value; where the EO layer includes a thickness of at least one wavelength corresponding to a target electro-magnetic (EM) frequency; where the EO layer includes a progressive thickness value, where a thickest portion of the progressive thickness value includes a thickness of at least one wavelength corresponding to a target electro-magnetic (EM) frequency; and/or where the EO layer includes at least one material such as: an EO crystal, a crystal layer, multiple crystal layers, an EO crystal layer, multiple EO crystal layers, a liquid crystal, a polymer, a quantum dot device, a crystal that responds to an applied electric field with a linear change in an index of refraction, and/or a crystal that responds to an applied electric field with a quadratic change in an index of refraction.

An example system includes a high-side electrode layer including a number of discrete resistive electrodes, a low-side electrode layer, and an EO layer including an EO active material at least partially positioned between the high-side electrode layer and the low-side electrode layer, thereby forming a number of active cells of the EO layer. The example system includes each of the number of active cells of the EO layer including a portion of the EO layer positioned between 1) a first one of the number of discrete electrodes of the high-side electrode layer, and 2) the low-side electrode layer. The example system further includes an insulator operationally coupled to the active cells of the EO layer, and at least partially positioned between a first one of the active cells and a second one of the active cells.

Certain further aspects of an example system are described following, any one or more of which may be present in certain embodiments. An example system includes where the active cells of the EO layer are structured to apply a voltage gradient across the active cell; where a next active cell of the EO layer is configured to reset the voltage relative to the previous active cell of the EO layer to reset an incident electro-magnetic (EM) beam by a $2\pi$ phase shift; where a highest voltage of the voltage gradient is configured to provide a phase shift of the EM beam by a phase shift such as: a value between $1.5\pi$ and $2.5\pi$, a value between $1.8\pi$ and $2.2\pi$, a value between $1.9\pi$ and $2.05\pi$, a value of about $2\pi$, and a value of $2\pi$; where a next active cell of the EO layer is configured to reset the voltage relative to the previous active cell of the EO layer to reset an incident electro-magnetic (EM) beam by $2\pi n$, where n includes a small positive integer value; and/or where n includes a value between 1 and 10 inclusive. An example system includes where a selected number of the number of the active cells of the EO layer are configured to provide a voltage gradient across the number of the active cells; where a next active cell of the EO layer is configured to reset the voltage relative to a last one of the selected number of the number of active cells of the EO layer to reset an incident electro-magnetic (EM) beam by a $2\pi$ phase shift; where a last one of the selected number of active cells includes a phase shift such as: a value between $1.5\pi$ and $2.5\pi$, a value between $1.8\pi$ and $2.2\pi$, a value between $1.9\pi$ and $2.05\pi$, a value of about $2\pi$, and a value of $2\pi$; where the next active cell of the EO layer after the selected number of active cells is configured to reset the progressive phase shift of the incident EM beam by reducing the progressive phase shift by $2\pi n$, where n includes a small positive integer value; and/or where n includes a value between 1 and 10 inclusive. An example system includes where each of the number of insulators includes at least one of a size or a resistivity selected in response to a voltage difference value of the corresponding active cells of the EO layer, and/or where each one of the number of insulators positioned between a last one of the selected number of active cells and the next active cell includes a reset insulator, and where the reset insulator includes at least one of an increased insulation area or an increased resistivity value.

An example system includes a first phase delay progression stage, including: a first high-side electrode layer including a first number of discrete electrodes; a first low-side electrode layer; a first EO layer including an EO active material at least partially positioned between the first high-side electrode layer and the first low-side electrode layer, thereby forming a number of active cells of the first EO layer. Each of the number of active cells of the first EO layer includes a portion of the first EO layer positioned between 1) a first one of the first number of discrete electrodes of the first high-side electrode layer, and 2) the first low-side electrode layer. The example system further includes a first insulator operationally coupled to the active cells of the first EO layer, and at least partially positioned between a first one of the active cells and a second one of the active cells. The example system further includes a second phase delay progression stage, including: a second high-side electrode layer including a second number of discrete electrodes; a second low-side electrode layer; a second EO layer including an EO active material at least partially positioned between the second high-side electrode layer and the second low-side electrode layer, thereby forming a number of active cells of the second EO layer. Each of the number of active cells of the second EO layer includes a portion of the second EO layer positioned between 1) a first one of the second number of discrete electrodes of the second high-side electrode layer, and 2) the second low-side electrode layer. The example system further includes a second insulator operationally coupled to the active cells of the second EO layer, and at least partially positioned between a first one of the active cells and a second one of the active cells.

Certain further aspects of an example system are described following, any one or more of which may be present in certain embodiments. An example system includes where the first EO layer includes a first thickness corresponding to a thickness of at least one wavelength corresponding to a first target electro-magnetic (EM) frequency, and where the second EO layer includes a second thickness corresponding to a thickness of at least one wavelength corresponding to a second target EM frequency. An example system includes a controller, the controller including an incident wavelength circuit that determines a wavelength value of an incident EM beam, a steering configuration circuit that determines a first EO layer command value and a second EO layer command value in response to the incident EM beam, and a steering implementation circuit that provides at least one of the first EO layer command value or the second EO layer command value to a steering control module. An example steering control module provides selected voltages to at least one of the first high-side electrode layer or the second high-side electrode layer in response to the at least one of the first EO layer command value or the second EO layer command value. An example steering control module further includes a solid state circuit that applies selected voltages to each electrode of the first high-side electrode layer and the second high-side electrode layer. An example solid state circuit further selectively couples a power source to each electrode of the first high-side electrode layer and the second high-side electrode layer, and/or selectively couples the power source using a pulse-width modulation (PWM) operation.

An example procedure includes an operation to receive an incident electro-magnetic (EM) beam at a multi-layer beam steering device, an operation to determine a wavelength value of the incident EM beam, and an operation to selectively steer the EM beam with a first layer or a second layer of the multi-layer beam steering device in response to the determined wavelength value of the incident EM beam.

Certain further aspects of an example procedure are described following, any one or more of which may be present in certain embodiments. An example procedure further includes selectively steering by applying selected voltages to a selected one of the first layer or the second layer; selectively steering further by applying a voltage gradient across the selected one of the first layer or the second layer; and/or selectively steering by applying resets at selected intervals across the selected one of the first layer or the second layer. An example procedure further includes an operation to determine a selection frequency of interest, and to alternate the wavelength value of the incident EM beam at a frequency at least equal to the selection frequency of interest.

An example system includes a high-side electrode layer including a number of discrete electrodes, a low-side electrode layer, where the low-side electrode layer includes a reflective layer, and an EO layer including an EO active material at least partially interposed between the high-side electrode layer and the low-side electrode layer, thereby forming a number of active cells of the EO layer; where each of the number of active cells of the EO layer includes a portion of the EO layer positioned between 1) a first one of the number of discrete electrodes of the high-side electrode layer, and 2) the low-side electrode layer. The example system further includes an insulator operationally coupled to the active cells of the EO layer, and at least partially positioned between a first one of the active cells and a second one of the active cells.

Certain further aspects of an example system are described following, any one or more of which may be present in certain embodiments. An example system includes the EO layer including at least eight (8) active cells, the system further including a number of the insulators, and where each of the number of insulators is positioned between two of the at least eight (8) active cells; where at least one of the number of discrete electrodes includes a conductive electrode; where at least one of the number of discrete electrodes includes a resistive electrode; where a selected number of the active cells of the EO layer are structured to apply a progressive phase shift to an incident electro-magnetic (EM) beam; where a next one of the active cells of the EO layer after the selected number of active cells is configured to reset the progressive phase shift of the incident EM beam by reducing the progressive phase shift by $2\pi$; where a last one of the selected number of active cells includes a phase shift selected from the phase shifts consisting of: a value between $1.5\pi$ and $2.5\pi$, a value between $1.8\pi$ and $2.2\pi$, a value between $1.9\pi$ and $2.05\pi$, a value of about $2\pi$, and a value of $2\pi$; where a next one of the active cells of the EO layer after the selected number of active cells is configured to reset the progressive phase shift of the incident EM beam by reducing the progressive phase shift by $2\pi n$, where n includes a small positive integer value; and/or where n includes a value between 1 and 10 inclusive. An example system includes where each of the number of insulators includes at least one of a size or a resistivity selected in response to a voltage difference value of the corresponding active cells of the EO layer; and/or where each one of the number of insulators positioned between a last one of the selected number of active cells and the next one of the active cells includes a reset insulator, and where the reset insulator includes at least one of an increased insulation area or an increased resistivity value. An example system includes the EO layer having a thickness of at least one wavelength corresponding to a target electro-magnetic (EM) frequency; where the EO layer includes a progressive thickness value, and where a thickest portion of the progressive thickness value includes a thickness of at least one wavelength corresponding to a target electro-magnetic (EM) frequency; and/or where the EO layer includes at least one material such as: an EO crystal, a crystal layer, multiple crystal layers, an EO crystal layer, multiple EO crystal layers, a liquid crystal, a polymer, a quantum dot device, a crystal that responds to an applied electric field with a linear change in an index of refraction, and/or a crystal that responds to an applied electric field with a quadratic change in an index of refraction.

An example system further includes the high-side electrode layer, the low-side electrode layer, and the EO layer together making up a first phase delay progression stage, and where the system further includes a second phase delay progression stage. The second phase delay progression stage includes: a second high-side electrode layer including a number of discrete electrodes, a second low-side electrode layer, and a second EO layer including an EO active material at least partially positioned between the second high-side electrode layer and the second low-side electrode layer, thereby forming a number of active cells of the second EO layer. The example system further includes each of the number of active cells of the second EO layer including a portion of the second EO layer positioned between 1) a first one of the number of discrete electrodes of the second high-side electrode layer, and 2) the second low-side electrode layer. The example system further includes a second insulator operationally coupled to the active cells of the second EO layer, and at least partially positioned between a first one of the active cells and a second one of the active cells. In certain embodiments, the example system further includes: where the first phase delay progression stage and the second phase delay progression stage are configured to additively steer an incident electro-magnetic (EM) beam; where the first phase delay progression stage is configured to steer an incident electro-magnetic (EM) beam along a first axis, where the second phase delay progression stage is configured to steer the incident EM beam along a second axis, and where the first axis is distinct from the second axis; and/or where the first axis is perpendicular to the second axis. An example system further includes: where the first axis corresponds to a first polarization of the incident EM beam, and where the second axis corresponds to a second polarization of the incident EM beam; and/or a half wave plate layer interposed between the first phase delay progression stage and the second phase delay progression stage, where the half wave plate layer is structured to selectively rotate a polarization of the incident EM beam. An example system further includes where the low-side electrode layer includes a continuous electrode; where the low-side electrode layer includes a ground voltage electrode; and/or where the ground voltage electrode includes a zero relative voltage electrode.

An example system includes an EO substrate layer including an EO active material and further including a number of thin elements alternating with a number of thick elements, a high-side electrode layer including a number of discrete electrodes, each of the number of discrete electrodes associated with one of the number of thick elements and positioned on a first side of the EO substrate layer, and a low-side electrode layer positioned on a second side of the EO substrate layer. The example system further includes an insulator layer operationally coupled to the EO substrate layer, and at least partially positioned between each of the number of thick elements.

Certain further aspects of an example system are described following, any one or more of which may be present in certain embodiments. An example system further includes: where the high-side electrode layer further includes a second number of discrete electrodes, each of the second number of discrete electrodes associated with one of the number of thin elements; where each of the number of thick elements includes an identical thickness; where each of the number of thin elements includes an identical thickness; where each of the number of thin elements includes a thickness of one wavelength corresponding to a target electro-magnetic (EM) frequency; and/or where each of the number of thick elements includes a thickness of two wavelengths corresponding to the target EM frequency. An example system further includes: a second EO substrate layer including a second number of thin elements alternating with a second number of thick elements, and where the EO substrate layer and the second EO substrate layer are aligned such that the number of thick elements is not aligned with the second number of thick elements; a second high-side electrode layer including a second number of discrete electrodes, each of the second number of discrete electrodes associated with one of the second number of thick elements, and positioned on a first side of the second EO substrate layer; and/or where the EO substrate layer and the second EO substrate layer share the ground electrode. An example system includes: where each of the number of discrete electrodes comprise resistive electrodes; a number of the EO substrate layers, where each of the number of EO substrate layers have a corresponding high-side electrode layer, and where the number of EO substrate layers are aligned such that a perpendicular line through the number of the EO substrate layers intersects only one of the number of thick elements of the number of the EO substrate layers; a number of the EO substrate layers, and where the number of EO substrate layers are arranged such that a perpendicular line through the number of the EO substrate layers passes through an equal thickness of active elements of the number of the EO substrate layers; where each high-side electrode layer further includes a second number of discrete electrodes, each of the second number of discrete electrodes associated with one of the number of thin elements of the number of EO substrate layers; and/or where the active elements include each of the number of thin elements and each of the number of thick elements having an associated discrete electrode. An example system includes: a number of the EO substrate layers, and where the number of EO substrate layers are arranged such that a perpendicular line through the number of the EO substrate layers passes through a configured thickness of the active elements of the number of the EO substrate layers, the configured thickness including a thickness selected to apply a progressive phase shift to an incident electro-magnetic (EM) beam; where each high-side electrode layer further includes a second number of discrete electrodes, each of the second number of discrete electrodes associated with one of the number of thin elements of the number of EO substrate layers; where the active elements include each of the number of thin elements and each of the number of thick elements having an associated discrete electrode; where each of the number of thin elements includes an equal thickness; and/or where each of the number of thick elements includes an equal thickness. An example system includes a number of the EO substrate layers, where each of the number of thin elements includes a thickness of x wavelengths corresponding to a target electro-magnetic (EM) frequency, where each of the number of thick elements includes a thickness of y wavelengths corresponding to the target EM frequency, where each of x and y comprise integer values, and where the y value for each of the number of thick elements is at least one greater than the x value for an adjacent one of the number of thin elements. In certain embodiments, the x value is one (1), and/or the y value is two (2). In certain embodiments, a first one of the number of thick elements includes a y value that is smaller than an x value for a first one of the number of thin elements, for example where the first one of the number of thick elements is not adjacent to the first one of the number of thin elements. In certain embodiments, the first one of the number of thick elements is in a different one of the number of EO substrate layers as the first one of the number of thin elements.

An example system includes an EO substrate layer including an EO active material, and further including a number of active elements. The example system includes adjacent ones of the number of active elements having a thickness value varying by at least one wavelength corresponding to a target electro-magnetic (EM) frequency. The example system further includes a high-side electrode layer including a number of discrete electrodes, each of the number of discrete electrodes associated with one of the number of active elements and positioned on a first side of the EO substrate layer; a low-side electrode layer positioned on a second side of the EO substrate layer; and an insulator layer operationally coupled to the EO substrate layer, and at least partially positioned between geometric gaps of the number of active elements.

Certain further aspects of an example system are described following, any one or more of which may be present in certain embodiments. An example system includes where the number of discrete electrodes are resistive electrodes; a number of the EO substrate layers, and where two adjacent ones of the number of the EO substrate layers share a low-side electrode layer; where a terminating one of the number of EO substrate layers is associated with a reflective low-side electrode layer; and/or where the number of EO substrate layers are arranged such that a perpendicular line through the number of the EO substrate layers passes through a configured thickness of the active elements of the number of the EO substrate layers, the configured thickness including a thickness selected to apply a progressive phase shift to an incident EM beam.

An example system includes a first EO layer including an EO active material, and further including: a first number of active elements; a second EO layer including the EO active material, and further including a second number of active elements; a first high-side electrode layer including a first number of discrete electrodes, each of the first number of discrete electrodes associated with one of the first number of active elements and positioned on a first side of the first EO layer; a second high-side electrode layer including a second number of discrete electrodes, each of the second number of discrete electrodes associated with one of the second number of active elements and positioned on a first side of the second EO layer; and a low-side electrode arrangement including an arrangement such as: a first low-side electrode layer positioned on a second side of the first EO layer and a second low-side electrode layer positioned on a second side of the second EO layer; a low-side electrode layer positioned on a second side of the first EO layer and further positioned on a second side of the second EO layer; and a number of low-side electrodes, each positioned on a second side of the first EO layer or a second side of the second EO layer, where each active element of the first number of active elements and the second number of active elements has an associated one of the number of low-side electrodes. The example system further includes where the first EO layer and the second EO layer are arranged such that the first number of active elements are not aligned with the second number of active elements.

Certain further aspects of an example system are described following, any one or more of which may be present in certain embodiments. An example system further includes: a first number of insulating elements, each of the first number of insulating elements positioned between adjacent ones of the first number of active elements; a second number of insulating elements, each of the second number of insulating elements positioned between adjacent ones of the second number of active elements; and/or an insulator layer operationally coupled to the second EO layer, and having a number of insulating portions extending at least partially between each of the second number of active elements. An example system further includes: at least one additional EO layer including an additional number of active elements; at least one additional high-side electrode layer corresponding to each of the at least one additional EO layers, each of the at least one additional high-side electrode layers including an additional number of discrete electrodes, each of the additional number of discrete electrodes associated with one of the additional number of active elements and positioned on a first side of the corresponding additional EO layer; and where the low-side electrode arrangement further includes one of: an additional low-side electrode layer or a number of additional low-side discrete electrodes; such that each of the additional number of active elements is operationally coupled to a low-side electrode on a second side of the corresponding additional EO layer. An example system further includes a number of the additional EO layers; where alternating adjacent pairs of the EO layers each share one of the low-side electrode layers; where the first EO layer, the second EO layer, and the at least one additional EO layer are arranged such that a perpendicular line through all of the EO layers passes through an equal thickness of active elements of all of the EO layers; where the first EO layer, the second EO layer, and the at least one additional EO layer are arranged such that a perpendicular line through all of the EO layers passes through a configured thickness of the active elements of all of the EO layers, the configured thickness including a thickness selected to apply a progressive phase shift to an incident electro-magnetic (EM) beam, and/or where a terminating one of the first EO layer, the second EO layer, or the at least one additional EO layer is associated with a reflective low-side electrode layer.

An example procedure includes an operation to receive an incident electro-magnetic (EM) beam at a number of active cells of an electro-optic (EO) material; an operation to apply a voltage to the number of active cells, thereby selectively adjusting an optical characteristic of each of the number of active cells; and an operation to reset a voltage between at least two adjacent ones of the number of active cells, thereby steering the incident EM beam.

Certain further aspects of an example procedure are described following, any one or more of which may be present in certain embodiments. An example procedure includes: resetting the voltage by an amount to apply a $2\pi$ phase shift between a first one of the number of active cells and an adjacent second one of the number of active cells; resetting the voltage by an amount to apply a $2\pi n$ phase shift between a first one of the number of active cells and an adjacent second one of the number of active cells, where n includes a small positive integer value; and/or resetting the voltage to a value applying a negative phase shift. An example procedure further includes: applying the voltage to the number of active cells to apply a progressive phase shift to the incident EM beam; applying the progressive phase shift by applying progressive voltages to adjacent ones of the number of active cells, and resetting the progressive voltages at selected intervals of the number of active cells; where the selected intervals of the number of active cells comprise at least six (6) of the number of active cells in each of the selected intervals; applying a uniform voltage to each of the number of active cells, and further applying a distinct uniform voltage to adjacent ones of the number of active cells; applying a voltage gradient to each of the number of active cells; and/or applying a distinct voltage gradient to adjacent ones of the number of active cells. An example procedure further includes: insulating a first high side electrode corresponding to a first one of the number of active cells from a second high side electrode corresponding to a second one of the number of active cells, where the first one of the number of active cells is adjacent to the second one of the number of active cells; and/or enhancing the insulating in response to the first one of the number of active cells and the second one of the active cells including the at least two of the number of active cells corresponding to the resetting the voltage. An example procedure further includes steering the incident EM beam in a first axis, thereby providing a first axis steered EM beam, and further performing the operations of: receiving the steered EM beam at a second number of active cells of the EO material; applying a voltage to the second number of active cells, thereby selectively adjusting an optical characteristic of each of the second number of active cells; and/or resetting a voltage between at least two adjacent ones of the second number of active cells, thereby steering the incident EM beam in a second axis distinct from the first axis. It can be seen that the operations of the example procedure provide a two-axis steered EM beam.

An example apparatus includes an incident beam circuit that interprets an EM beam value; a steering request circuit that interprets a steering profile value; a steering configuration circuit that determines a number of voltage values in response to the steering profile value, the number of voltage values corresponding to a number of active cells of an EO material, the number of voltage values including at least one progressive voltage value and a voltage reset value; and a steering implementation circuit that provides an EO command value in response to the number of voltage values.

Certain further aspects of an example apparatus are described following, any one or more of which may be present in certain embodiments. An example apparatus includes: where the voltage reset value includes a voltage adjustment between two adjacent ones of the number of active cells to apply a 2πn phase shift between a first one of the adjacent ones of the active cells and an second one of the adjacent ones of the of active cells, where n includes a small positive integer value; where the steering profile value includes a target location for an EM beam; where the steering profile value includes a target steering angle for an EM beam; where the steering profile value includes a first target steering angle for a first steering axis for an EM beam and a second target steering angle for a second steering axis for the EM beam; and/or where the EM beam value includes at least one EM beam value selected from the values consisting of: a wavelength value of an incident EM beam, a presence of an incident EM beam, and a characteristic of an incident EM beam. An example apparatus includes the steering configuration circuit further determining the number of voltage values for a number of layers of active cells of the EO material.

An example procedure includes an operation to interpret an electro-magnetic (EM) beam value, an operation to interpret a steering profile value, and an operation to determine a number of voltage values in response to the steering profile value. The number of voltage values correspond to a number of active cells of an EO material, and the number of voltage values include at least one progressive voltage value and a voltage reset value. The example procedure further includes an operation to provide an EO command value in response to the number of voltage values.

Certain further aspects of an example procedure are described following, any one or more of which may be present in certain embodiments. An example procedure further includes: where the voltage reset value includes a voltage adjustment between two adjacent ones of the number of active cells to apply a 2πn phase shift between a first one of the adjacent ones of the active cells and an second one of the adjacent ones of the of active cells, where n includes a small positive integer value; where the steering profile value includes a target location for an EM beam and/or a target steering angle for the EM beam; where the steering profile value includes a first target steering angle for a first steering axis for an EM beam and a second target steering angle for a second steering axis for the EM beam; where the steering profile value includes a first target steering angle for a first polarity of the EM beam and a second target steering angle for a second polarity of the EM beam; and/or where the EM beam value includes at least one EM beam value such as: a wavelength value of an incident EM beam, a presence of an incident EM beam, and a characteristic of an incident EM beam. An example procedure further includes an operation to determine the number of voltage values for a number of layers of active cells of the EO material.

An example procedure includes an operation to provide an EO layer including an EO active material, and an operation to form a number of active cells of the EO layer, where the forming includes: operationally coupling a high-side electrode layer including a number of discrete electrodes to a first side of the EO layer; and operationally coupling a low-side electrode layer to a second side of the EO layer. The example procedure further includes operationally coupling an insulator to the number of active cells of the EO layer, where the insulator is at least partially positioned between a first one of the active cells and a second one of the active cells.

Certain further aspects of an example procedure are described following, any one or more of which may be present in certain embodiments. An example procedure further includes: providing the EO layer in a castle configuration; providing a number of EO layers in a chess configuration; operationally coupling the high-side electrode layer by providing the number of discrete electrodes as resistive electrodes; operationally coupling the high-side electrode layer by providing the number of discrete electrodes as tilted electrodes; and/or operationally coupling the high-side electrode layer by providing the number of discrete electrodes as electrodes having a selected geometric arrangement. An example procedure further includes: providing the EO layer by providing a number of EO layers, and further forming the number of active cells of the EO layer by operationally coupling each one of a number of high-side electrode layers to a corresponding one of the number of EO layers; further forming the number of active cells of the EO layer by operationally coupling a low-side electrode layer such that the low-side electrode layer is shared by adjacent ones of the number of EO layers; where providing the EO layer includes utilizing a contiguous substrate of the EO material for the EO layer; where operationally coupling the insulator includes utilizing a contiguous substrate of insulator material for the insulator; where operationally coupling the low-side electrode layer includes utilizing a reflective low-side electrode layer; where operationally coupling the high-side electrode layer includes providing the number of discrete electrodes as resistive electrodes having a selectable resistance profile; and/or where providing the number of discrete electrodes as resistive electrodes having a selectable resistance profile includes providing the number of discrete electrodes as solid state electrodes.

An example system includes a high-side electrode layer having a number of discrete electrodes, a low-side electrode layer, and an EO layer including an EO active material at least partially positioned between the high-side electrode layer and the low-side electrode layer, thereby forming a number of active cells of the EO layer. The example system further includes a controller including a steering request circuit, a steering configuration circuit, and a steering implementation circuit. The steering request circuit interprets a steering request value, and the steering configuration circuit determines a number of EO command values in response to the steering request value, where the number of EO command values correspond to a half-wave voltage profile. The steering implementation circuit provides a number of voltage commands in response to the number of EO command values.

Certain further aspects of the example system are described following, any one or more of which may be present in certain embodiments. An example system includes the half-wave voltage profile having a first voltage value for a last electrode of a first phase delay progression, a second voltage value for a first electrode of a second phase delay progression, and where the first voltage value and the second voltage value have an equal magnitude and an opposite sign. An example system includes each of the discrete electrodes having a length that is about equal to a thickness of the EO active layer. An example system includes each of the discrete electrodes being resistive electrodes.

An example improved modulo 2πn electro-optical or photonic beam steering scanner includes at least one active EO layer having a first side and an opposing second side, at least one conductive or resistive discrete electrode, arranged along the first side, at least one ground electrode arranged along the second side, and at least one insulator arranged to extend at least partially into the at least one active EO layer. The example improved beam steering scanner further includes where the at least one conductive or resistive discrete electrode is constructed to impose one, or more, voltages to change an index of refraction sufficient to cause an OPD change to a beam of light traveling through the at least one active EO layer.

Certain further aspects of an improved beam steering scanner are described following, any one or more of which may be present in certain embodiments. An example improved beam steering scanner includes: where the at least one active EO layer includes a material such as: EO crystals, a crystal layer, multiple crystal layers, an EO crystal layer, multiple EO crystal layers, liquid crystals, polymers, crystals with a linear change in index of refraction with respect to an applied electric field, and/or crystals with a quadratic change in index of refraction with respect to an applied electric field; where the at least one conductive or resistive discrete electrode includes at least two discrete electrodes and where the at least one insulator is located between the at least two discrete electrodes to reduce the spread of an electric field between the at least two discrete electrodes; where the at least one active EO layer includes a material capable of having a change in index of refraction when an electric current is applied to the material; where the at least one ground electrode includes a series of ground electrodes and where at least one of the ground electrodes in the series of ground electrodes is set at a non-zero value; where a reflective layer is arranged along the at least one ground electrode, the at least one ground electrode arranged between the at least one active EO layer and the reflective layer; where the at least one conductive or resistive discrete electrode includes at least one tilted discrete electrode; and/or where the at least one conductive or resistive electrode includes a set of discrete, transparent electrodes.

Another example improved modulo 2πn electro-optical or photonic beam steering scanner includes at least two active rows arranged between two substrates, the substrates transparent to an incoming optical or photonic wave, where each active row includes a first side and an opposing second side, and where each active row includes at least two active cells separated by at least one insulator cell; at least one discrete conductive or resistive electrode arranged along the first side of each active row; and at least one ground electrode arranged along the second side of each active row. The example improved beam steering scanner further includes where an arrangement of the at least two active cells and insulator cells in one of the at least two active rows is opposite to the arrangement of the at least two active cells and insulator cells in the other of the at least two active rows.

Certain further aspects of an improved beam steering scanner are described following, any one or more of which may be present in certain embodiments. An example improved beam steering scanner includes where one of the at least one ground electrodes is a last ground electrode that is either reflective or transparent to an incoming optical or photonic wave, where the incoming optical or photonic wave is to be deflected by the scanner; where one of the at least two active cells in one of the at least two active rows is the same size as the at least one insulator cell in another of the at least two active rows; where the at least one ground electrode is a continuous ground electrode; where the at least two active cells include an optically active material, the optically active material having a refractive index that is changeable by applying a voltage to the at least one discrete electrode; where a wavelength of the incoming optical or photonic wave ranges between 0.25 and 12 microns; where the at least one insulator cell includes a transparent material with a refractive index close to the refractive index of the substrate; and/or where the at least two active rows include four active rows.

An example improved scanner for steering an optical beam includes at least two active rows arranged between two substrates, the substrates transparent to an incoming optical or photonic wave, each active row having a first side and an opposing second side, each active row including at least two active cells separated by at least one insulator cell; at least one ground electrode arranged between two of the at least two active rows; and where each of the at least two active rows includes at least one discrete electrode arranged along the first side or second side of each active row opposite the at least one ground electrode. The example improved scanner for steering an optical beam includes where an arrangement of the at least two active cells and insulator cells in one of the at least two active rows is opposite to the arrangement of the at least two active cells and insulator cells in the other of the at least two active rows.

Certain further aspects of an example improved scanner for steering an optical beam are described following, any one or more of which may be present in certain embodiments. An example improved scanner for steering an optical beam includes where the at least one discrete electrode is either conductive or resistive; where a reflective layer is arranged on a surface of one of the substrates; where the at least one ground electrode includes a transparent continuous ground electrode; where one of the at least two active cells in one of the at least two active rows is the same size as the at least one insulator cell in another of the at least two active rows; where the at least two active cells includes an optically active material, the optically active material having a refractive index that is changeable by applying a voltage to the at least one discrete electrode; where a wavelength of the incoming optical or photonic wave ranges between about 0.25 and about 12 microns; where the at least one insulator cell comprises a transparent material with a refractive index close to the refractive index of the substrate; where the at least two active rows includes four active rows; where the optically active material includes a material such as EO crystals, liquid crystals, and/or quantum dot materials; and/or where the EO crystals include a material such as PMN-PT, KTN, SBN, PBN, PZT, and/or $BaTiO_3$.

Figure 26:
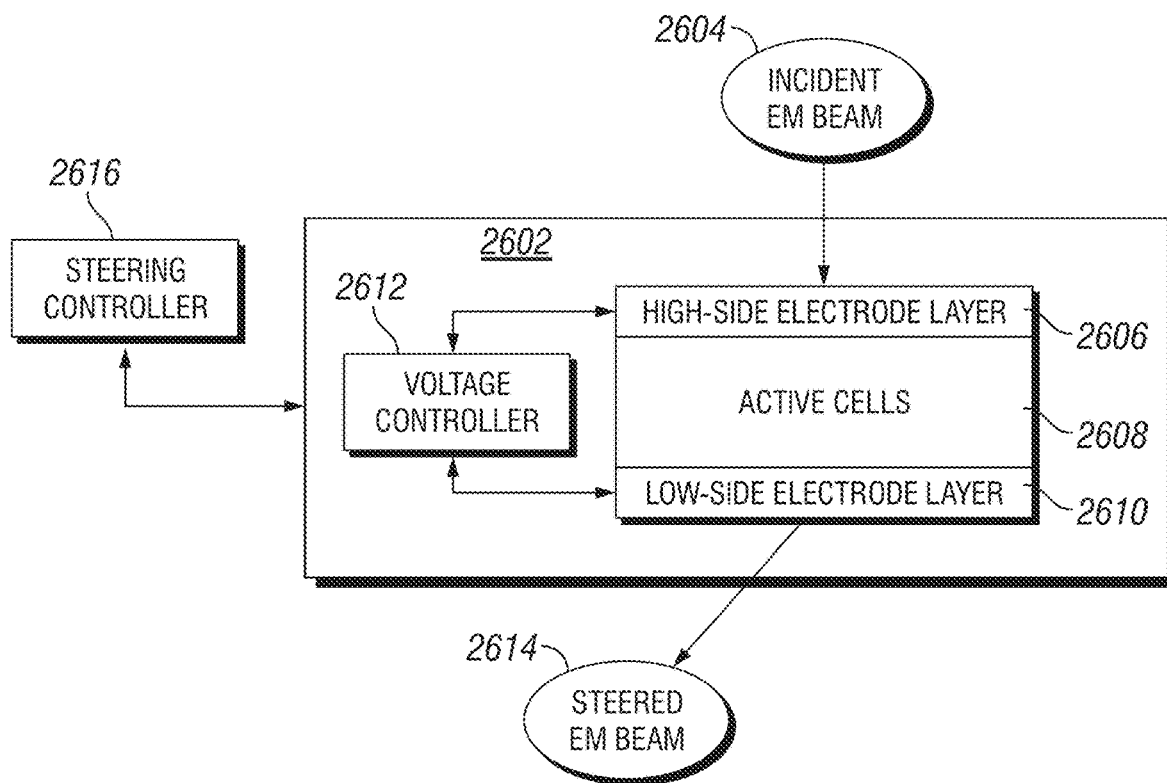
FIG. 26 is a schematic diagram of a beam steering device.

Referencing FIG. 26, an example beam steering device is depicted. The example beam steering device includes a hardware layer 2602 having beam steering components, including a high-side electrode layer 2606, a low-side electrode layer 2610, and a number of active cells 2608. The active cells 2608 are positioned between the high-side electrode layer 2606 and the low-side electrode layer 2610, and include an EO active material that changes an optical characteristic in response to an applied voltage or electric field. The example beam steering device may include the EO active material that makes up the substrate of the active cells 2608 provided as discrete elements of the EO active material, or as a monolithic substrate, where portions of the monolithic substrate interposed between each discrete electrode of a number of discrete electrodes of the high-side electrode layer 2610 each form one of the active cells. In certain embodiments, segments of the EO active material may form several active cells 2608, with the EO active material formed in more than one segment to create the active cell layer.

The example beam steering device further includes a voltage controller 2612 responsive to voltage commands, steering commands, or other similar command structures, where the voltage controller 2612 provides voltage control of elements of the high-side electrode layer 2606 and/or the low-side electrode layer 2610, thereby controlling the voltage differential and/or electric field across the active cells 2608. In certain embodiments, voltage control of the electrode layers 2606, 2610 includes raising the voltage of the high-side electrode layer 2606 and/or individual discrete electrodes of the high-side electrode layer 2610, and may further include lowering the voltage (and/or connecting to a ground) of the low-side electrode layer 2610 and/or individual discrete electrodes of the low-side electrode layer 2610. In certain embodiments, the hardware layer 2602 of the example beam steering device may include any features and/or elements of any beam steering device throughout the present disclosure, including without limitation: insulators interposed (at least partially) between one or more of the active cells 2608; electrodes provided as discrete or continuous electrode layers (e.g., where at least one of the high-side electrode layer 2606 or the low-side electrode layer 2610 is provided as discrete electrodes, and/or where each of the active cells 2608 is provided with a discrete electrode at the high-side or low-side to provide for individual voltage differential control for that active cell); tilted and/or geometrically profiled electrodes; the active cells provided in a castle arrangement, a chess arrangement, or combinations of these; a reflective layer or reflective element (e.g., a substrate or ground electrode provided as a reflective layer, and/or a reflective layer associated with one of these); and/or an anti-reflective coating provided on at least a portion of a layer interface in the hardware layer 2602. In certain embodiments, the hardware layer 2602 includes multiple layers of active cells structured to cooperate to provide one or more of: steering for more than one polarity; more than one axis; more than one target wavelength of an incident EM beam 2604; additional steering capability; and/or to cooperate among distinct hardware layers of active cells for steering a particular wavelength, polarity, and/or axis.

In certain embodiments, the discrete electrodes 2606 are sized such that a length of an individual discrete electrode 2606 (e.g., the left-right distance of the discrete electrode 2606) is the same as, or similar to, a thickness of the active cells 2608. In certain embodiments, the ratio of the length of individual discrete electrodes 2606 to the thickness of the active cells 2608 is referenced as the aspect ratio. It has been found that having a discrete electrode 2606 that is the same as the thickness of the active cell 2608 (e.g., providing an aspect ratio of about 1) minimizes (but does not eliminate) fringing fields between electrodes 2606. In certain embodiments, and without limitation, a length of the discrete electrode 2606 that is the same as, or similar to, the thickness of the active cells 2608 (e.g., having an aspect ratio of about 1) includes: the length and thickness being nominally the same (e.g., allowing for variances and tolerances from manufacturing and assembly processes, and part-to-part variation); a length and thickness being selected such that fringing fields are within a selected amount (e.g., a ratio, an offset value, below a maximum threshold, etc.) of a minimum fringing field value; a closest match between the length and thickness available from nominally available parts (e.g.: off-the-shelf or commercially available electrodes and/or EO materials; a closest match from available electrodes and/or EO materials from other systems already in production; and/or a closest match of electrodes and/or EO materials selected from a range of materials designed for other considerations (e.g.: the sizing of the beam steering device; the number of progressive phase delay stages and the number of phase delay steps in each stage; the mechanical integrity of the beam steering device; and/or the heat transfer environment and/or heat rejection environment of the beam steering device). In certain embodiments, certain electrodes 2606 may have a same or similar length as the thickness of the active cells, and other electrodes 2606 may not have a same or similar length as the thickness of the active cells. For example, electrodes 2606 positioned at a reset position (e.g., the last electrode of a first stage, and/or the first electrode of a second stage) may be sized to be in closer correlation to the same length as the thickness of the active cells relative to other electrodes 2606 in the same beam steering device. In another example, certain electrodes 2606 may be separated by insulators (and/or more capable insulators), while other electrodes 2606 are not separated by insulators (and/or less capable insulators), with un-insulated electrode 2606 separations having an aspect ratio closer to 1, and insulated electrode 2606 separations having an aspect ratio further from 1. It can be seen that the electrode 2606 length and/or active cell thickness 2608 can be tuned to provide a desired fringing field profile across the beam steering device, for example to utilize fringing fields to smooth the phase profile (e.g., reference FIG. 8) while minimizing fringing field losses, such as at high loss regions like the reset position.

It can be seen, in view of the various embodiments of the present disclosure, that in certain embodiments, electrode 2606 lengths such as $\lambda$, $\frac{1}{2}\lambda$, and/or $\frac{1}{4}\lambda$, as well as integer multiples of these, may be desirable to match the varying thicknesses of active cells 2608, either within a beam steering device, within a beam steering device layer (e.g., where different layers are provided to steer distinct wavelengths), or between different devices. For example, in a beam steering device where steering efficiency is a paramount concern, a close match of electrode 2606 lengths to active cell 2608 thicknesses may be provided, and in a beam steering device where a smooth phase delay profile is desired, the match of the electrode 2606 length to active cell 2608 thickness may be relaxed—even where the beam steering devices otherwise are configured to steer a same wavelength of an incident EM beam to a same steering direction capability.

The example beam steering device further includes a steering controller 2616 that provides steering commands to the hardware layer 2602. The voltage controller 2612 is responsive to the steering commands to provide the voltage control of elements of the electrode layers 2606, 2610, thereby directing the incident EM beam 2604 to the desired location as a steered EM beam 2614. In certain embodiments, the steering controller 2616 and/or the voltage controller 2612 include any aspects, and/or are configured to perform any operations, as referenced throughout the present disclosure to perform beam steering operations. Without limitation to any other aspects of the present disclosure, the steering controller 2616 and/or the voltage controller 2612 may include any aspects or perform any operations of a controller 1902, and/or may perform any operations as recited in the disclosure referencing FIGS. 21-25, and/or any operations recited in the disclosure reference FIG. 31.

Figure 27:
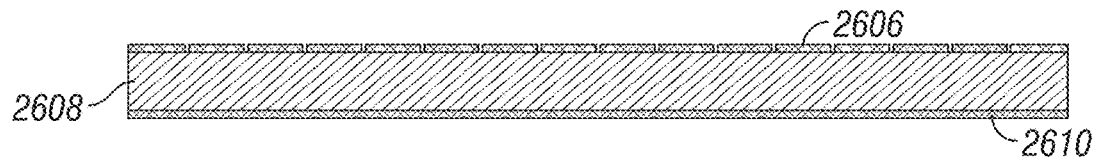
FIG. 27 depicts an embodiment of a single active layer of a beam steering device.

Referencing FIG. 27, an example beam steering device includes the high-side electrode layer 2606, the low-side electrode layer 2610, and the active cells 2608. In the example of FIG. 27, the high-side electrode layer 2606 is provided as a number of discrete electrodes, the low-side electrode layer 2610 is provided as a common ground electrode, and the active cells 2608 include portions of a monolithic EO active substrate layer that are positioned between each of the discrete high-side electrodes and a corresponding portion of the common low-side electrode. In the example of FIG. 27, the beam steering device does not include insulators between active cells and/or discrete high-side electrodes, but in certain embodiments the beam steering device of FIG. 27 is configured to manage fringing field losses to steering efficiency using a steering controller 2616 and/or voltage controller 2612 that are configured to reduce fringing field losses. In certain embodiments, the beam steering device of FIG. 27 is implemented with a half-wave voltage profile, for example as described in the disclosure referencing FIGS. 29-31. In certain embodiments, one or more portions of the example beam steering device in FIG. 27 are provided with an aspect ratio that is 1 or about 1.

Figure 28:
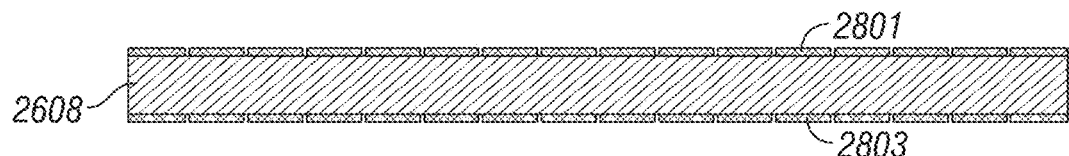
FIG. 28 depicts another embodiment of a single active layer of a beam steering device.

Referencing FIG. 28, an example beam steering device is depicted, similar to the beam steering device depicted in FIG. 27. The beam steering device in the example of FIG. 28 includes a discrete high-side electrode 2801 and an opposing discrete low-side electrode 2803. The beam steering device includes an EO active layer forming active cells 2608, with each active cell 2608 formed from a portion of the EO active layer between opposing electrodes 2801, 2803. In certain embodiments, one or more electrodes may omit an insulator therebetween, and/or the beam steering device of FIG. 28 may be operated in a half-wave voltage profile. In certain embodiments, for example depending upon the hardware and electrode types to implement the desired voltage profile on the electrodes, the utilization of discrete low-side electrodes 2803 may provide for a more convenient development of the voltage profile, such as by manipulating separate voltages on the low-side electrodes 2803.

In certain embodiments, for example where providing an aspect ratio of 1 or about 1 drives the design to a reduced number of electrodes per reset (e.g., due to the size of the aperture and/or beam steering device), a half-wave voltage profile may be combined with resistive electrodes, providing for some reduction in quantization losses while achieving the half-wave voltage profile advantage for fringing field losses. As will be described in the disclosure referencing FIG. 30, a half-wave voltage profile enforces a maximum fringing field region (flyback distance) that is equal to the distance between discrete electrodes. For comparison, a castle arrangement enforces a maximum flyback distance that is a width of one discrete electrode, and a chess arrangement enforces a maximum flyback distance that is a theoretical value of zero (e.g., where each electrode is surrounded by an insulator, limiting the edge effect at the extent of the electrode). Certain further considerations include the desirability of an aspect ratio of about 1 for half-wave voltage portions of a beam steering device, the desirability of a match in optical properties between the substrate and the EO active material for a castle arrangement portion of the beam steering device, and the desirability of a match in optical properties between the insulator and the EO active material for a chess arrangement portion of the beam steering device. One of skill in the art, having the benefit of the disclosures herein, can readily determine arrangements for a beam steering device utilizing various features described herein, including: the usage of insulators; a chess arrangement; a castle arrangement; selected aspect ratios; a selected voltage progression including a half-wave voltage profile; selected optical properties for the EO active layer, the substrate, and/or the insulator(s); and/or the utilization of a reflective layer. Certain considerations in determining which features are utilized for a particular beam steering device include, without limitation to any other aspect of the present disclosure: the desired device steering capability; steering efficiency; voltages provided and the control thereof; manufacturing considerations; and/or the desired size of the beam steering device.

Figure 29:
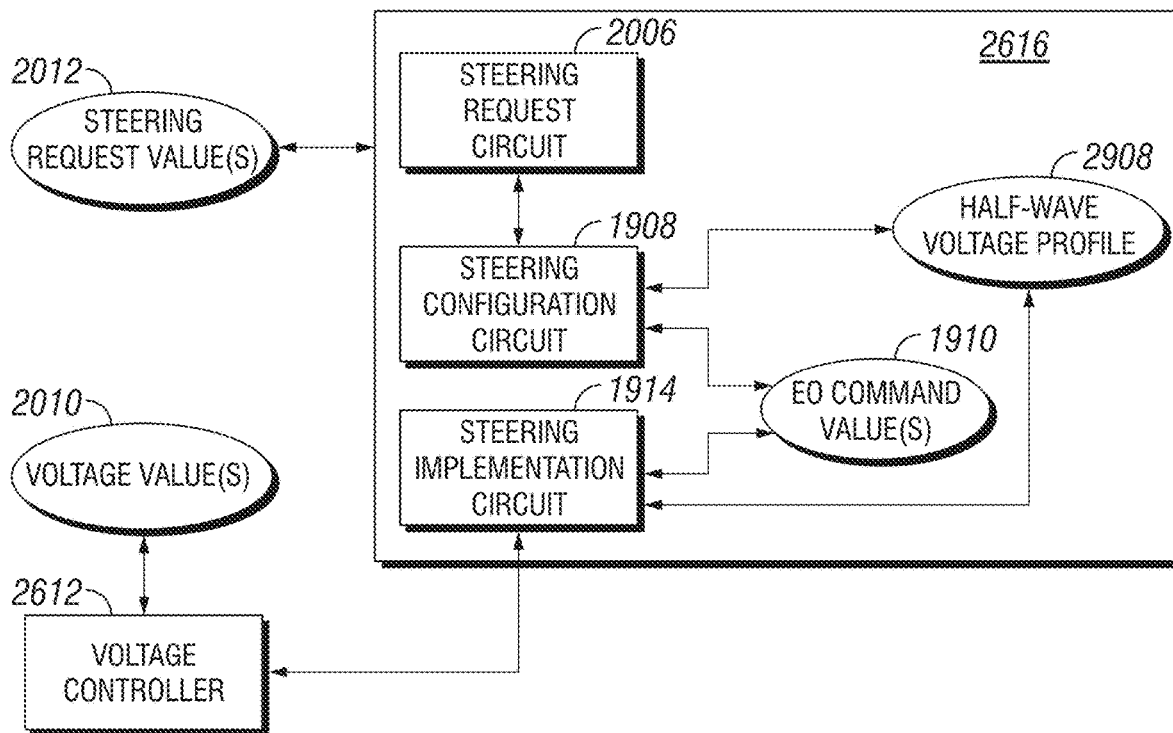
FIG. 29 is a schematic diagram of a controller for steering an incident EM beam.

Referencing FIG. 29, an example steering controller 2616 and voltage controller 2612 are configured to reduce fringing field losses in a beam steering device, including a beam steering device with or without insulating elements. The example steering controller 2616 includes a steering request circuit 2006 that determines steering value(s) 2012, for example steering directions, target locations, steering efficiency values, or the like. In certain embodiments, the steering value(s) 2012 include selected wavelengths or frequencies of incident EM radiation, selected polarities, selected steering axes, or other parameters. The example steering controller 2616 further includes a steering configuration circuit 1908 that determines EO command value(s) 1910, which may include desired optical characteristics (e.g., OPD changes) throughout the beam steering device that are responsive to the steering request value(s) 2012. In certain embodiments, the EO command value(s) 1910 are determined for one or more various layers in the beam steering device, for example layers that are responsive to selected wavelengths, polarities, efficiencies, axes of steering, etc. In certain embodiments, the steering configuration circuit 1908 utilizes a half-wave voltage profile 2908 to determine the EO command value(s) 1910, which may be utilized for one or more EO active layers in the beam steering device, and/or portions of one or more EO active layers. It can be seen that, in certain embodiments, one or more layers of a beam steering device may utilize a half-wave voltage profile 2908, while other layers of the beam steering device may be configured to utilize another voltage profile. The example steering controller 2616 further includes a steering implementation circuit 1914 that provides commands to the voltage controller 2612 responsive to the EO command value(s) 1910. In certain embodiments, the translation between the EO command value(s) 1910 and selected voltages for various active cells throughout the beam steering device may be performed by the steering implementation circuit 1914 (e.g., passing voltage commands directly to the voltage controller 2612), or by the voltage controller 2612 (e.g., translating EO command value(s) 1910 into voltage value(s) 2010 for electrodes in the beam steering device). The example voltage controller 2612 provides the voltage value(s) 2010 to electrodes (high-side electrodes, or both high-side and low-side electrodes), either by operating voltage control hardware (e.g., solid state switches, PWM devices, relays, or the like) directly, or by providing voltage value(s) 2010 to a hardware layer that is responsive to the voltage value(s) 2010 thereby energizing the electrodes in a manner that implements the EO command value(s) 1910 in active cells of the beam steering device.

Figure 30:
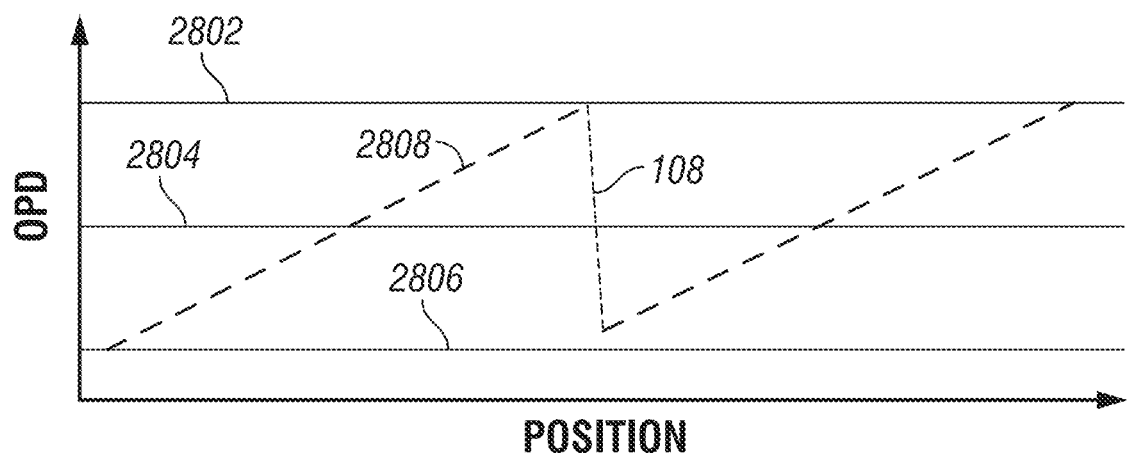
FIG. 30 is a graph depicting an example phase profile using a half-wave voltage profile.
Figure 31:
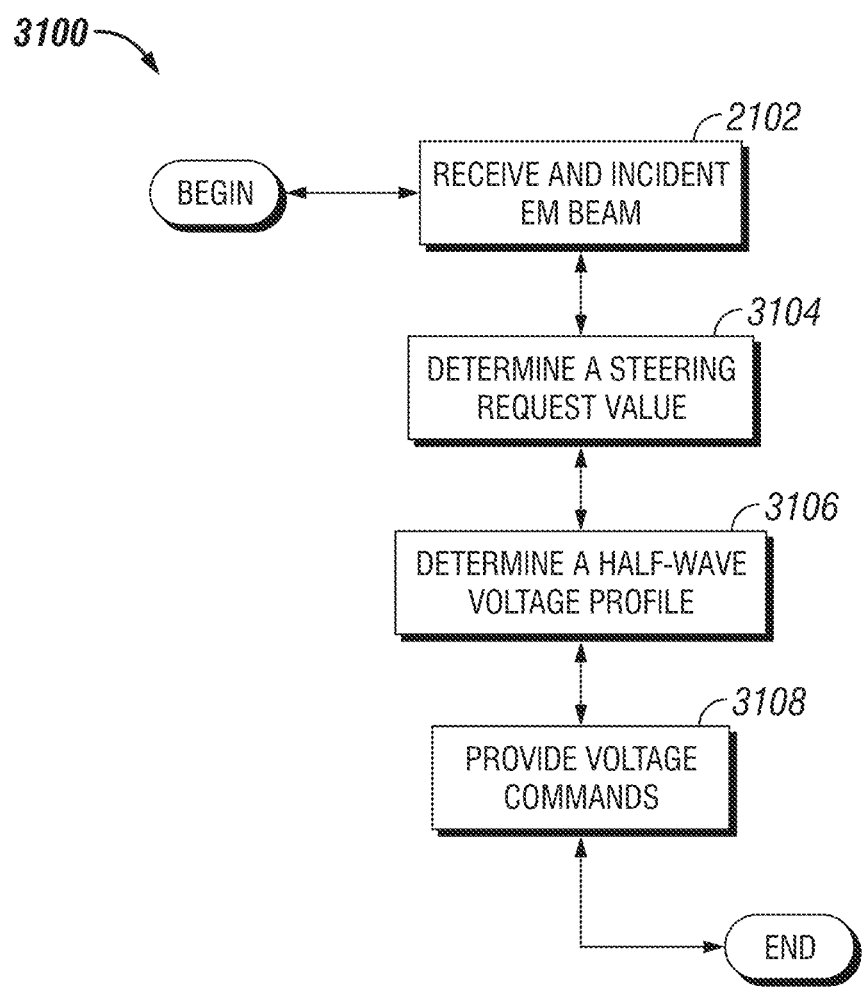
FIG. 31 is a schematic flow diagram of a procedure for operating an EM beam steering device.

FIG. 30 is an example depiction of a realistic phase profile 2808 which, according to modeling and calculations, it is believed to be achievable using various aspects of the present disclosure, including a steering controller 2616 and voltage controller 2612 such as depicted in FIG. 29, and/or using a procedure such as that depicted in FIG. 31. In the example of FIG. 30, the OPD progression 2806 is depicted as being above and below a nominal voltage 2804, with a positive and negative voltage relative to the nominal voltage, and may be referenced as a half-wave voltage profile. Additionally, in the example of FIG. 30, the aspect ratio is provided with a value of about 1. In the example of FIG. 30, the reset occurs between a positive voltage electrode and a negative voltage electrode. It has been found that a voltage profile such as that depicted in FIG. 30, combined with an aspect ratio of about 1, provides for a rapid reset of the voltage with fringing field region limited to the distance between electrodes even without the utilization of insulators, providing a significant decrease in fringing field losses at the reset. The example of FIG. 30 depicts resistive electrodes, although conductive electrodes may also be utilized. Because the maximum voltage in the EO active layer is one-half of the voltage in a nominal voltage phase delay profile (e.g., reset from a $2\pi$ delay voltage to a zero delay voltage), the thickness of the EO active layer using a half-wave voltage profile can be one-half of the thickness utilized for a nominal voltage phase delay profile. Additionally, the addition of a reflective layer (e.g., a reflective substrate, reflective ground electrode, or a dedicated reflective layer) can provide for a thickness of one-fourth the thickness utilized for a nominal voltage phase delay profile.

In certain embodiments, the utilization of an ultra-thin EO active layer (e.g., $\frac{1}{4}\lambda$, which may be 500 nm or less for certain steered wavelengths) provides for additional capabilities. For example, the small physical footprint and ease of manufacture provides for the ready addition of extra layers to steer additional wavelengths, incremental steering capability, and/or steering of additional polarities and/or axes of steering. In another example, the ultra-thin layer provides for increased energy throughput capability, as the thin layer absorbs a lower fraction of energy flow-through as heat, and has a more favorable heat rejection environment (lower capacity, and a shorter heat conduction path) that is amenable to an active or passive cooling system (e.g., a cooling layer in thermal contact with the reflective layer).

In the example of FIG. 30, the high voltage 2802 of the phase delay progression may be consistent with a $\pi$ phase delay, and the low voltage 2806 may be consistent with a $-\pi$ phase delay, such that at the reset position 108 a $2\pi$ (or $2\pi n$) reset is applied, but the total voltage in the system is relative to the nominal voltage 2804. Accordingly, it can be seen that the greatest magnitude of phase delay (and corresponding voltage) that is enforced by any active cell in the example of FIG. 30 is $\pi$ (either $+/-\pi$), and accordingly a greatest thickness required for an active cell can be as low as one-half $\lambda$, instead of $\lambda$, which is generally required when a magnitude $2\pi$ phase delay is applied within a single active cell.

The example of FIG. 30 depicts a symmetrical voltage profile (e.g., the high voltage value 2802 and the low voltage value 2806 are both the same distance from the nominal voltage value 2804), although the voltage profile may not be symmetrical. Additionally, a half-wave voltage profile may nevertheless be utilized with a greatest magnitude phase delay that exceeds $+/-\pi$, which may be symmetrical.

Referencing FIG. 31, an example procedure 3100 to steer an incident EM beam using a half-wave voltage profile is schematically depicted. The procedure 3100 includes an operation 2102 to receive an incident EM beam, and an operation 3104 to determine a steering request value for the incident EM beam. The example procedure 3100 further includes an operation 3106 to determine a half-wave voltage profile that is responsive to the steering request value—for example to provide an OPD profile on an EO active layer of a beam steering device that is responsive to the steering request value and the incident EM beam. The example procedure 3100 further includes an operation 3108 to provide voltage commands in response to the half-wave voltage profile, thereby configuring an EO active layer and steering the incident EM beam. The example operation 3108 includes providing a voltage progression across the EO active layer, and providing reset positions where the power of a last electrode (or capacitor) of a first delay stage is approximately equal and of opposite sign as the power of a first electrode (or capacitor) of a second delay stage. An example operation 3108 includes providing voltages such that the last electrode of the first delay stage has an approximately equal positive voltage compared to a negative voltage of the first electrode of the second delay stage.

Figure 32:
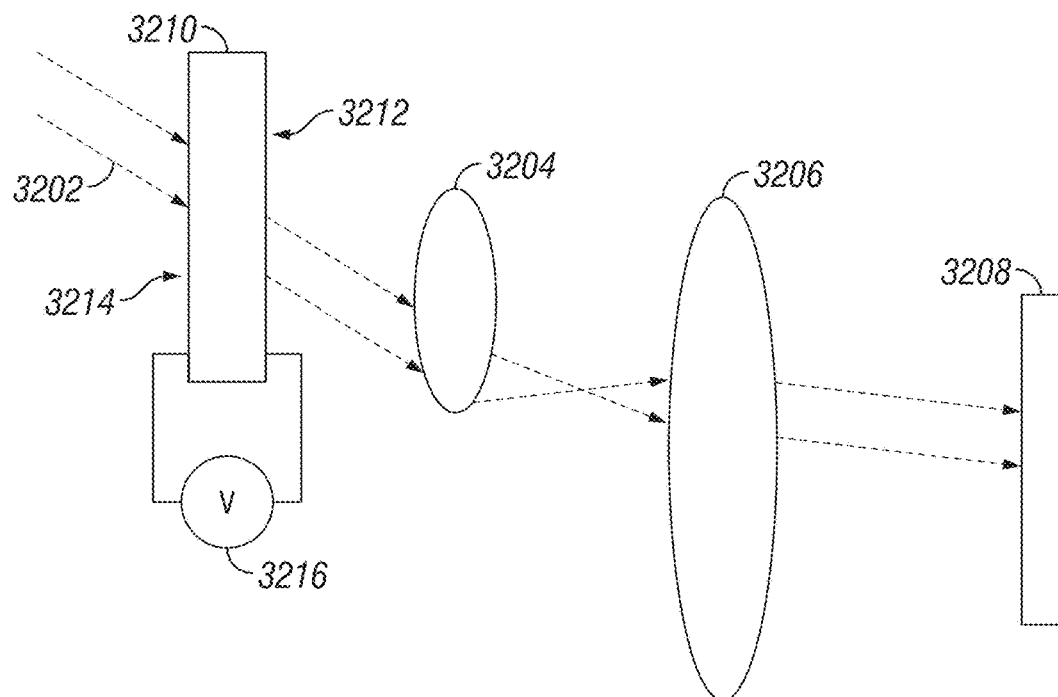
FIG. 32 is a schematic diagram of a beam steering device utilizing an electro-optical crystal.

Referencing FIG. 32, an EO bulk crystal 3210 is equipped with two transparent electrodes 3214, 3212. The transparent electrodes 3214, 3212 are located on opposing sides of EO bulk crystal 3210. The beam steering apparatus shown in FIG. 32 further comprises a first lens 3204 with focal length of $f_1$ and a second lens 3206 with focal length of $f_2$. Second lens 3206 is located at $f_1+f_2$ from the first lens 3204. The beam steering device also comprises a voltage supplier 3216.

The refractive index of the EO crystal slab 3210, or any other material whose index of refraction can be changed by the application of an electric field, is changed by varying the applied voltage on the transparent electrodes 3212, 3214 attached to both sides of the EO bulk crystal slab 3210. The linearly polarized beam 3202 which incidents on the EO bulk crystal slab 3210 by a fixed angle exits the EO bulk crystal slab 3210 with a same angle but its position will be altered by changing the index of the EO bulk crystal slab 3210 as a result of varying the applied voltage. That position change is converted to a change in angle by the first lens 3204. Because the beam 3202 is converged by the first lens 3204, a second lens 3206 is utilized to re-collimate the beam 3202. Thus, the combination of the first lens 3204 and second lens 3206 essentially form a telescope. Any form of telescope is suitable for this application, not just the form shown in FIG. 32. Optionally, a mirror 3208 is located after the second lens 3206. The deflection angle addressed by this bulk system can be approximately calculated using the following equation 6:

$$\Delta\theta_{def} = \frac{\theta d}{f1}\left(\frac{\Delta n}{n^2}\right) \qquad \text{EQ. 6}$$

Where θ is the incident angle, d is the EO crystal slab thickness, f1 is focal length of the first lens and n is the refractive index of the EO slab 3210.

The deflection angle in the slab 3210 method can be increased without having a thicker crystal or increasing the applied voltage, by having more slabs in series, and/or making the last surface of the last slab reflective. Having several slabs 3210 in series and making the last surface reflective will make the optical beam travel through more EO crystals and will result in a higher position change, and therefore a higher deflection angle, without having to apply a higher voltage. The two sides of each slab 3210, except the right side of the last slab, is covered by uniform transparent electrodes 3212, 3214. The beam is reflected by the reflective layer of the final slab and goes all the way through the EO crystal slabs 3210 again to get a larger position change. The larger position change will result in a wider deflection angle. An optional final reflector could be added after the slab exit so the exiting light is going the same direction as the entering light, except for the deflection angle.

Figure 33:
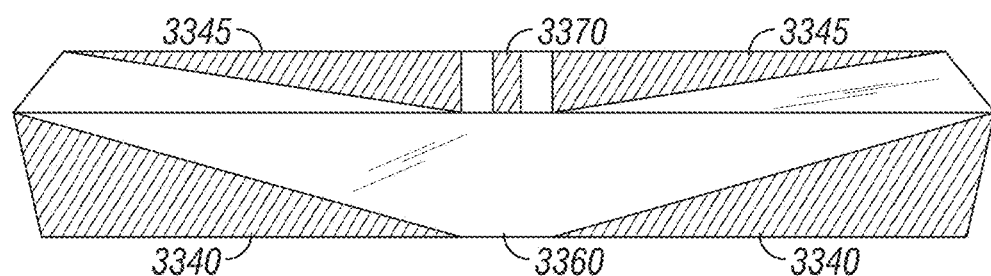
FIG. 33 is a schematic diagram of a beam steering device utilizing a bulk crystal.

Referencing FIG. 33, an example system for steering light using Kerr effect based EO crystals is depicted. This is referred to as bulk beam steering because the beam steering occurs in a bulk material, not a thin material. Moreover, bulk beam steering does not require any voltage resets. The configuration of the beam and bulk crystals should be configured such that the steered beam will not impinge on the side of the bulk crystal. Additionally, a large crystal may require high voltages to apply the desired index change in the crystal. Certain embodiments herein utilize an exit face configuration, for example a concave exit face configuration, that amplifies the steered amount of the beam that is achieved within the bulk crystal, to provide for enhanced steering capability while allowing for a smaller steered amount within the bulk crystal body.

To create steering using either the linear or the quadratic electro-optical effects, a high electric field is applied to the bulk crystal. The example of FIG. 33 utilizes patterned electrodes 3340, 3345 that apply a voltage across steering portions of the bulk crystal 3360. Note that the embodiment depicted in FIG. 33 utilizes electrodes in each dimension of the crystal, providing for steering in two dimensions. EO crystals often have distinct steering capability in both dimensions, with the steering capability in one dimension being significantly more capable than the steering capability in the other dimension. Accordingly, one of the dimensions (e.g., electrodes 3340 or 3345) may be omitted, with the system steering in only one dimension, and/or discrete slab portions may be utilized to steer the beam in a second dimension (e.g., passing from a first slab oriented in a first steering direction, and the second slab oriented to steer in the second steering direction).

Figure 34:
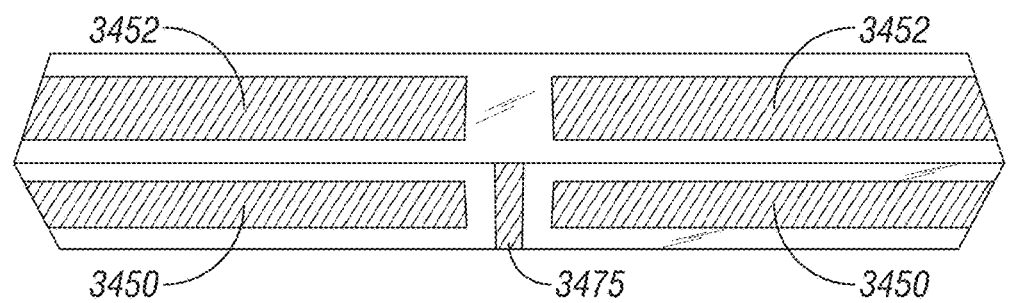
FIG. 34 is a schematic diagram depicting an alternate view of the embodiment presented in FIG. 33.

Referencing FIG. 34, rectangular shaped electrodes 3450, 3452 are arranged on the opposite sides of the Kerr effect crystal 3360 from each patterned/triangular shaped electrode 3340, 3345, for example as grounding or low-side voltage electrodes. The rectangular electrode 3450, 3452 in the example of FIG. 34 are kept away from the long side edges of the crystal to prevent arcing. Any arrangement of low-side electrodes 3450, 3452 is contemplated herein, and the positioning of the electrodes and/or proximity of the electrodes to the edges may be determined based upon the high-side voltage electrode 3340, 3345 configurations, the desired steering in the bulk crystal 3360, and/or the voltages present in the system during steering operations. The example rectangular electrodes 3450, 3452 can be used as a ground plane, but can be kept at any voltage.

As FIGS. 33 and 34 disclose, an embodiment includes at least four triangular/patterned electrodes, two top conductive electrodes 3345 and two side conductive electrodes 3340. This embodiment also includes at least four low-side voltage electrodes on opposing sides of the bulk crystal 3360 relative to the high-side electrodes 3345, 3340. The example embodiment includes a top polarizer conductive electrode 3370, arranged between the top conductive electrodes 3345. In the example, the polarizer conductive electrode 3370 allows for rotating the light polarization between steering portions of the bulk crystal 3360. Additionally or alternatively, bulk crystal 3360 portions may be rotated for each steering portion (or a subset of steering portions), with a half-wave plate, anti-reflective coating, or other configuration to manage the steered incident beam traversing between steered portions that may have different steering orientations. In the example of FIG. 34, an additional polarizing electrode 3345 is provided between the low-side electrodes 3450.

In certain embodiments, the bulk crystal 3360 is operated in the Kerr effect region, and polling of the ferroelectric domains is not required, allowing for electrodes on two sides of the crystal 3360, with steering in two dimensions within the same section of the crystal 3360. In certain embodiments, steering may be performed in two dimensions in separate sections of the crystal 3360, for example to enhance the steering capabilities in each dimension. In certain embodiments, the bulk crystal 3360 may be operated in a Pockels effect region, thus the bulk crystal 3360 may be operated in either the paraelectric (Kerr effect) or the ferroelectric (Pockels effect) region, depending upon the selected crystal, operating temperature, and desired steering voltages to be utilized.

While FIGS. 33, 34 depict each steering section of the crystal 3360 as the same length, each steering section can be any length. The embodiment of FIGS. 33, 34 is for illustrative purposes of one possible implementation. In addition, the amount of angular beam steering does not have to be the same in each direction.

Figure 35:
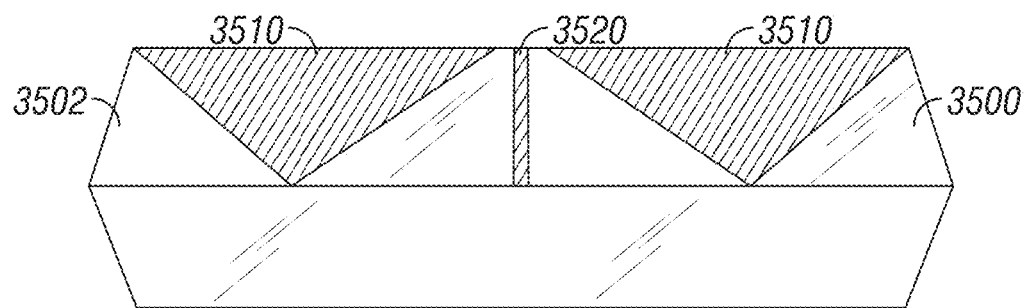
FIG. 35 is a schematic diagram of a beam steering device utilizing a bulk crystal.
Figure 36:
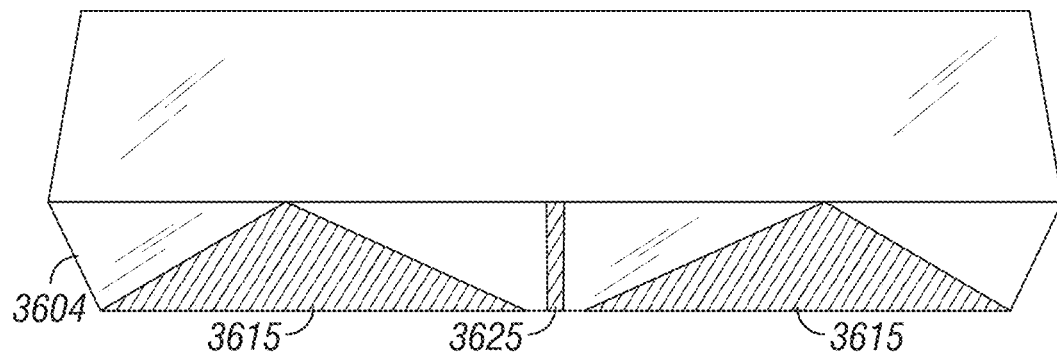
FIG. 36 is a schematic diagram depicting an alternate view of the embodiment presented in FIG. 35.

Referencing FIG. 35, an embodiment comprising a single EO crystal 3500 in an appropriate crystal class such as 4 mm or 3 m is depicted, with the electric field in a single direction, to do beam steering in both dimensions, rather than using 2 crystals. Additionally or alternatively, both steering portions of the embodiment of FIG. 35 may be applied to the same steering dimension, allowing for enhanced steering capability in the steered dimension. The embodiment further includes EO crystal 3500 having a top shaped or patterned electrodes 3510 with a polarizing electrode 3520 therebetween. In certain embodiments, the crystal 3500 may include two bulk crystal portions adjoined and oriented at distinct axes, with the polarizing electrode 3520 additionally or alternatively including a half-wave plate or anti-reflective coating. Referencing FIG. 36, in the embodiment depicted there are additionally included bottom electrodes 3615 that provide the low-voltage side match for electrodes 3510, with a low-side polarizing electrode 3625, half-wave plate, and/or anti-reflective coating optionally provided between steering portions. The electrode pattern shown on the bottom of the EO crystal 3500 in FIG. 36 is similar to the electrode pattern on the top shown in FIG. 35, although the low-side electrodes may be in any configuration including rectangular electrodes, a common ground electrode, etc. A correct fixed DC voltage is applied on polarizer electrode 3520 (where present) but any voltage can be applied to electrodes 3510, 3615. Because the electric field is applied in one direction, the deflection angle in one dimension will be smaller than the other dimension. That can be slightly compensated by increasing the length and/or the applied voltage on the electrodes responsible for steering to that dimension.

A benefit of the FIGS. 35, 36 embodiment is to allow beam steering for either Kerr effect or Pockels effect crystals while only using a single crystal, polled in only a single direction. In certain embodiments, polarization is rotated between sections of the EO crystal 3520. Because of the properties of the EO crystal 3500, rotating the polarization causes the beam to steer in a different dimension.

Figure 37:
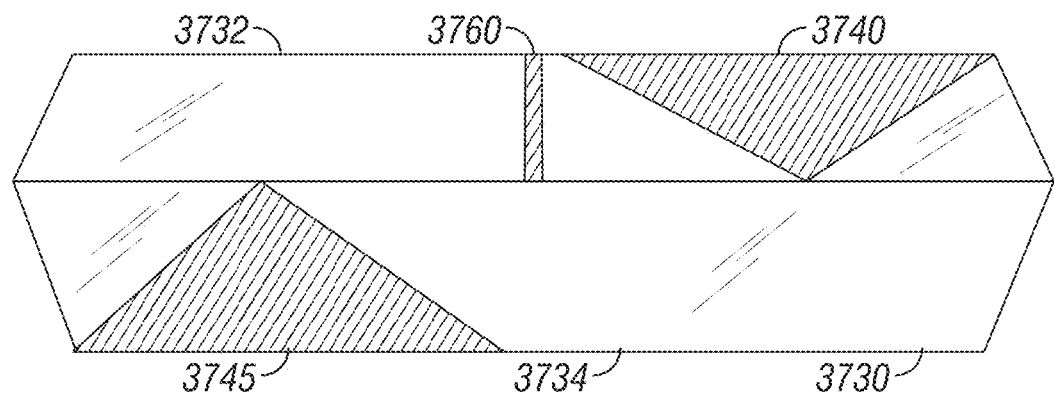
FIG. 37 is a schematic diagram of a beam steering device utilizing a bulk crystal.

Referencing FIG. 37, an example EO crystal 3730 performs beam steering to a wide angle, in one or both dimensions, within a compact structure. The example of FIG. 36 may utilize a single crystal to perform steering in both directions, and/or may include two integrated crystal portions each having a distinct steering axis, with a polarizing electrode 3760, a half-wave plate, and/or an anti-reflective coating interposed between the steering portions (e.g., the crystal portion 3730 influenced by electrode 3740 as a first steering portion, and the crystal portion 3732 influenced by electrode 3745 as a second steering portion, in the example of FIG. 37). Referencing FIG. 38, an opposing side of the embodiment of FIG. 37 is depicted, with opposing low-side electrodes 3850, 3855 and an opposing low-side polarizing electrode 3865 depicted in the example. As described throughout the present disclosure, low-side electrodes 3850, 3855 may be shaped to match the high-side electrodes 3740, 3745, provided as a lower voltage, negative voltage, and/or ground/reference voltage, and/or may be included as common ground electrodes.

Figure 38:
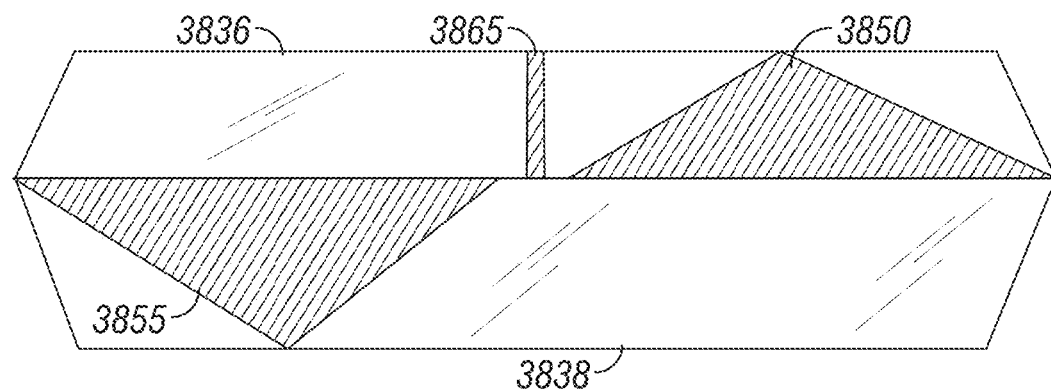
FIG. 38 is a schematic diagram depicting an alternate view of the embodiment presented in FIG. 37.
Figure 39:
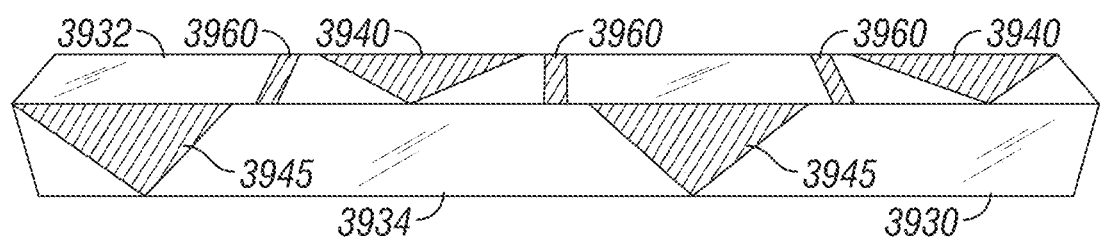
FIG. 39 is a schematic diagram of a beam steering device utilizing a bulk crystal.

Referencing FIG. 39, an embodiment is depicted that is similar to the embodiment depicted in FIGS. 37 and 38, with additional steering portions added to enhance the steering capability of the bulk steering device. The embodiment of FIG. 39 depicts sequential steering portions of a bulk crystal 3930, 3934 (which may be integrated abutting steering crystals having distinct orientations) with associated high-side electrodes 3945, 3940 in the appropriate steering dimensions. Although the embodiment of FIG. 39 depicts alternating steering dimensions (e.g., XYXY), in certain embodiments the steering dimensions may be sequenced in any manner (e.g., XXYY, or XYYX). Additionally or alternatively, the example of FIG. 39 depicts four steering portions (e.g. XYXY), although any number of steering portions may be provided within a given steering device. Additionally or alternatively, the number of steering portions associated with each steering direction, where more than one steering direction is applied, may be the same number or a different number (e.g., XXYYY, XXXXY, XXYXX, etc.). It can be seen that grouping steering in the same dimension within sequential portions may provide for certain efficiencies (e.g., fewer transitions between crystal interfaces and/or polarizing portions), while switching steering dimensions between sequential portions may improve the overall capability for steering without impinging on the side of a given crystal section. To steer to larger angles, the embodiment shown in FIG. 37-38 (or FIG. 39) can be repeated as desired. Additionally or alternatively, for example as depicted in other embodiments of the present disclosure, the size of the crystal 3930 may be increased as the steering portions progress to compensate for the steering of the incident EM beam. Additionally or alternatively, the size progression of the crystal 3930 can be dimensionally configured—for example a greater increase in an X steering direction than in a Y steering direction, for an example where the X steering angle is greater than the Y steering angle.

In certain embodiments, as depicted in FIG. 39, the beam is steered partially in one direction and then steered at least partially in a second direction through steering portions of the crystal. Accordingly, the incident EM beam is steered gradually in each direction and the polarization of light is flipped as needed by the polarizer electrodes 3960 (and/or integrated half-wave plates, and/or utilizing re-oriented crystal portions) to make the light see the index change in different directions. The steering to each direction is done incrementally, and in successive steps. Similarly, voltages applied at electrodes 3940, 3945 for each steering portion are applied selectively to provide the desired steering in each steering portion, and appropriate voltages are applied for each polarizing electrode 3960 (where used). An example utilizes selected DC or AC voltages for adjusting steering angles, and fixed DC voltages for rotating the light polarization (where used) to make the light see the index change in another direction.

Figure 40:
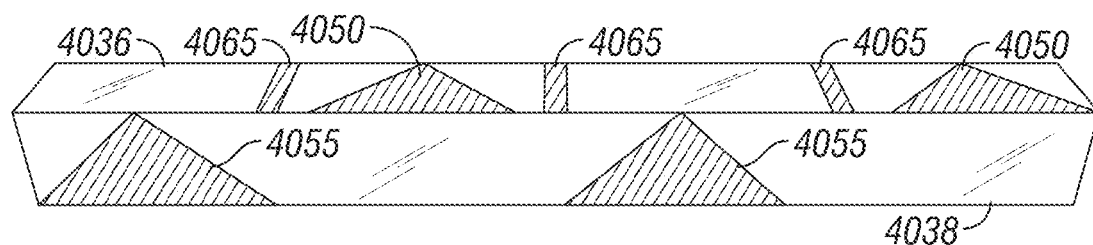
FIG. 40 is a schematic diagram depicting an alternate view of the embodiment presented in FIG. 39.

Referencing FIG. 40, an opposite side of the steering device depicted in FIG. 39 is depicted. The example steering device of FIG. 40 depicts opposing low-side electrodes 4055, 4050 corresponding to each of the high-side electrodes 3945, 3940 of the embodiment of FIG. 39, and corresponding low-side polarizing electrodes 4065 corresponding to each of the polarizing electrodes 3960 of FIG. 39. The low-side electrode arrangement of FIGS. 39-40 may be any configuration as described throughout the present disclosure, and may include matching geometries, simplified geometries, lower or negative voltages, ground voltages, etc.

Figure 41:
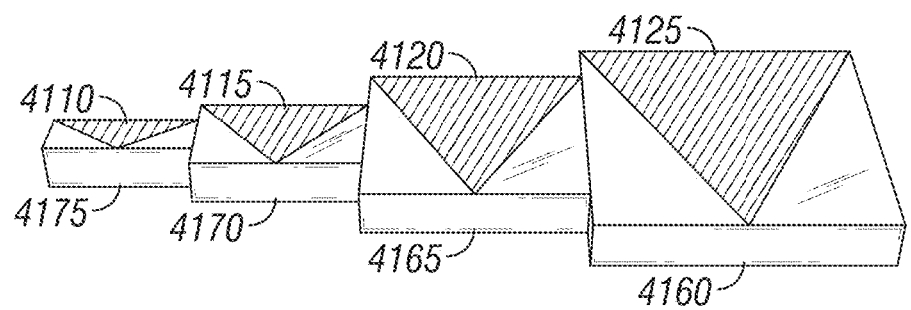
FIG. 41 is a schematic diagram of a beam steering device utilizing a bulk crystal.
Figure 42:
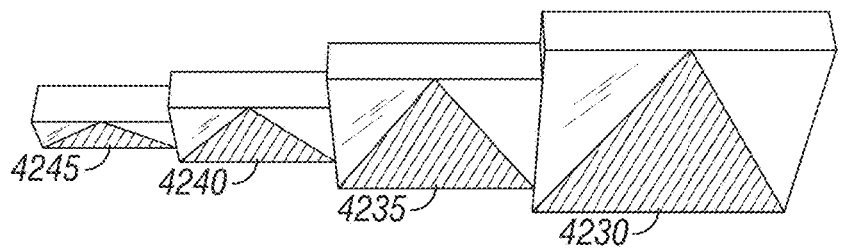
FIG. 42 is a schematic diagram depicting an alternate view of the embodiment presented in FIG. 41.

Referencing FIGS. 41-42, an example embodiment of a bulk steering device having high steering capability in a selected dimension is depicted. The example of FIG. 41 includes sequential bulk EO crystal portions 4175, 4170, 4165, 4160 having an increasing size in the steered direction. The example of FIG. 41 includes a number of discrete crystal portions having an increasing size, which may include an integrated crystal manufactured as shown, and/or adjoined crystal portions (including, in an example, an anti-reflective coating between adjoining portions, such as when an index between each portion may be distinct). The example of FIG. 41 includes discrete crystal portions of increasing size, but the crystal may additionally or alternatively increase in a continuous fashion (e.g., a flaring shape), and/or in combinations of discrete sized portions and continuously increasing size portions. The example of FIG. 41 includes high-side electrodes 4110, 4115, 4120, 4125 associated with each steering portion and configured to apply a selected voltage to each associated steering portion. Referencing FIG. 42, an opposite side of the embodiment of FIG. 41 depicts low-side electrodes 4245, 4240, 4235, 4230 associated with each of the steering portions. The low-side electrode arrangement of FIG. 42 may be any configuration as described throughout the present disclosure, and may include matching geometries, simplified geometries, lower or negative voltages, ground voltages, etc. The embodiment of FIGS. 41-42 allows for significant steering angles within the bulk crystal without impingement of the steered incident EM beam onto a side of any one of the steering portions, while minimizing or reducing the amount of bulk crystal material, applied voltages, and the like.

As discussed above, EO crystals 4175, 4170, 4165, 4160 may include other materials whose index is modified by the application of an electric field. If $W_i$ and $L_i$ are the width and length of each of the bulk crystals (and/or the width and length of each of the steering portions), a preferable number of triangular electrodes may be approximately determined using the following equation 7:

$$N_{opt} = 0.87 \frac{L_i}{W_i} \qquad \text{EQ. 7}$$

For the embodiment depicted in FIGS. 41-42, the deflection angle of the steered incident EM beam can be calculated using the following equation 8. Equation 8 may be utilized as a design time equation, for example to design the bulk crystal and/or steering portions having a desired steering capability, and/or equation 8 may be utilized as a run-time equation, for example to determine the indices to be applied at each of the steering portions (and therefore the applied voltages at the electrodes) to achieve a steering request value and/or steering command value (or other selected steering amount).

$$\theta_f = \Delta n \Sigma \frac{L_i}{W_i} \qquad \text{EQ. 8}$$

Figure 43:
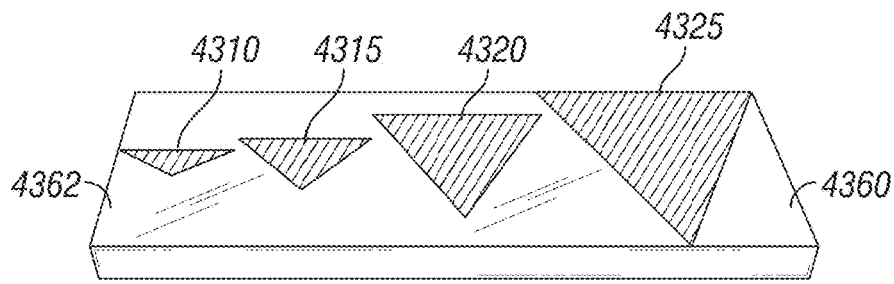
FIG. 43 is a schematic diagram of a beam steering device utilizing a bulk crystal.

Referencing FIG. 43, an example bulk steering device includes a bulk crystal having a first end 4362, for example where an incident EM beam is received, and a second end 4360, for example where a steered incident EM beam is emitted. The example of FIG. 43 includes a number of successively sized electrodes 4310, 4315, 4320, 4325 structured to provide selected indices within the crystal as the incident EM beam is steered. The example of FIG. 43 provides a similar practical steering capability to the example of FIGS. 41-42, with a simplified crystal geometry. It can be seen that the example of FIG. 43 includes portions of the crystal that are not utilized in the active steering of the incident EM beam, but trades excess unutilized crystal material for simplification in manufacturing and fabrication of the bulk crystal device.

Figure 44:
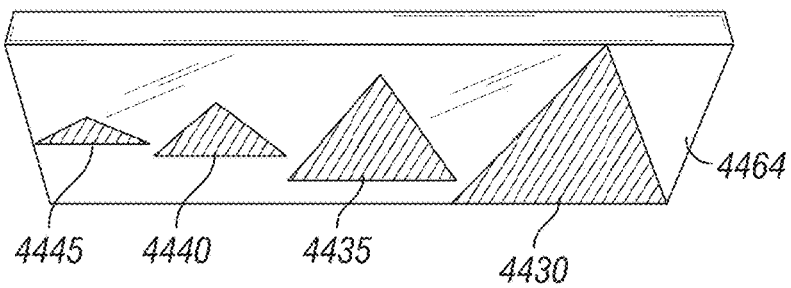
FIG. 44 is a schematic diagram depicting an alternate view of the embodiment presented in FIG. 43.

The high-side electrodes 4310, 4315, 4320, 4325 are depicted as having a size and position to implement selected steering portions of the device to provide the desired steering capability. However, the high-side electrodes may have any configuration, and may be configured during design-time or run-time, for example with pixelated high-side electrode portions (e.g., solid state devices) that may be controllable to provide the selected voltages, and therefore actuation of high-side electrode portions in run-time. In the example, with a grid of pixelated electrode elements positioned on the bulk crystal, the size and spacing of electrode elements 4310, 4315, 4320, 4325 may be configured during run-time of the crystal to provide for flexible capability. The sizing and spacing of electrodes and steering portions in the example of FIG. 43 may be provided in accordance with equations 7 and 8 as set forth preceding, with the length and width of crystal portions adjusted to be effective lengths and widths in accordance with the electrode positioning. The example of FIG. 44 provides an opposite side view of the embodiment of FIG. 43, with opposing low-side electrodes 4445, 4440, 4435, 4430 positioned on the opposite side 4464 of the bulk crystal. As in the example of FIG. 43, the low-side electrodes may be pixelated, solid state electrode elements, and/or may be any configuration as described throughout the present disclosure, and may include matching geometries, simplified geometries, lower or negative voltages, ground voltages, etc.

As seen in the embodiments shown in FIGS. 41-44, discrete electrode patterns to steer the linearly polarized beam to a larger angle are used compared to conventional deflectors. In FIGS. 41-44, the deflection angle is increased by reducing the width of the discrete triangular electrodes at the input of the crystal and gradually increasing the width of the discrete triangular electrodes, potentially up to the width of the rectangular EO crystal 4360.

Figure 45:
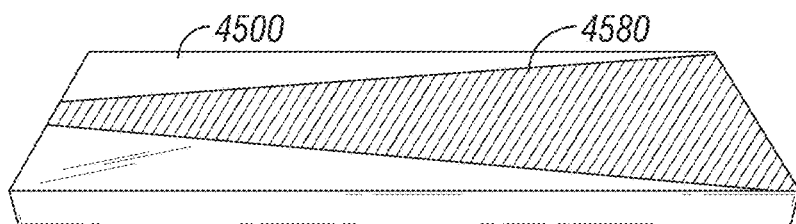
FIG. 45 is a schematic diagram of a beam steering device utilizing a bulk crystal.
Figure 46:
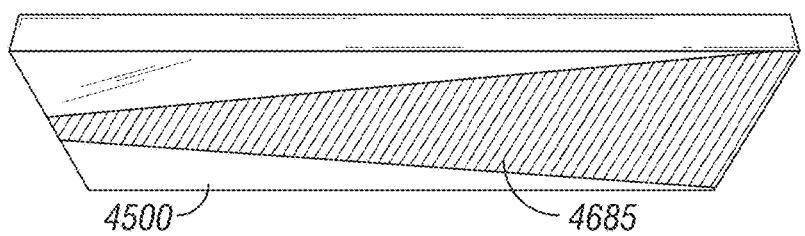
FIG. 46 is a schematic diagram depicting an alternate view of the embodiment presented in FIG. 45.
Figure 47:
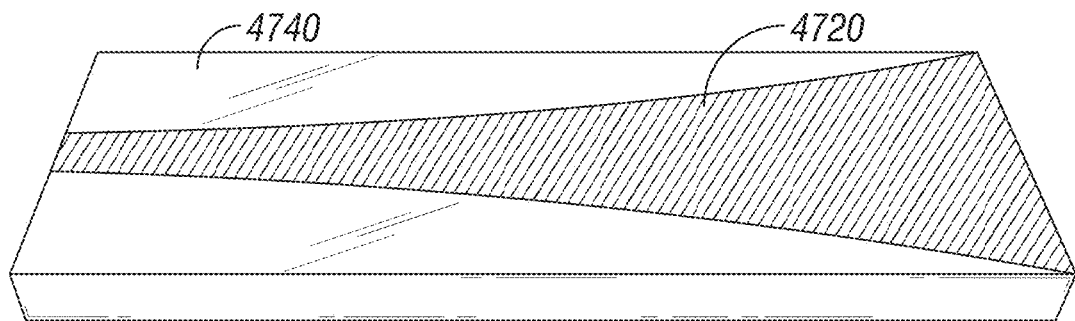
FIG. 47 is a schematic diagram of a beam steering device utilizing a bulk crystal.
Figure 48:
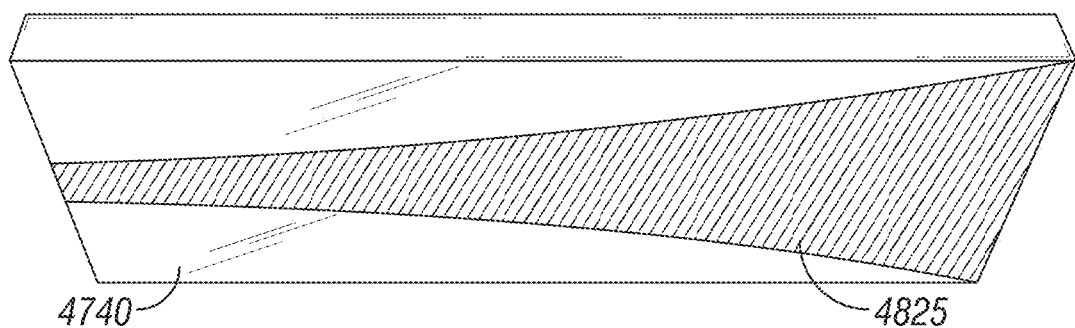
FIG. 48 is a schematic diagram depicting an alternate view of the embodiment presented in FIG. 47.

Referring to FIGS. 45 and 47, an embodiment of the bulk crystal steering device includes the deflection angle being increased by reducing the electrode 4580 width at the input of the crystal and gradually increasing it to the width up to the width of the rectangular EO crystal 4500. Increasing the width of the electrode can be either linear, as shown in FIG. 45 or nonlinear, as shown in FIG. 47 in relation to crystal 4740. In FIGS. 45 and 47 the top electrode 4580, 4720 is resistive, with a voltage gradient across the electrode. In certain embodiments, the electrode 4580, 4720 is shaped in accordance with the voltage potential applied across the crystal 4500, 4740 (e.g., linear or a non-linear response), and/or to ensure steering of the incident EM beam as it traverses through the crystal 4500, 4740. Referencing FIGS. 46 and 48, the opposite side of the embodiments of FIGS. 45 and 47, respectively, are shown with a ground electrode 4685, 4825 positioned thereon and in a similar geometry to the electrodes 4580, 4720. As in the example of FIG. 43, the high-side electrodes 4580, 4720 and/or low-side electrodes 4685, 4720 may be pixelated, solid state electrode elements, and/or may be any configuration as described throughout the present disclosure, and may include matching geometries, simplified geometries, lower or negative voltages, ground voltages, etc.

In the embodiment shown in FIGS. 45 and 46, the electrode 4580, with its linearly increasing width, is arranged on a top side of bulk EO crystal 4500. Electrode 4580 may comprise a resistor. Bottom electrode 4585, also with a linearly increasing width, is arranged on a bottom side of bulk EO crystal 4500. Bottom electrode 4685 may also comprise a resistor.

FIG. 47 shows a nonlinear shaped electrode 4720 arranged on a top side of bulk EO crystal 4740. Nonlinear shaped electrode 4720 may comprise a resistor. A second electrode 4825 is arranged on the bottom side of EO Crystal 4740. If L is the length of the crystal, and $W_i$ and W are respectively the inlet width and crystal width, the angle of deflection may be calculated using the following equation 9:

$$\theta_f = \frac{L \Delta n}{\overline{W}} \qquad \text{EQ. 9}$$

Where the $\overline{W}$ is logarithmic mean of $W_i$ and W. In certain embodiments, equation 9 may be utilized as a design time equation (e.g., designing the width of the crystal and/or configuration of the electrodes) and/or as a run time equation (e.g., controlling the voltage, and therefore index of refraction) to steer the incident EM beam as desired.

Figure 49:
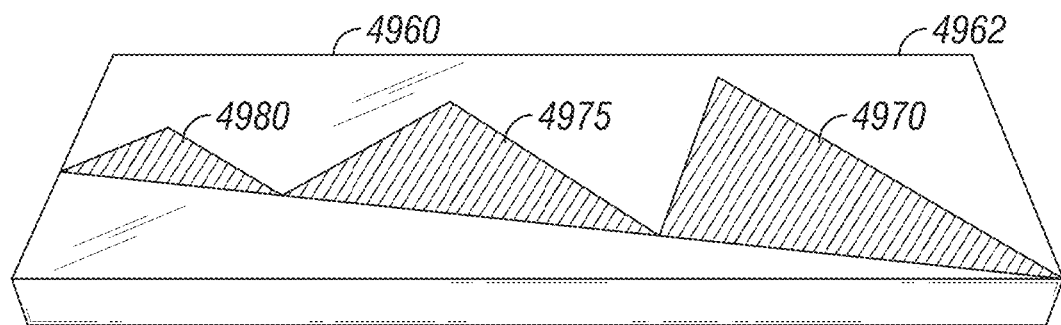
FIG. 49 is a schematic diagram of a beam steering device utilizing a bulk crystal.
Figure 50:
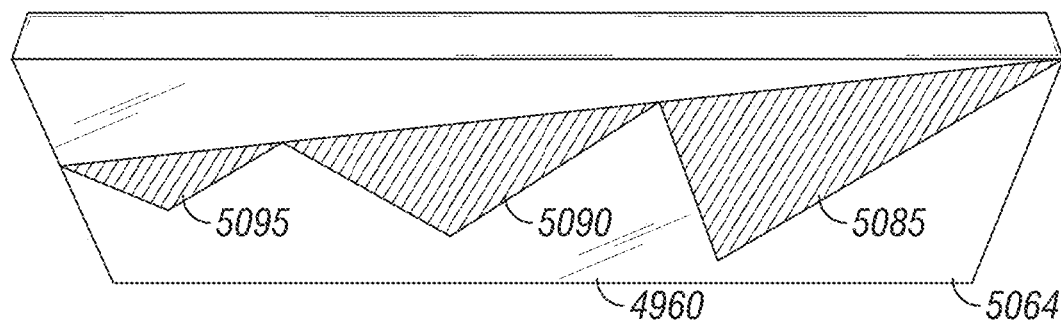
FIG. 50 is a schematic diagram depicting an alternate view of the embodiment presented in FIG. 49.

Referring now to FIG. 49, instead of using resistor electrodes, as in the embodiments shown in FIG. 45 and FIG. 47, triangular conductive (e.g., silver) electrodes may be used. Specifically, EO bulk crystal 4960 comprises a top 4962 where a series of non-discrete conductive electrodes 4980, 4975, 4970 are located. Referencing FIG. 50, a second series of non-discrete conductive electrodes 5085, 5090, 5095 are arranged on the bottom 5064 of EO crystal 4960. The first and second series of non-discrete conductive electrodes may comprise more or less than three electrodes. An example single bulk EO crystal 4960 should be polled to work in the ferroelectric region. The number of triangular electrodes for a rectangular EO crystal with length of L and width of W may be calculated from the equation 7. An example embodiment of FIG. 21 includes a same voltage applied on the triangular electrodes 4980, 4975, 4970, although distinct voltages may be applied to achieve the desired steering of the incident EM beam.

Figure 51:
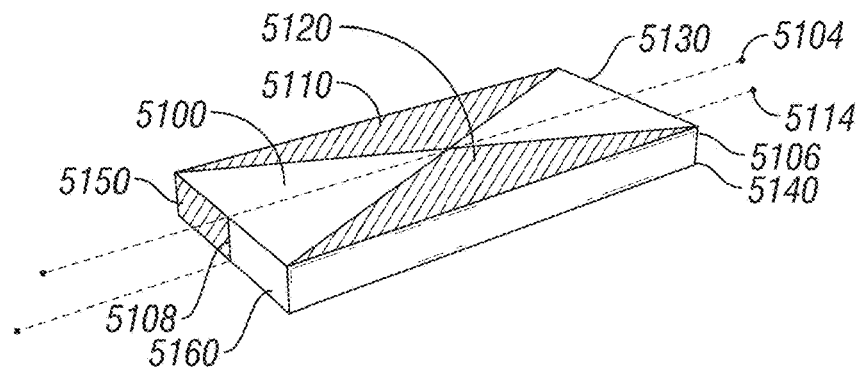
FIG. 51 is a schematic diagram of a beam steering device utilizing a bulk crystal.

Referring to FIG. 51, another embodiment for deflecting the beam to a larger angle is depicted. The example of FIG. 51 includes a single butterfly deflector having an EO bulk crystal 5100 having a first top conductive electrode 5110 and a second top conductive electrode 5120 arranged on a top side of EO bulk crystal 5100. First top conductive electrode 5110 and a second top conductive electrode 5120 are triangular in shape and are arranged on the top side such that each of said electrodes longest sides run along the outside edges of the top side's longest sides and the vertex of each triangle points to a centerline 5104 of the top side. EO bulk crystal 5100 further comprises a first end 5106 and a second end 5108 that are perpendicularly disposed between the top side and a bottom side of the crystal 5100. The first end 5106 comprises a light entering portion 5130 and a first reflective portion 5140 separated by the centerline 5104. The second end 5108 comprises a light exit portion 5160 and a second reflective portion 5150. In the example of FIG. 51, an incident EM beam enters the first end 5106, reflects off the second reflective portion 5150, reflects off the first reflective portion 5140, and exits the bulk steering device. Accordingly, the incident EM beam traverses the bulk steering device three times before exiting.

Figure 52:
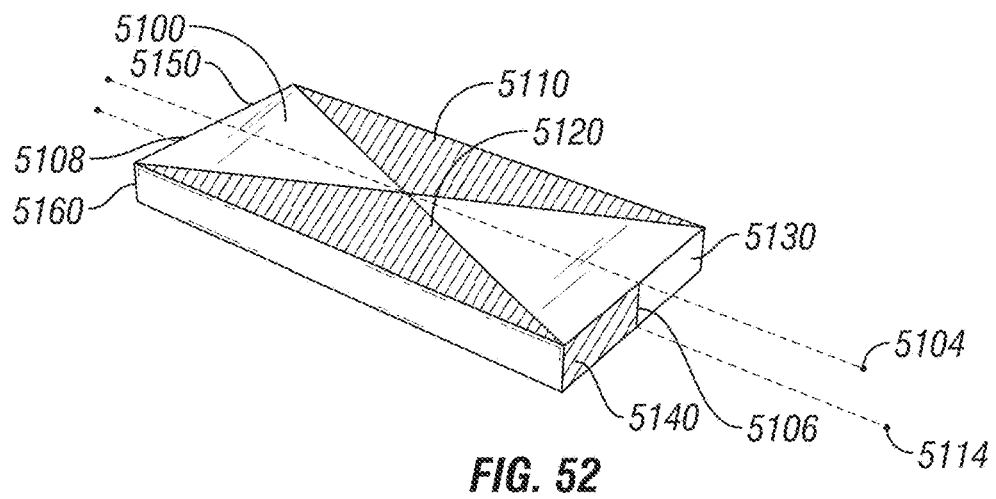
FIG. 52 is a schematic diagram depicting an alternate view of the embodiment presented in FIG. 51.
Figure 53:
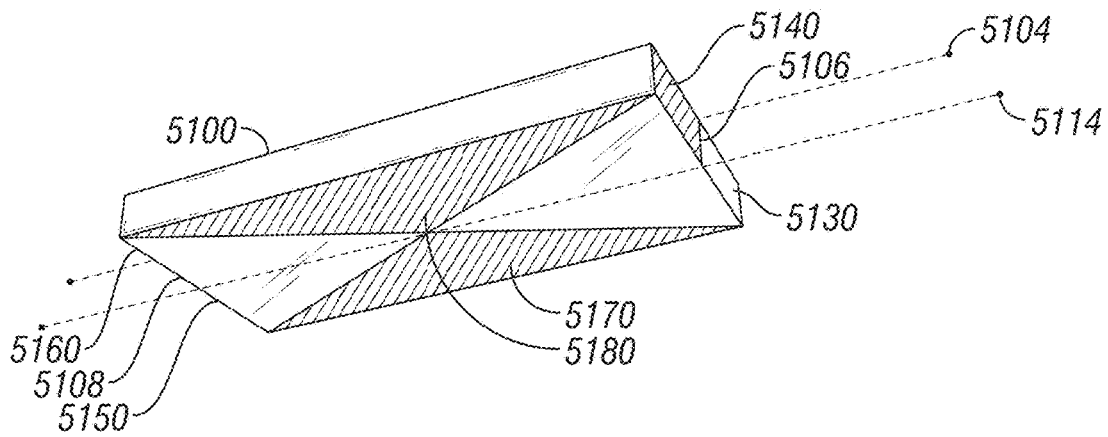
FIG. 53 is a schematic diagram depicting an alternate view of the embodiment presented in FIG. 51.

Referencing FIG. 52, another perspective of the example steering device of FIG. 51 is depicted. Referencing FIG. 53, an opposite (bottom, in the example) side of the example steering device of FIG. 51 is depicted. The example of FIG. 53 includes a first bottom conductive electrode 5170 and a second bottom conductive electrode 5180 arranged on the bottom side of the bulk steering device, separated by a centerline 5114 on the bottom side. In the example, the first bottom electrode 5170 is arranged opposite the first electrode 5110, and the second bottom electrode 5180 is arranged opposite the second electrode 5120. Consequently, the vertex of the first 5170 and second 5180 bottom electrodes point to the centerline 5114 of the bottom side. The linear polarized beam enters crystal 5100 at the light entering portion 5130. The beam will be deflected by the crystal and hits the reflective portions 5140, 5150 and finally exits EO bulk crystal 5100 after two times of reflection, thus, traversing the crystal three times. The angle of deflection provided by the butterfly deflector can be calculated using the following equation 10.

$$\theta_f = \frac{3L\Delta n}{W} \qquad \text{EQ. 10}$$

Where L and W are the length and width of the crystal. As shown, the angle of deflection in butterfly deflector will be simply three times more than conventional EO beam deflector with the same length, width, and applied voltage.

Figure 54:
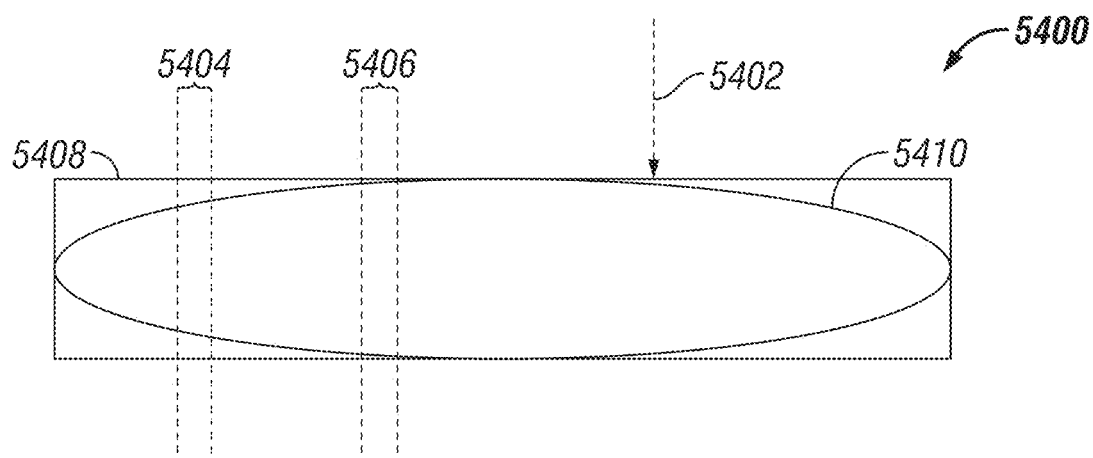
FIG. 54 is a schematic diagram of a varifocal lens.

Referencing FIG. 54, an example varifocal lens (VFL) 5400 consistent with certain embodiments of the present disclosure is depicted. The example varifocal lens includes a bulk EO crystal material 5410, responsive to applied voltage gradients to adapt an index of refraction and/or birefringence therein. In the example of FIG. 54, an applied voltage gradient forms an affected area 5410 of the VFL, providing for an increased voltage gradient away from the center of the VFL, and a reduced or zero applied voltage at a center of the VFL. The VFL may have a voltage gradient applied in a single dimension, for example with linear electrode elements provided on each of two sides of the VFL (e.g., reference FIG. 65 and the related description), or in two dimensions (e.g., an embodiment of FIG. 65 with four linear electrode elements, and/or embodiments such as FIG. 55 and the related description). It can be seen that incident EM beams on the VFL will experience a differential index effect across the VFL with the voltage applied, such as incident EM beam 5404 relative to incident EM beam 5406, and accordingly the VFL will act as a lens, in either one or two dimensions. A VFL, as utilized herein, includes any embodiments of a controlled lens effect such as those depicted in FIGS. 54, 55, and/or 65, including in one or two dimensions, as applicable to the context of the VFL and the related system.

Figure 55:
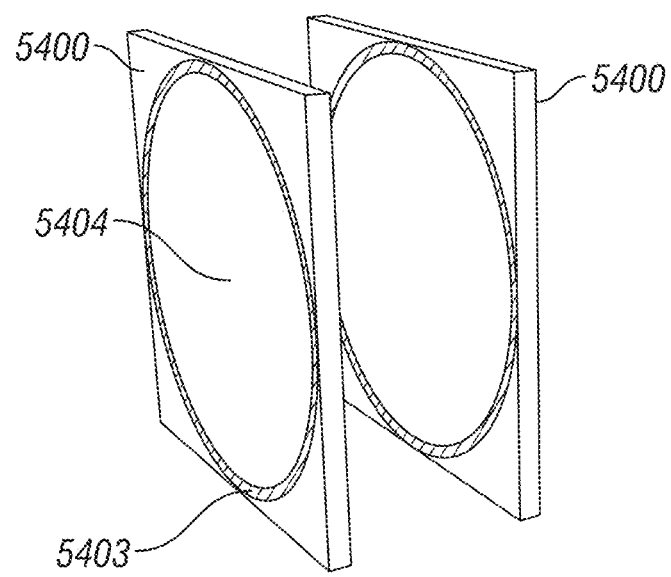
FIG. 55 is a schematic diagram depicting a pair of varifocal lenses.

Referencing FIG. 55, an example embodiment includes a pair of VFLs 5400, configured such that an incident EM beam passing through the VFLs 5400 will be offset and in a same direction as an incident EM beam. In the example of FIG. 55, a high-side electrode 5403 is provided as an enclosed shape (a circle, in the example of FIG. 55), where a center 5404 of the shape will experience a balanced zero voltage, and accordingly the example of FIG. 55 depicts a pair of two-dimensional VFLs 5400. In the example of FIG. 55, and/or in other embodiments set forth herein utilizing a pair of VFLs 5400, a voltage gradient of the first VFL 5400 (e.g., the left-side VFL) may be reversed from the voltage gradient of the second VFL 5400 (e.g., the right-side VFL), for example providing an equivalent convergence and divergence amounts in the VFLs 5400, and accordingly providing for an emitted EM beam having a same convergence/divergence profile as an incident EM beam. The voltage gradient reversal, where present, may be provided by any configuration available, including at least a reversal of the applied voltage (e.g., a negative or positive voltage), a reversal of electrode positions, and/or a geometric facing change of the appropriate VFL 5400. It can be seen that for other enclosure shapes than a circle (e.g., an ellipse), the effective lens shape will be different than that shown in FIG. 54, but can be determined according to the final voltage gradient (or field) applied across the bulk crystal portion of the VFL. In certain embodiments, utilization of a closed shape other than a circle, and/or utilization of linear electrodes having distinct applied voltages and/or geometries (e.g., reference FIG. 65) allow for the adjustment of the VFL 5400 to apply separate lensing effects in separate dimensions, to account for distortions applied by other components of a system including the VFL 5400, etc. In certain embodiments, a VFL 5400 such as that depicted in FIG. 55 may include a ground electrode, and/or a resistive ground electrode, on an opposite side of the bulk crystal relative to the high-side electrode 5403. In certain embodiments, the ground electrode and/or resistive electrode may be grounded in a center location (or other desired zero voltage location) of the ground electrode. In certain embodiments, one or more of the high-side electrode 5403 and/or the ground electrode may be transparent to an incident EM beam, allowing for the electrode to be within the planned optical paths (and/or viewing area) of the VFL 5400 without affecting the operations of the VFL 5400 or the incident EM beam.

Figure 56:
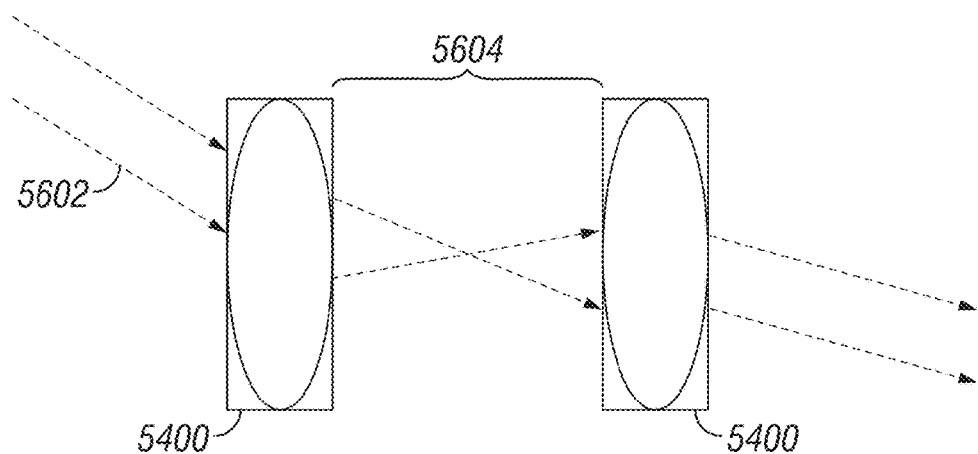
FIG. 56 is a schematic diagram of a beam steering device utilizing a pair of varifocal lenses.

Referencing FIG. 56, an example system including VFLs 5400 is depicted. The example VFLs 5400 include any embodiments consistent with the descriptions throughout the present disclosure, including at least FIGS. 54, 55, 65, and the related descriptions. An incident EM beam 5602 interfaces with a first VFL 5400 (the left-side VFL in the example), is converged and interfaces with the second VFL 5400 (the right-side VFL in the example), and exits the second VFL 5400 linearly offset, and/or steered, relative to the incident EM beam 5602. In certain embodiments, the first VFL 5400 may diverge the incident EM beam 5602, and the second VFL 5400 may converge the incident EM beam 5602. In certain embodiments, for example where another system element applies a convergence or divergence to the incident EM beam 5602, the VFLs 5400 may work together (and/or an effect of one VFL 5400 may be stronger than an opposing effect of the other VFL 5400) to net converge or net diverge the incident EM beam 5602. For example, where a concave face of a bulk steering crystal applies a divergent effect to a steered EM beam 5602 (e.g., reference FIGS. 59, 64, and the related descriptions), the VFLs 5400 may be configured to effectively converge the incident EM beam 5602 to offset the divergence element applied by other components in the system. The VFLs 5400 are displaced by a distance 5604 to ensure that the incident EM beam 5602 successfully engages the second VFL 5400 (e.g., the right-side VFL) from the first VFL 5400, and further that the steered EM beam is properly focused between the VFLs 5400.

In certain embodiments, a VFL 5400 includes an EO crystal slab cut through it z-axis and poled parallel to its thickness direction. An example high-side electrode is positioned on a first side of the EO crystal slab, and a transparent ground electrode, which may be resistive, is positioned either within the high-side electrode, or on an opposite second side of the EO crystal slab from the high-side electrode. Another example VFL 5400 includes a high-side electrode (e.g., a circular or other closed configuration) provided on each side of the EO crystal slab, with each high-side electrode having a low-side electrode, each of which may be resistive, positioned within each corresponding high-side electrode. A voltage is applied on the high-side electrode(s), and in an example embodiment the transparent ground electrode is grounded in a center location (either centered in one dimension or two dimensions), making the refractive index of the EO slab change in response to the external electric field. The change in the refractive index will be the highest at the slab area close to the boundary of the high-side electrode (e.g., along the outer circle in the example of FIG. 55) and zero in the center location (and/or at the ground location). The OPD associated with this structure will be (n)L, where n is the EO slab index change and L is the slab thickness. Accordingly, the EO slab will respond as a lens to applied voltage at the high-side electrode. By changing the voltage on the high-side electrode, the external electric field will change and therefore the index changes and the OPD and the focal length of the slab (VFL 5400) will vary.

Figure 57:
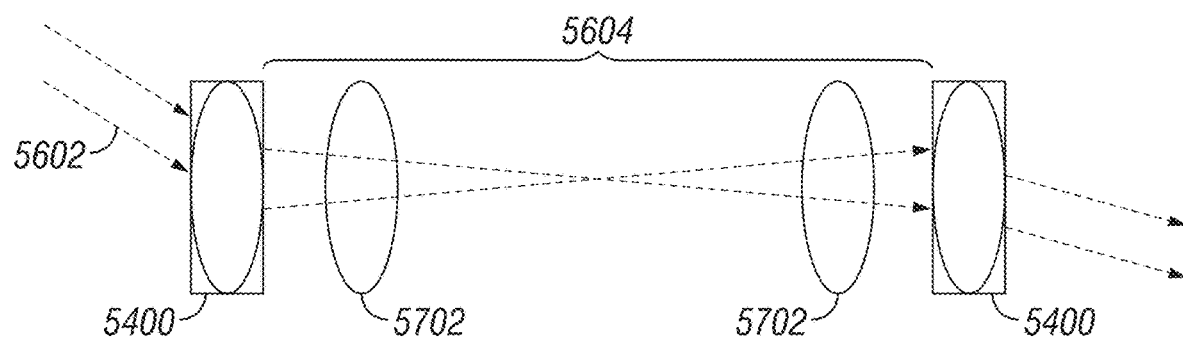
FIG. 57 is a schematic diagram of a beam steering device utilizing a pair of varifocal lenses.

Referencing FIG. 57, an example steering device includes two VFLs 5400 displaced by a distance 5604. In certain embodiments, the steering device of FIG. 57 can steer a large aperture beam continuously and with a lower voltage than previously known systems, as large crystal bulk structures are not required that would lead to large voltage differentials across components of the system. High voltage components may be costly, require a large and/or heavy power supply, and/or may induce other design limitations (e.g., to limit arc events within the steering device). The voltages for VFLs, as recited herein, are independent of the supported aperture size, and/or have a small increase function with aperture size to achieve the voltage required to impose a transverse electric field on the steering bulk crystals of the VFLs, as the required voltages for the VFLs 5400 vary with the thickness of the bulk crystal and not with an area or a linear dimension associated with the area. The beam size of the incident EM beam 5602 may be affected slightly after steering with the device of FIG. 57, but wall impingement within a steering structure is unlikely, as the VFLs 5400 apply only convergence or divergence to the incident EM beam 5602, and do not apply deflection within the bulk crystal structures of the VFLs 5400. In certain embodiments, the steering device of FIG. 57 further includes extension lenses 5702, which may be either conventional lenses or further VFLs 5400, to ensure that the incident EM beam 5602 successfully traverses between the steering VFLs 5400. The lenses 5702 may further be utilized to reduce or eliminate optical aberrations in the steered EM beam. In certain embodiments, the VFL 5400 focal lengths are compensated to keep the focal planes of the VFLs 5400 in coincidence.

Figure 58:
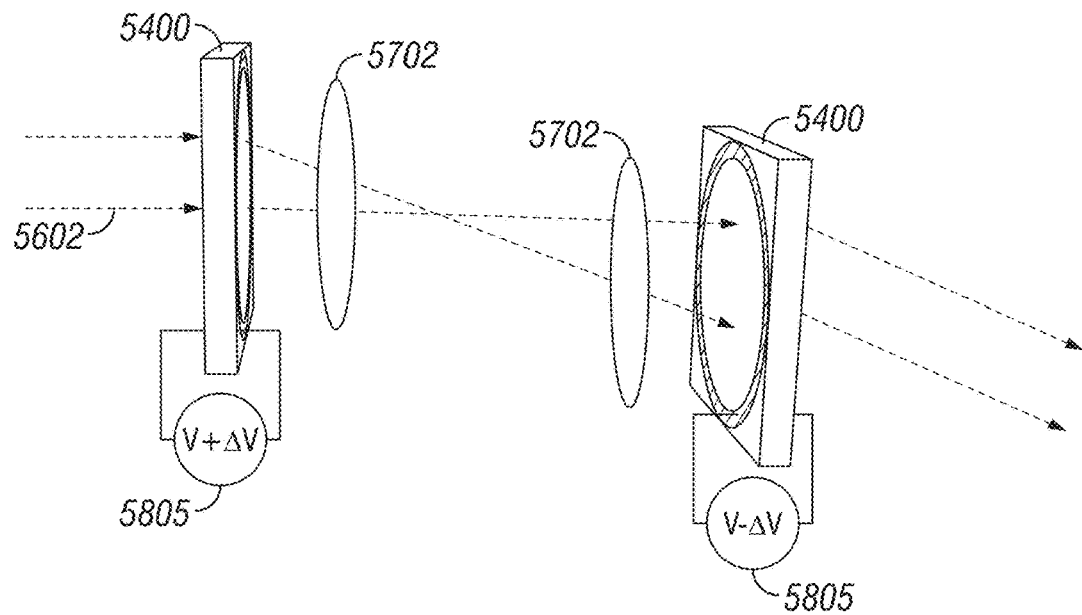
FIG. 58 is a schematic diagram of a beam steering device utilizing a pair of varifocal lenses.

In an example of FIG. 58, each VFL 5400 includes an EO bulk crystal which is equipped with two round electrodes (one on each side) and two circular transparent resistors (or low-side electrodes, each within an associated round electrode). The round electrodes are located on opposing sides of EO bulk crystal and the transparent resistors are located inside the round electrodes. The beam steering apparatus shown in FIG. 28 further includes conventional lenses 5702 to vanish the probable optical aberration. The VFLs 5400 are displaced by some distance, but their focal planes are kept coincided at all times during steering operations. The VFLs 5400 can be both converging or one diverging and one converging. More than two VFLs 5400 and/or more than two conventional lenses 5702 can be used in the scanner. The beam steering device also includes voltage controllers/supplies 5805, which apply the desired voltage gradients across the VFLs 5400.

The refractive index of the EO crystal slab, or any other materials whose index of refraction can be changed by the application of an electric field, is changed by varying the applied voltage on the round electrodes attached to each side of the EO bulk crystal slab. The linearly polarized incident EM beam 5602, which incidents on the first EO bulk crystal slab gets converged or diverged, and then gets collimated and deflected by the second EO bulk crystal slab, because the focal planes of the first and second slabs always coincide, and the because the second slab is vertically (e.g., in a steering relevant direction) displaced with respect to the first slab. An example embodiment includes adjusting the applied voltage on the round electrode of the first slab being compensated with an adjustment to the voltage applied on the round electrode of the second slab to make the focal planes of those slabs always meet. Thus, the combination of the first and second slabs essentially form a displaced telescope. Any form of telescope is suitable for this application, not just the form shown in FIG. 58. Optionally, some actual optical surfaces like diverging or converging lenses can be employed between the slabs (e.g., as conventional lenses) to vanish any probable optical aberrations and ensure proper progression of the incident EM beam 5602 between the VFLs 5400. More than two EO slabs can be used and the VFLs 5400 can be both converging or one can be converging and the other can be diverging, or any other combinations of more than two slabs to make a displaced VFL-based telescope.

Figure 59:
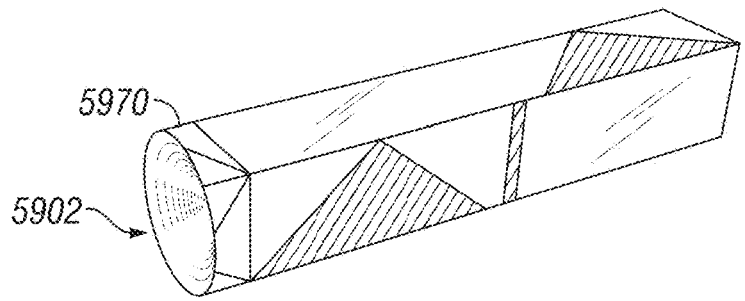
FIG. 59 is a schematic diagram of a beam steering device utilizing a concave emission surface.

Referencing FIG. 59, an example steering device is provided that allows steering to larger angles in one dimension or two dimensions. The example device includes a concave face 5902, wherein an incident EM beam is received at a first end of the beam steering device (e.g., the right side in the example of FIG. 59), and emitted at the concave face 5902 after being steered through one or more steering portions (e.g., as in FIG. 37. The concave face 5902 may be any shape or configuration, such as conical, parabolic, or the like. The exiting EM beam is further steered on emission through the conical face 5902, effectively amplifying the steering that is performed within the bulk crystal of the steering device before emission. The example steering device may include as many steering portions as desired before the concave face 5902. In certain embodiments, the concave face 5902 may be concave in a single dimension (e.g., reference FIG. 64 and the related description), or in two dimensions (e.g., as depicted in FIG. 59). The concave face 5902 may be symmetric, for example as a conical cap and/or a spherical cap. The concavity of the concave face 5902 may be varied in each dimension, for example as an ellipsoid cap, a hyperboloid cap, and/or an elliptic paraboloid cap. In certain embodiments, the additional steering provided at the concave face 5902 is compensated within the steering portions of the bulk crystal, for example with a schedule of steering commands (and corresponding voltage commands to electrodes) to provide for the incident EM beam to intersect the concave face 5902 at a selected location, thereby resulting in a selected final steering value on emission through the concave face 5902. In certain embodiments, the beam steering device includes a flared portion 5970 which may be provided, for example, to ensure that the steered EM beam does not impinge on an outer wall of the bulk crystal during steering operations. In the example of FIG. 59, the flared portion 5970 is depicted near the end of the beam steering device, but the entire bulk crystal may be flared or have size adjustments (e.g., reference FIGS. 41 and 64, and the related descriptions) as described throughout the present disclosure to ensure the desired trajectory of the steered EM beam.

Figure 60:
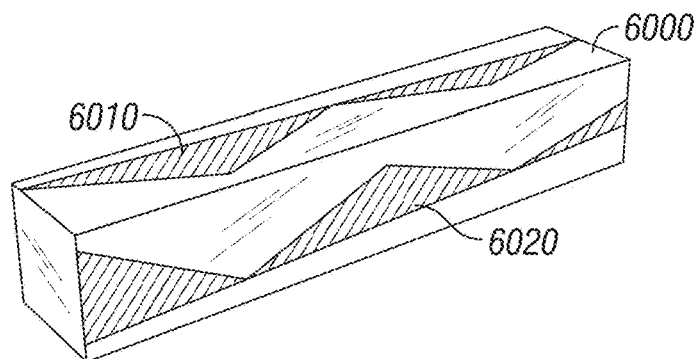
FIG. 60 is a schematic diagram of a beam steering device utilizing a bulk crystal.
Figure 61:
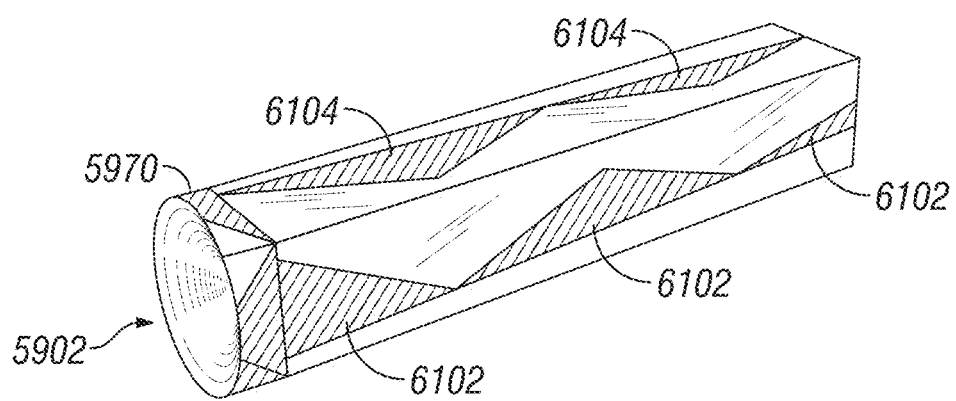
FIG. 61 is a schematic diagram of a beam steering device utilizing a concave emission surface.

Another embodiment for steering an incident EM beam in to two dimensions is shown in FIG. 60. The example of FIG. 60 includes patterned high-side voltage electrodes on two sides (e.g., electrodes 6010 and 6020) of the bulk crystal, with opposing low-side voltage electrodes on opposing sides of the bulk crystal (not shown). The example patterned high-side electrodes 6010, 6020 are a series of triangular electrodes, with heights that are shorter near the inlet face (e.g., the right side of FIG. 60) and gradually become longer through the length of the crystal. The example of FIG. 60 includes two-dimensional steering of an incident EM beam, with some overlap between X-steering and Y-steering portions, rather than discrete steering portions, each in only one of the steering dimensions. Referencing FIG. 61, an example beam steering device combines the concave face 5902 with the overlapping dimensional steering of the embodiment of FIG. 60. The embodiment of FIG. 61 includes first high-side voltage electrodes 6102 to steer in a first direction, and second high-side voltage electrodes 6104 to steer in the second direction. In the example of FIG. 61, as with other examples utilizing a concave face 5902, the curvature and/or slope of concavity in each direction may be different, for example to compensate for differential steering capability in each dimension within the bulk crystal of the beam steering device.

Figure 62:
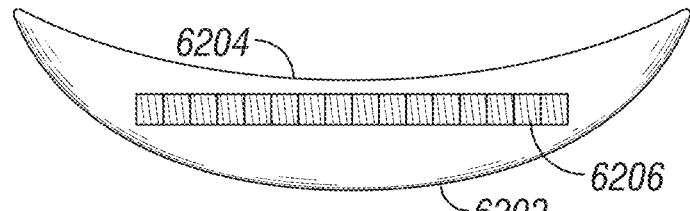
FIG. 62 is a schematic diagram of a beam steering device utilizing a zero power meniscus lens.

Referencing FIG. 62, an example beam steering device is depicted including a thin beam steering device 6206. The example thin beam steering device 6206 may be any modulo $2\pi$ phase shifting device, including a number of active cells with voltage resets, as described throughout the present disclosure, for example in FIGS. 5-31 and the related descriptions. In certain embodiments, the thin beam steering device 6206 may be in a castle configuration, a castle pro configuration, a chess configuration, or a chess pro configuration. In certain embodiments, the thin beam steering device 6206 may include one or more layers of thin beam steering devices. The example of FIG. 62 additionally includes a convex lens portion 6202 and a concave lens portion 6204. In certain embodiments, an incident EM beam enters the beam steering device at the convex lens portion 6204, traverses through the thin beam steering device 6206, and is emitted from the surface of the concave lens portion 6206. In certain embodiments, the embodiment of FIG. 62 is referenced as a zero-power meniscus lens embodiment, as the lens portions 6202, 6204 are operative with an unpowered lens. The convex lens portion 6202 converges the steered EM beam, and the concave lens portion 6204 amplifies the steering of the EM beam, while diverging the steered EM beam (offset by the convergence of the convex portion). While the embodiment of FIG. 62 may utilize an unpowered lens, in certain embodiments one or more of the lens portions utilized may alternatively (or additionally) include a powered lens, such as a VFL 5400 as described in the present disclosure. Based on calculations and modeling, it is believed that a beam steering device such as that depicted in FIGS. 62 and 63 is capable to steer an incident EM beam to an angle exceeding +/−20°, and/or exceeding +/−30°.

Figure 63:
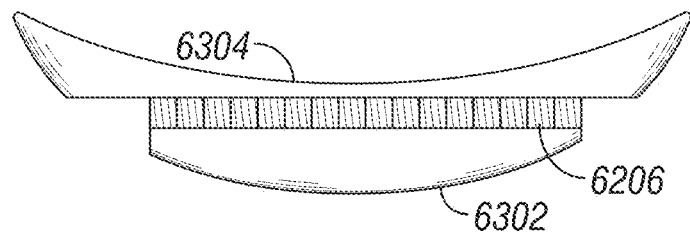
FIG. 63 is a schematic diagram of a beam steering device utilizing a zero power meniscus lens.

Referencing FIG. 63, another embodiment of a beam steering device is depicted, with separated components for the convex lens portion 6302 and the concave lens portion 6304. In certain embodiments, the separation of the lens portions 6302, 6304 may provide for ease of fabrication, ease of cooling and/or electrical connections to the thin beam steering device 6206, and/or separation of the lens portions 6302, 6304 as distinct devices and/or having distinct operating configurations. In certain embodiments, for example where the lens portions 6302, 6304 are an integrated component (e.g., as in FIG. 62) and/or manufactured by the same processes, aberrations in the lens portions may acceptably offset. In certain embodiments, manufacturing tolerances may be utilized to ensure acceptable performance of the lens portions 6302, 6304.

Figure 64:
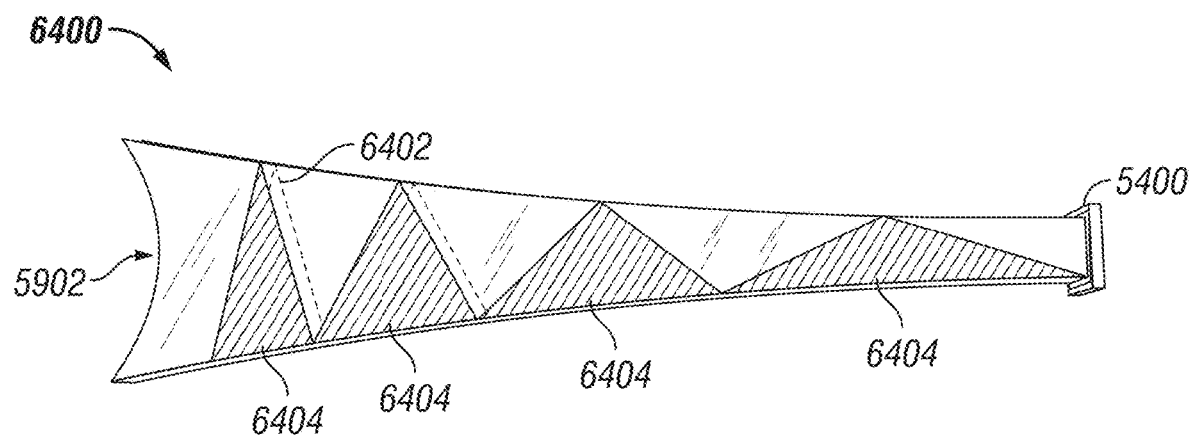
FIG. 64 is a schematic diagram of a beam steering device utilizing a concave emission surface and a varifocal lens.

Referencing FIG. 64, a schematic diagram of a beam steering device 6400 utilizing a concave emission surface 5902 and a varifocal lens 5400 is depicted. In the example of FIG. 64, a number of triangular high-side electrodes 6404 are depicted, creating a number of steering portions of the beam steering device 6400. The example beam steering device 6400 further includes a number of low-side electrodes 6402 on the back side of the beam steering device 6400 opposite the high-side electrodes 6404. An example device may include a low-side electrode 6402 corresponding to each of the high-side electrodes 6404, and/or may include a common low-side electrode or other configurations as set forth throughout the present disclosure. The example beam steering device 6404 includes an increasing size of the bulk crystal (e.g., increasing height of the crystal from the VFL 5400 inlet to the concave face 5902 outlet), which may be monotonically increasing or in other configurations according to the steered trajectory of the EM beam, physical and/or manufacturing constraints of the device, or the like. In certain embodiments, the VFL 5400 may be omitted, for example when the divergence induced by the concave face 5902 is acceptable over a range of steering angles, and/or when a fixed geometry (e.g., conventional lens) provides for sufficient convergence of the steered EM beam through an acceptable range of steering angles for a particular application.

According to modeling and calculations, it is believed that a beam steering device 6400 is capable to steer an incident EM beam at angles greater than +/−30 with minimal divergence of the EM beam in a single dimension (or axis). The beam steering device 6400 is capable to steer an incident EM beam at even greater angles with some divergence, which may be acceptable for certain applications. The steering portions of the beam steering device 6400 are depicted as steering in a single dimension for the embodiments described herein, but the beam steering device 6400 may additionally or alternatively include steering in two dimensions, for example with adjustments as set forth in FIGS. 37, 39, and 59 and the related descriptions. The concave face 5902 depicted in FIG. 64 is curved in only a single dimension, but may similarly be curved in more than one dimension, for example as set forth in FIGS. 59, 61, and the related descriptions.

Certain illustrative operating principles for a beam steering device 6400 including a concave face 5902 and a VFL 5400 are described herein. The example operating principles are provided for clarity of the present description, and are not limiting to the embodiments described herein. Additionally, while certain operating principles are described in the context of the embodiment of FIG. 64, the descriptions herein may be applicable to any of the embodiments described herein. One of skill in the art, having the benefit of the present disclosure and information ordinarily available when contemplating a particular system, including materials available, manufacturing techniques that are commercially reasonable, and steering requirements or desired characteristics for a particular system and application, can readily determine the configuration of a beam steering device to implement embodiments herein.

An example beam steering device 6400 such as that depicted in FIG. 64 is capable to continuously steer an incident EM beam 5602 to wide angles (e.g., +/−30°, and greater depending upon the amount of divergence that is acceptable for a particular system and/or application). The example beam steering device 6400 takes advantage of the index mis-match between the crystal material and air to magnify the steering angle of the outgoing beam. The average path length through the scanner changes the incident EM beam is steered, so even though the exit optical element is fixed, a VFL can be utilized to reduce or minimize distortion (e.g., via net divergence or convergence) of the steered EM beam.

The EO bulk scanner 6400 includes an input with a VFL attached (and/or optically coupled) to a bulk EO crystal, followed by several triangular electrodes on two opposite sides of a gradually widening bulk EO crystal, and ending with the EO crystal having a concave surface, which may resemble a fishtail. In certain embodiments, the bulk EO crystal scanner 6400 is referenced as a Fishtail scanner. The number and shape of the triangular electrodes are designed in consideration of a tradeoff between maximum deflection angle and the maximum acceptable inside reflection. A larger number of triangular electrode will lead to a wider deflection angle because it provides more prisms on the pathway of the light, but also it will create more internal changes in index of refraction, or interfaces. Having more internal interfaces reduces the deflection efficiency because a fraction of light will be reflected at each interface. The shape of each triangular electrode may be designed by ray tracing to avoid hitting the wall when the maximum voltage is applied. As the width of the Fishtail scanner crystal gradually increases, the triangular electrodes become narrower because there will be more room for deflection of light without hitting the wall.

The exit surface of the Fishtail scanner is curved, and therefore has optical power. Without compensation the deflected beam coming out of the scanner would be diverging. To compensate the optical power of that curved surface, the VFL applies a convergence to the incident EM beam. In certain embodiments, a fixed compensation lens may be utilized at the input, for example where variance imposed by the changing effective path length between the Fishtail scanner inlet and outlet is acceptable for a particular application.

An example design equation for the optical power of the varifocal lens ($\phi_{vl}$) follows in equation 11:

$$\phi_{vl} = \frac{1}{f} = \frac{s_{ij}n_0^3 V_0^2}{L^2 d_0} = \frac{n_0^3 V_0^2 g_{ij}\varepsilon(T)^2}{L^2 d_0} = \frac{V_0^2 \varepsilon(T)^2}{K} \quad T > T_c \qquad \text{EQ. 11}$$

Where $d_0$ is the path length without any index change, $n_0$ is the ordinary refractive index of the crystal, $V_0$ is the voltage applied, T is temperature, Tc is the Curie temperature, L is the distance across the bulk crystal (e.g. reference FIGS. 66-69). In the case of KTN (KT/KN, or potassium tantalate/potassium niobite), the optical power of the variable lens is set forth in equation 12:

$$\phi_{vl} = \frac{1}{f} = \frac{V_0^2}{K}\left(\frac{140000\varepsilon_0}{T - T_c}\right)^2 \quad T > T_c \qquad \text{EQ. 12}$$

The power of the curved outlet surface of the fishtail ($\phi_{cs}$) under voltage of V is set forth in equation 13:

$$\phi_{cs} = \frac{n(V) - 1}{R} \qquad \text{EQ. 13}$$

Where R is the curvature radius of the outlet surface (which may be a local curvature) and n(V) is the refractive index of the crystal which is a function of the applied voltage (V) on the crystal as follows in equations 14 (paraelectric region) and 15 (ferroelectric region):

$$n(V) = n - \frac{0.5 n^3 g_{ij} \varepsilon(T)^2 V^2}{d^2} \qquad \text{EQ. 14}$$

-continued $$n(V) = n - \frac{0.5n^3 r_{ij} V}{d} \qquad \text{EQ. 15}$$

Where n is the index of the scanner, $n^3 g_{ij}$ is the quadratic electro-optical constant, $\varepsilon(T)$ is the dielectric constant as a function of temperature, V is the applied voltage on the scanner, $r_{ij}$ is the linear electro-optical constant of the crystal and d is the thickness of the scanner.

Calculation of the total optical power between two surfaces having a distance therebetween is discussed in J. E. Greivenkamp, "Field guide to geometrical optics," SPIE, 2004, pp. 14, which is incorporated herein by reference. If the length of the Fishtail scanner is t, the total optical power of the scanner is set forth in equation 16:

$$\phi = \qquad \text{EQ. 16}$$
$$\phi_{vl} + \phi_{cs} - \frac{\phi_{vl}\phi_{cs}t}{n(V)} = \frac{V_0^2 \varepsilon(T)^2}{K} + \frac{n(V)-1}{R} - \frac{tV_0^2 \varepsilon(T)^2 (n(V)-1)}{n(V)KR}$$

It should be noted again that the VFL is under a first voltage (e.g., $V_o$) and the bulk crystal portion of the scanner is under a second voltage (e.g., V). It will be understood that different steering portions of the bulk crystal portion of the scanner may be under distinct voltages, and equation 16 may be modified to compensate for the varying voltage portions of the scanner. For the fixed temperature (T) and given voltage on the scanner (V), (or given angle of deflection), the total power of the scanner ($\phi$) can be plotted against the applied voltages on the VFL to find the desired $V_0$ in which the total power of the scanner ($\phi$) is minimum. It is understood that other constraints of the system may indicate a $V_0$ that does not correspond to the minimum total power of the scanner, but equation 16 can be utilized to improve and/or minimize the total power of the scanner, and/or to determine sensitivity of the total power of the scanner to design and/or run-time parameters. Because of the power of the VFL ($\phi_{vl}$), the voltage applied on the VFL ($V_o$) can be adjusted to compensate for the optical power of the exit curved surface ($\phi_{cs}$).

Without using the VFL, the power of the scanner will be $$\phi_{cs} = \frac{n(V)-1}{R}$$

which results in a diverging deflected beam. By employing that VFL, the beam can be steered to a wide angle without diverging the steered beam. If the application allows having a diverging deflected beam, the VFL can be omitted and/or replaced with a fixed power lens.

The VFL operates like a cylindrical graded-index lens. Generally, a graded-index lens is a thin plate of uniform thickness $d_0$ and quadratically graded refractive index n(x, y)=$n_0[1-0.5\alpha^2(x^2+y^2)]$, where $\alpha$ is a parameter in terms of $m^{-1}$ that relates the index to every point of the crystal with dimension of (x,y). The $\alpha d_0$ is dimensionless and If $\alpha d_0 \ll 1$, acts as a lens of focal length $$f = \frac{1}{n_0 d_0 \alpha^2}$$

(e.g., see B. E. A. Saleh and M. C. Teich, "Fundamentals of Photonics," 2nd Edition, John Wiley & Sons, Inc. 2015, pp. 57, which is incorporated by reference herein).

In the case of a cylindrical graded-index lens, the index changes in one direction only, following equation 17:

$$\Delta n(x) = n(x) - n_0 = -0.5 n_0 \alpha^2 x^2 \qquad \text{EQ. 17:}$$

As seen in equation 17, if the index of the thin plate of uniform thickness $d_0$ gradually changes by $x^2$, that plate will behave like a cylindrical lens. In Kerr effect bulk crystals under voltage of V, the refractive index of the crystal is varied in terms of $V^2$. Therefore, a thin plate of the Kerr effect bulk crystal can form a cylindrical lens if the applied voltage is linearly varied with respect to x.

Figure 65:
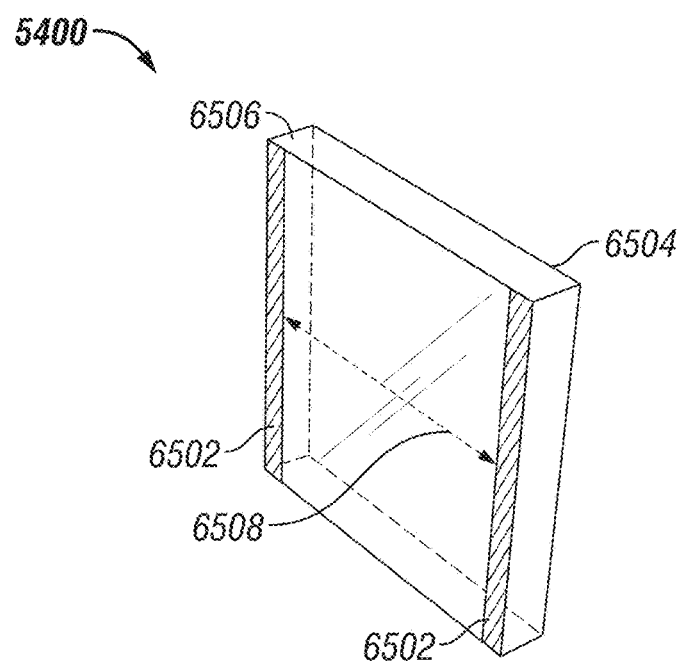
FIG. 65 is a schematic diagram of an example varifocal lens.

Referencing FIG. 65, the VFL includes a thin plate of an electro-optical (EO) crystal with a uniform thickness of $d_0$. In the example of FIG. 65, L 6508 is the distance between the electrodes. Example thin plate materials include any EO crystals with a sizeable Kerr effect, such as KTN or PMNPT.

In an example, two different voltages are applied on the electrodes, and the uniform transparent electrode at the backside of the crystal is connected to the ground. Assuming voltages of $V_o$ and zero are respectively applied on the first and second electrode, the distribution of the electric field in the crystal is set forth in equation 18:

$$E(x) = \frac{dV}{dy} = \frac{V_0 x}{L d_0} \quad 0 \le x \le L \qquad \text{EQ. 18}$$

Accordingly, the index change caused by the Kerr effect is set forth in equation 19:

$$\Delta n(x) = n(x) - n_0 = -0.5 n_0^3 s_{ij} E(x)^2 \qquad \text{EQ. 19:}$$

Where $n_0$ is the index of the crystal before applying any voltage. If the incident light is polarized perpendicular to the crystal axis, the $n_0$ will be the ordinary index, otherwise $n_0$ is the extraordinary index of the crystal. The $s_{ij}$ is the appropriate element of the Kerr effect tensor, which is related to the dielectric constant of the crystal as set forth in equation 20:

$$s_{ij} = g_{ij} \varepsilon(T)^2 \qquad \text{EQ. 20:}$$

Where $g_{ij}$ is the appropriate electrostrictive tensor element, and $\varepsilon$ is the dielectric constant, which is a function of temperature. In the case of KTN, the dielectric constant as a function of temperature is set forth in equation 21:

$$\varepsilon(T) = \frac{140000 \varepsilon_0}{T - T_c} \quad T > T_c \qquad \text{EQ. 21}$$

Where $\varepsilon_0$ is the dielectric constant in vacuum and $T_c$ is the curie temperature of KTN. It should be noted that KTN exhibits a significant Kerr effect at its paraelectric region. Therefore, the temperature of the crystal in certain embodiments is maintained higher than its Curie temperature. Accordingly, the index change in the VFL is set forth in equation 22:

$$\Delta n(x) = -0.5 s_{ij} n_0^3 E(x)^2 = -0.5 s_{ij} n_0^3 \frac{V_0^2}{L^2 d_0^2} x^2 \quad 0 \le x \le L \qquad \text{EQ. 22}$$

Figure 70:
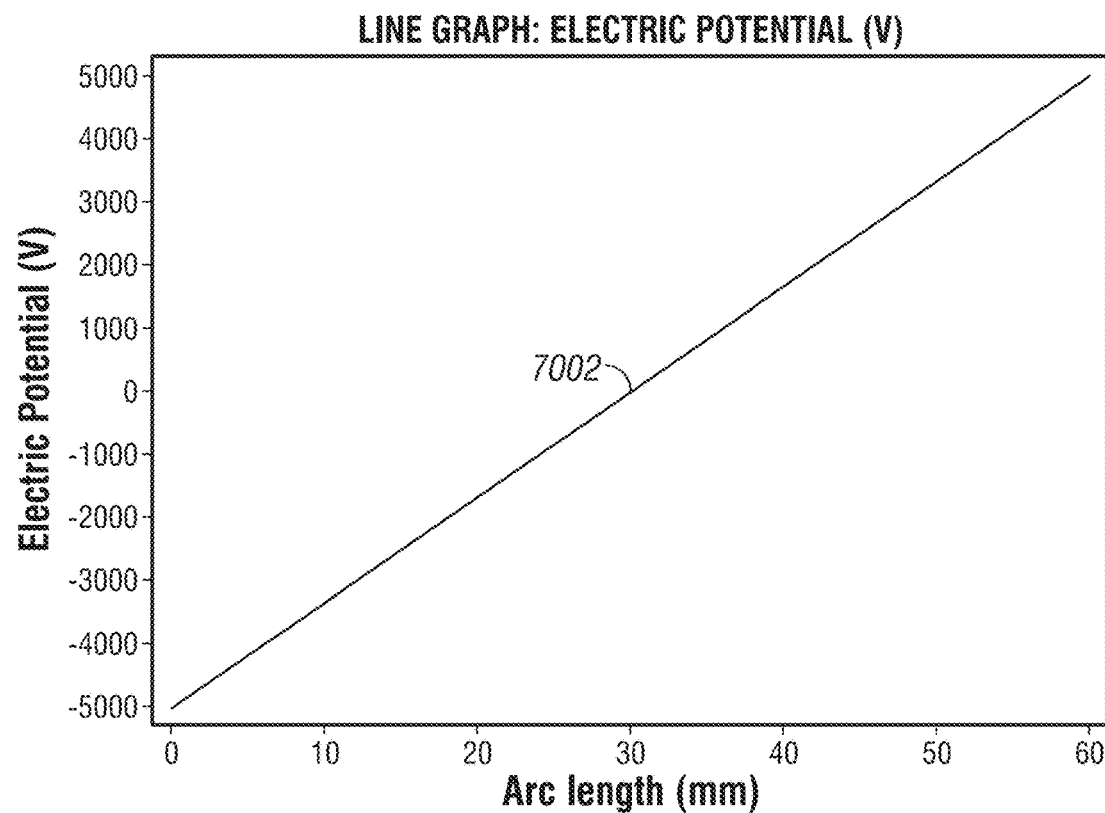
FIG. 70 is a depiction of illustrative design or control characteristics of a varifocal lens.
Figure 71:
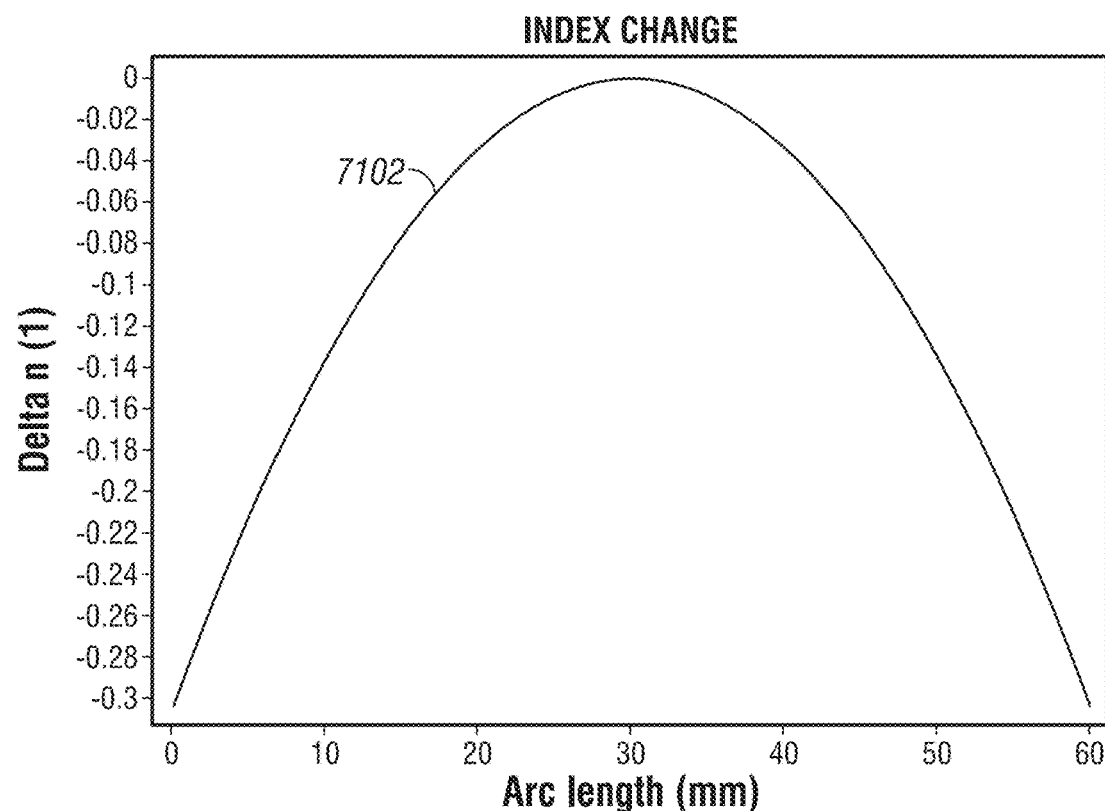
FIG. 71 is a depiction of illustrative design or control characteristics of a varifocal lens.

Referencing FIGS. 70 and 71, the voltage and index change across the length of a 6 cm×6 cm×1 mm KTN crystal plate under 5 kV are plotted. Note that the voltage range goes from −5 Kv to +5 Kv. In the middle, the voltage is zero, so there is no index change, as seen in FIG. 71. In FIG. 71, it apparent that the index change varies from −0.3 through zero, and back to −0.3. As seen in equation 16 and FIG. 71, the index change is a function of $x^2$. Hence, the thin plate of the Kerr effect crystal forms a cylindrical graded index lens in one dimension. The focal length of the VFL is set forth in equation 23:

$$f = \frac{L^2 d_0}{s_{ij} n_0^3 V_0^2} = \frac{L^2 d_0}{n_0^3 V_0^2 g_{ij} \varepsilon(T)^2} = \frac{K}{V_0^2 \varepsilon(T)^2} \quad T > T_c \qquad \text{EQ. 23}$$

Where $$K = \frac{L^2 d_0}{n_0^3 g_{ij}}$$

is a constant because the L and $d_0$ are the geometry parameters, and $n_0$ and $g_{ij}$ are material properties. Of course $n_0$ and $g_{ij}$ depend on the wavelength and polarization of the incident EM beam, but they are constant for given incident EM beam.

The focal length can be altered by changing the applied voltage of $V_0$ or changing the dielectric constant by varying the temperature. In the case of KTN, as the Kerr effect crystal, the focal length and optical power of the variable lens as a function of temperature and the applied voltage is set forth in equations 24 and 25:

$$f = \frac{K}{V_0^2}\left(\frac{T - T_c}{140000\varepsilon_0}\right)^2 \quad T > T_c \qquad \text{EQ. 24}$$

$$\phi = \frac{V_0^2}{K}\left(\frac{140000\varepsilon_0}{T - T_c}\right)^2 \quad T > T_c \qquad \text{EQ. 25}$$

As seen, the focal length and power of the varifocal lens are sensitive to temperature and the applied voltage. When no voltage is applied, or the temperature is high, the varifocal lens does not have optical power. In contrast, when applied voltage is high and/or the temperature is close to the Curie temperature, the optical power is configurable and can be very high. It should be noted that, to achieve a high power lens or a lens with a short focal length, the temperature can be adjusted close to the Curie temperature rather than applying a very high voltage. Referencing FIGS. 66, 67, and 69, simulated results are depicted for a beam steering device having a VFL made of KTN with a length of 5 mm, and a thickness of 1 mm. For reference, it is noted that KTN has a $T_c$ of 300K, and an $n^3 g_{11}$ of 2 m$^4$/C$^2$.

Figure 72:
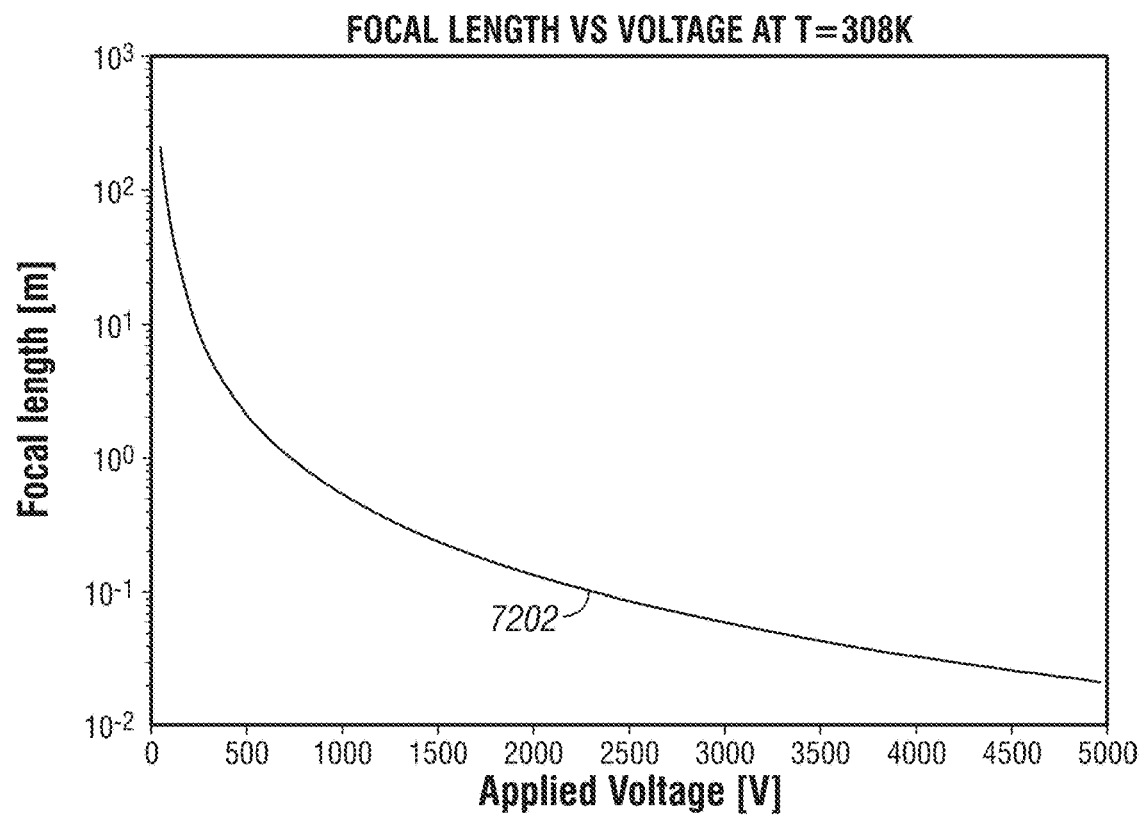
FIG. 72 is a depiction of illustrative design or control characteristics of a varifocal lens.

Referencing FIG. 72, an example VFL response is shown with the temperature is fixed at 308K, and the voltage varied from 0 to 5 kV. Referencing FIG. 73, an example VFL response is shown with the voltage fixed at 5 kV, and the temperature varied from 308K to 500K. It is shown that the focal length will be small for high applied voltage and/or low temperature. Accordingly, in certain embodiments, the temperature of the VFL is kept close to the Curie temperature, allowing for a high optical power to be achieved with a lower voltage applied.

Referencing FIG. 65, a schematic diagram of an example VFL 5400 suitable, for example, for utilization with a beam steering device 6400 is depicted. The example VFL 5400 includes high-side electrodes 6502 positioned on each side of the VFL viewing area (e.g., the area through which an incident EM beam is designed to progress), and a low-side electrode 6504 positioned on an opposite side of the VFL. In the example, the high-side electrodes 6502 may be positioned outside the VFL viewing area, and/or may be provided as transparent electrodes. In the example of FIG. 65, the low-side electrode 6504 is provided to cover the VFL viewing area, and is a transparent electrode. In certain embodiments, voltages are applied to the high-side electrodes 6502 to provide a voltage gradient across the bulk crystal 6506 of the VFL. In certain embodiments, the high-side electrodes are provided with voltages of equal magnitude and opposite sign, providing a voltage gradient across the distance 6508 of the VFL having a zero point in the center of the VFL. In the example of FIG. 65, the bulk crystal 6506 is maintained above a Curie temperature, and operates in the Kerr effect (paraelectric) region, which exhibits a quadratic voltage gradient. It can be seen that the VFL 5400 acts as a lens in a single dimension, tending to converge the incident EM beam. In certain embodiments, the VFL 5400 can be operated as a two-dimensional (or spherical lens), for example utilizing a closed surface or round high-side electrode, and/or utilizing additional high-side electrodes (e.g., across the top and bottom, or other dimension of the VFL bulk crystal). In certain embodiments, the VFL 5400 can be utilized as a lens in two dimensions with two staged VFLs 5400 utilized in series.

During operations of the beam steering device 6400, the VFL 5400 (and/or a conventional lens) applies a converging effect to the incident EM beam 5602. The incident EM beam is then passed through the number of steering portions of the beam steering device 6400, each one of the steering portions incrementally steering the EM beam toward the target steering amount (e.g., a steering request value and/or a steering command value). Upon emission of the steered EM beam through the concave face 5902, the concave face 5902/medium (e.g., air) interface effectively multiplies the amount of steering performed. Accordingly, in certain embodiments, the steering request value and/or steering command value is converted into a target position of the steered EM beam onto the concave face 5902, target index values (and/or voltage values) of the steering portions, and/or a target focal length of the VFL 5400 to apply a selected amount of convergence. The amount of convergence may be scheduled according to the steering amount applied, the curvature of the concave face 5902 at the point where the steered EM beam is emitted, the distance to the steering target of the steered EM beam, or the like. In certain embodiments, feedback about the amount of divergence may be available (e.g., determining how much of the EM beam energy is delivered effectively to a target), and the VFL 5400 may modulate the convergence amount to achieve a target effective divergence amount at a selected position (e.g., the target distance, a selected nominal distance, etc.).

The bulk crystal, including the beam steering portions, of the beam steering device 5400 may be operated either in the paraelectric, ferroelectric, Kerr effect, or Pockels effect EO operating regions. In certain embodiments, some of the beam steering portions may be operated in one EO operating region, and other ones operated in the other EO operating region. In certain embodiments, as described preceding, the temperature of the VFL 5400 and/or the bulk crystal may affect the amount of steering and/or focal length of the VFL

5400. Accordingly, in certain embodiments, one or more temperatures in the beam steering device 6400 may be detected (e.g., utilizing a sensor, temperature model, and/or other value from which temperature can be determined or inferred), and the voltage values for the VFL 5400 and/or one or more steering portions may be compensated to achieve the desired optical characteristics. In certain embodiments, one or more temperatures in the beam steering device 5400 may be actively (e.g., with thermal contact to a coolant, thermoelectric device, or the like) and/or passively controlled to maintain either target temperatures and/or temperature bounds (e.g., ensuring that the appropriate Kerr effect or Pockels effect is maintained).

Figure 68:
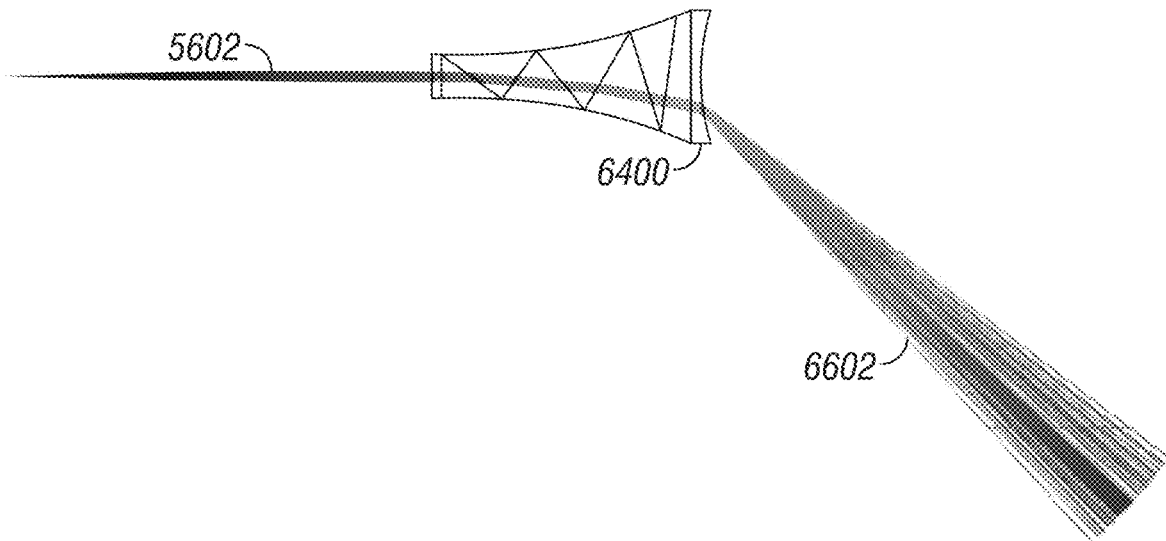
FIG. 68 is a depiction of illustrative performance of a beam steering device utilizing a concave emission surface.
Figure 69:
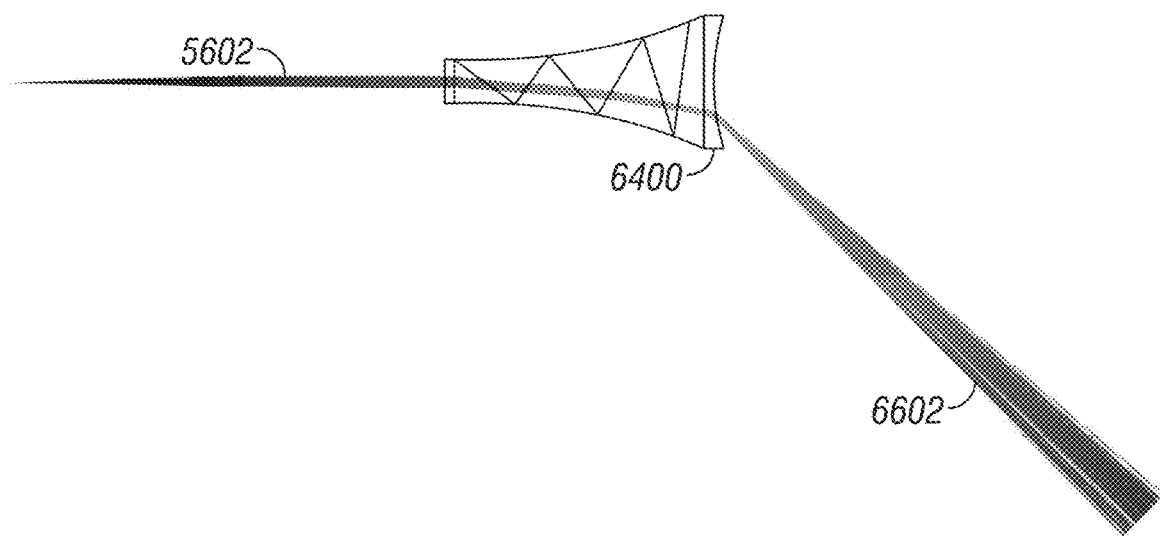
FIG. 69 is a depiction of illustrative performance of the beam steering device utilizing a concave emission surface and a varifocal lens.

Referencing FIGS. 66-69, a number of depictions of illustrative performance of a beam steering device consistent with certain embodiments of the present disclosure are presented. Referencing FIG. 66, an incident EM beam 5602 is steered to about 15 degrees, and a divergence amount of the steered EM beam 6602 is minimal. The embodiment of FIG. 66 is believed, based upon calculations and modeling, to be readily achievable for a beam steering device 6400 having a concave surface 5902 at the emission end, with a VFL 5400 applying a convergence to the EM beam 5602 at the receiving end. Referencing FIG. 67, an incident EM beam 5602 is steered to about 23 degrees, and a divergence amount of the steered EM beam 6602 remains very low. The embodiment of FIG. 67 is believed, based upon calculations and modeling, to be readily achievable for a beam steering device 6400 having a concave surface 5902 at the emission end, with a VFL 5400 applying a convergence to the EM beam 5602 at the receiving end. Referencing FIGS. 68 and 69, an incident EM beam 5602 is steered to about 43 degrees. The embodiment of FIG. 68 depicts a beam steering device 6400 without a VFL 5400, and the embodiment of FIG. 69 depicts a beam steering device 6400 having a VFL 5400. The embodiment of FIG. 69 has a much lower divergence of the steered EM beam 6602 than the embodiment of FIG. 68, but it can be seen that both devices are capable to steer the EM beam 6602 to a very large angle. The embodiments of FIGS. 68 and 69 are believed, based upon calculations and modeling, to be readily achievable for beam steering devices 6400 as described herein.

Figure 73:
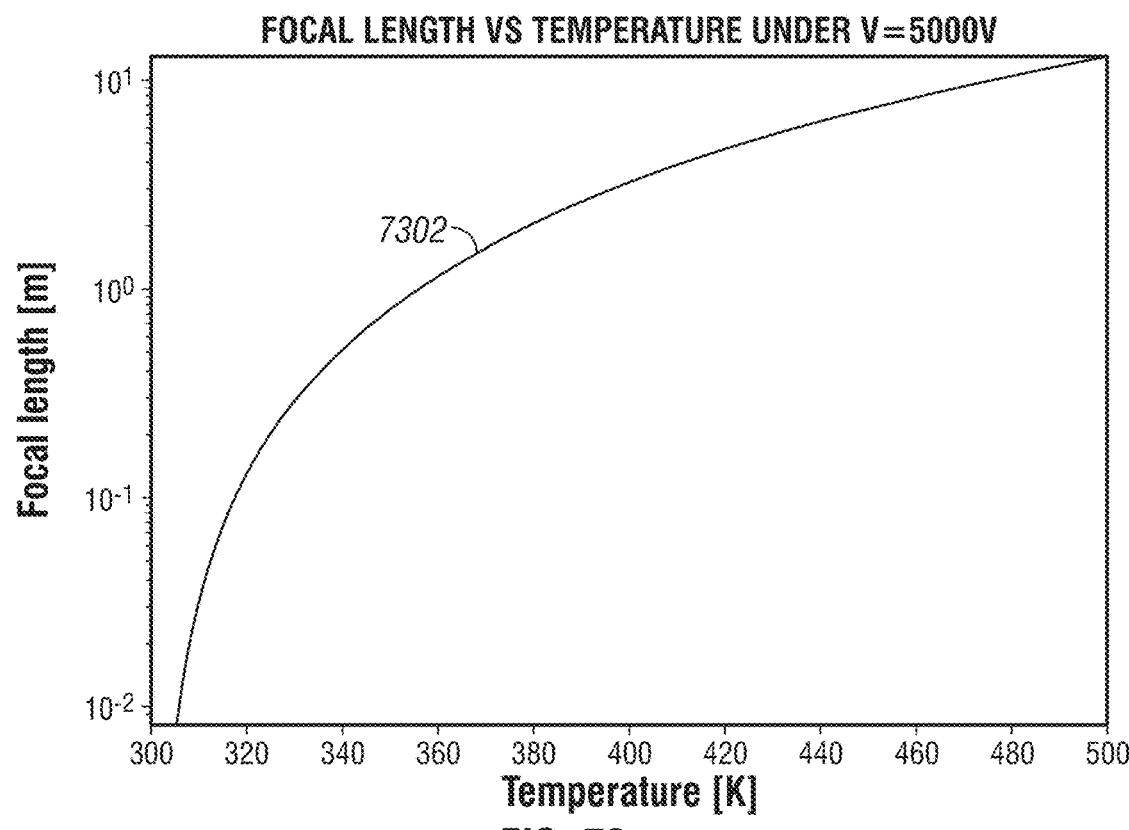
FIG. 73 is a depiction of illustrative design or control characteristics of a varifocal lens.

Referencing FIG. 70 is a depiction of illustrative design or control characteristics of a varifocal lens 5400. The example of FIG. 70 depicts the voltage profile across the VFL 5400 with a −5000V applied to a first one of the high-side electrodes, and a +5000V applied to the second one of the high-side electrodes. It can be seen that the voltage through the VFL 5400 in the example is a linear voltage gradient. Referencing FIG. 71, the relative index change across the VFL 5400 is depicted in the presence of the voltage gradient of FIG. 70 at a selected temperature. The data such as that depicted in FIGS. 70 and 71 is readily available or determinable by one of skill in the art contemplating a particular system and beam steering device 6400, and can be utilized in the design and/or control of the device. At design time, the data such as in FIGS. 70 and 71 can be utilized to select suitable EO materials, sizing, electrical characteristic design (e.g., power source, connections, insulation, etc.). At run time, the data such as in FIGS. 70 and 71 may be available to a controller, and utilized to apply selected voltage gradients, compensate for actual temperatures, and the like. The example of FIG. 72 depicts the VFL 5400 focal length versus applied voltage for a particular VFL 5400, and can similarly be utilized at design time or run-time to configure and/or operate a VFL 5400 for a beam steering device 6400. The example of FIG. 73 depicts the VFL 5400 focal length versus temperature for a particular VFL 5400 at a selected voltage (5000V in the example), and can similarly be utilized at design time or run-time to configure and/or operate a VFL 5400 for a beam steering device 6400. Additionally or alternatively, data for the bulk crystal of the beam steering device 6400 may be utilized to design and/or control the steering portions. Data such as that depicted in FIGS. 70-73 may be available to a controller of the beam steering device 6400 in any format, such as look-up tables and/or models.

Figure 74:
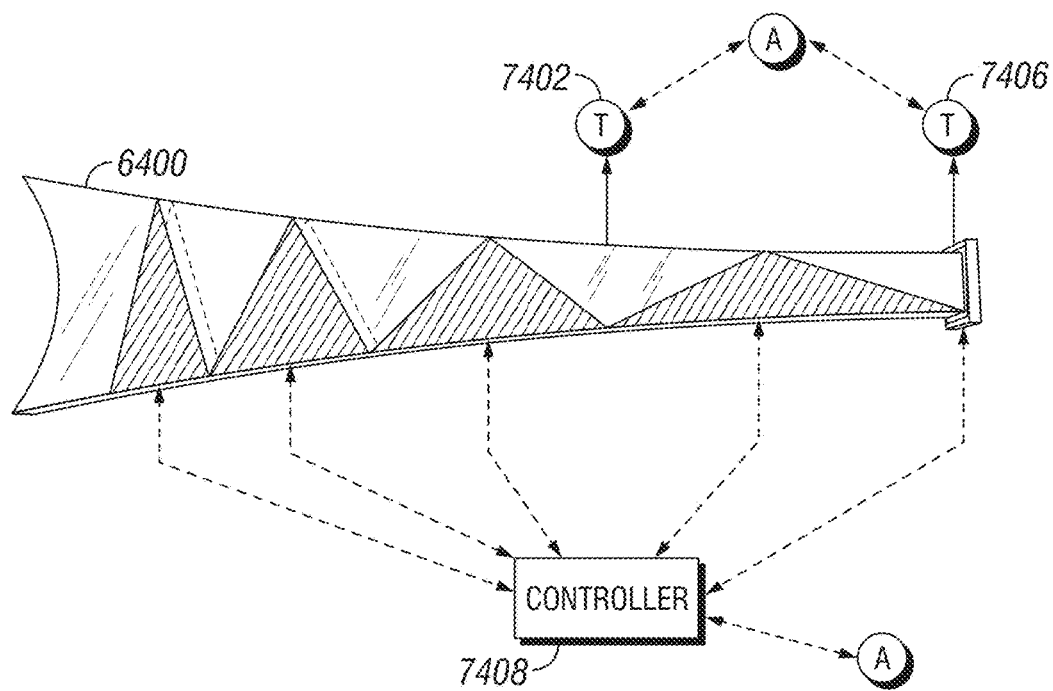
FIG. 74 is a schematic diagram of a system for beam steering including a concave emission surface and a varifocal lens.

Referencing FIG. 74 is a schematic diagram of a system for beam steering including a concave emission surface and a varifocal lens. The example system includes a beam steering device 6400, including a number of steering portions, and which may further include a VFL at an inlet end of the device where an incident EM beam is received for steering. The example system further includes a concave face at an emission end where the steered EM beam is emitted. The example system includes a bulk crystal temperature sensor 7402, which may be any device and/or model (or virtual sensor) that provides a temperature value indicative of a temperature of one or more of the steering portions of the beam steering device 6400. The example system includes a VFL temperature sensor 7406 that provides a temperature value indicative of a temperature of the VFL substrate (bulk crystal portion of the VFL). The example system includes a controller 7408 which is communicatively coupled to one or more aspects of the system, such as sensors, actuators, external communications or control devices, or the like. In certain embodiments, the controller 7408 is configured to control voltages across electrodes of the beam steering portions and/or the VFL, to determine steering requests or commands, to determine characteristics of the incident EM beam to the beam steering device, and the like. Embodiments of the controller 7408 may include aspects of any of the controllers and/or circuits described throughout the present disclosure. The controller 7408 may be positioned on a single device, for example as a processor, memory, and/or computer executable code which, when executed, causes the controller 7408 to perform operations related to the beam steering device 6400. In certain embodiments, aspects of the controller 7408 may be distributed across a number of devices. In certain embodiments, the controller 7408 may communicate with other devices, such as a voltage controller or other actuator, and may control actuators in the system utilizing electrical commands (e.g., applying a voltage to a steering portion), communications (e.g., commanding a voltage controller to apply a voltage to a steering portion), and/or combinations of these.

Figure 75:
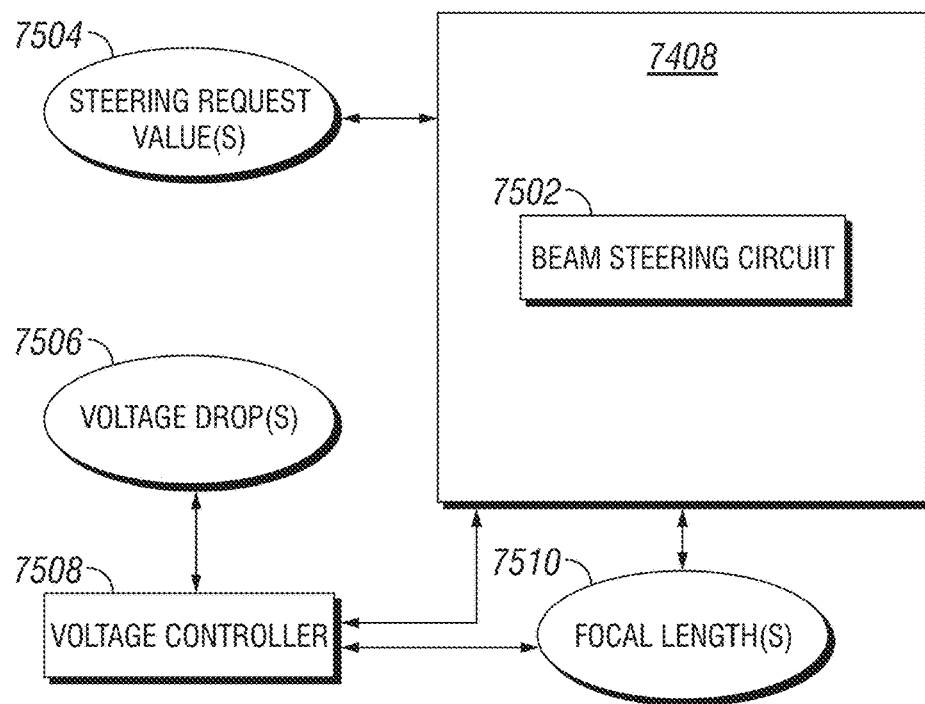
FIG. 75 is a schematic block diagram of a beam steering controller.

Referencing FIG. 75, an example controller 7408 for controlling a beam steering device is depicted. The example controller 7408 includes a beam steering circuit 7502 structured to adjust a voltage drop 7506 across steering portions of a beam steering device. In certain embodiments, the beam steering circuit 7502 determines a steering request value 7504, and adjusts the voltage drop(s) 7506 to implement steering of an incident EM beam in response to the steering request value 7504. In certain embodiments, the beam steering circuit 7502 provides appropriate commands to a voltage controller 7508 to implement the voltage drop(s) 7506, for example by providing voltage commands, index commands, and/or steering amount commands for one or more of the steering portions, to the voltage controller 7508. In certain embodiments, the beam steering circuit 7502 is further structured to adjust a focal length 7510 of a VFL in response to the steering request value 7504. In certain embodiments, the example controller 7408 may operate a beam steering device such as the device(s) depicted in FIG. 32, 56, 57, or 64, and the related descriptions.

Figure 76:
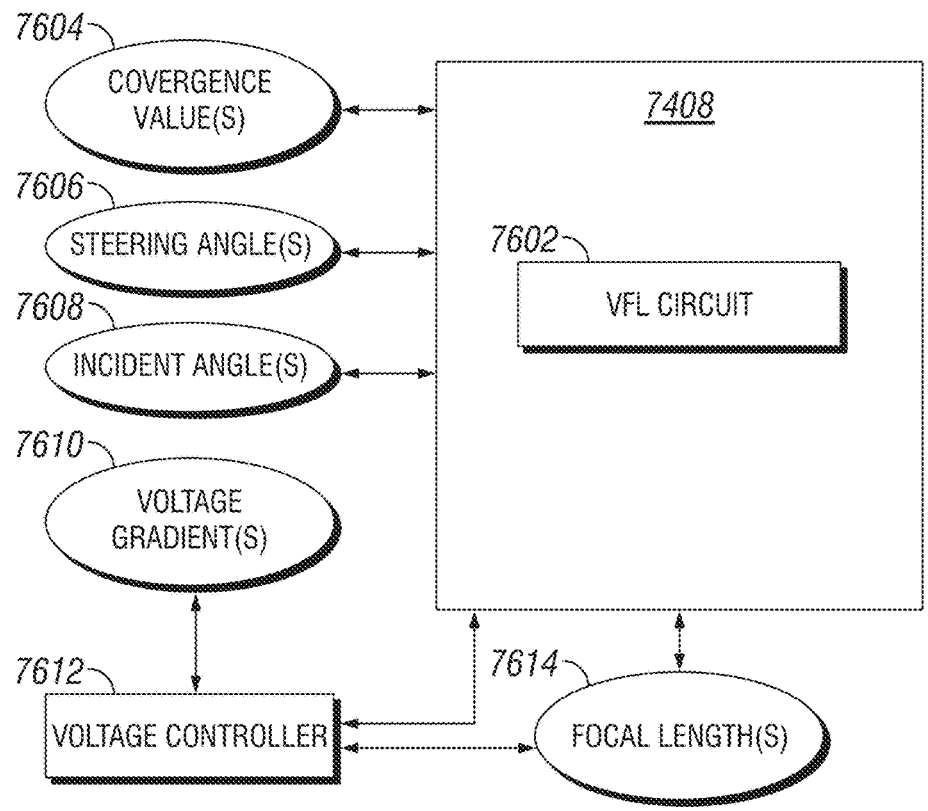
FIG. 76 is a schematic block diagram of a varifocal lens controller.

Referencing FIG. 76, an example controller 7408 for controlling a VFL is depicted. The example controller 7408 includes a VFL circuit 7602 structured to adjust a voltage gradient 7610 across a bulk substrate of a VFL, and thereby operate the bulk substrate as a VFL. In certain embodiments, the VFL circuit 7602 determines a convergence value 7604, for example to compensate for a divergence effect in a system of a beam steering device, and determines the voltage gradient 7610 in response to the convergence value 7604. In certain embodiments, the VFL circuit 7602 determines a focal length 7614 for the VFL, and determines the voltage gradient 7610 in response to the determined focal length 7614. In certain embodiments, the VFL circuit 7602 determines the convergence value 7604 and/or the focal length 7614 in response to a steering angle 7606 (e.g., accounting for divergence from the steering and/or from an emission through a concave face of a beam steering device) and/or in response to an incident angle 7608 of the incident EM beam. In certain embodiments, the VFL circuit 7602 provides the voltage gradient 7610 by providing commands to a voltage controller 7612, for example by providing voltage commands, index commands, and/or focal length commands, to the voltage controller 7612.

Figure 77:
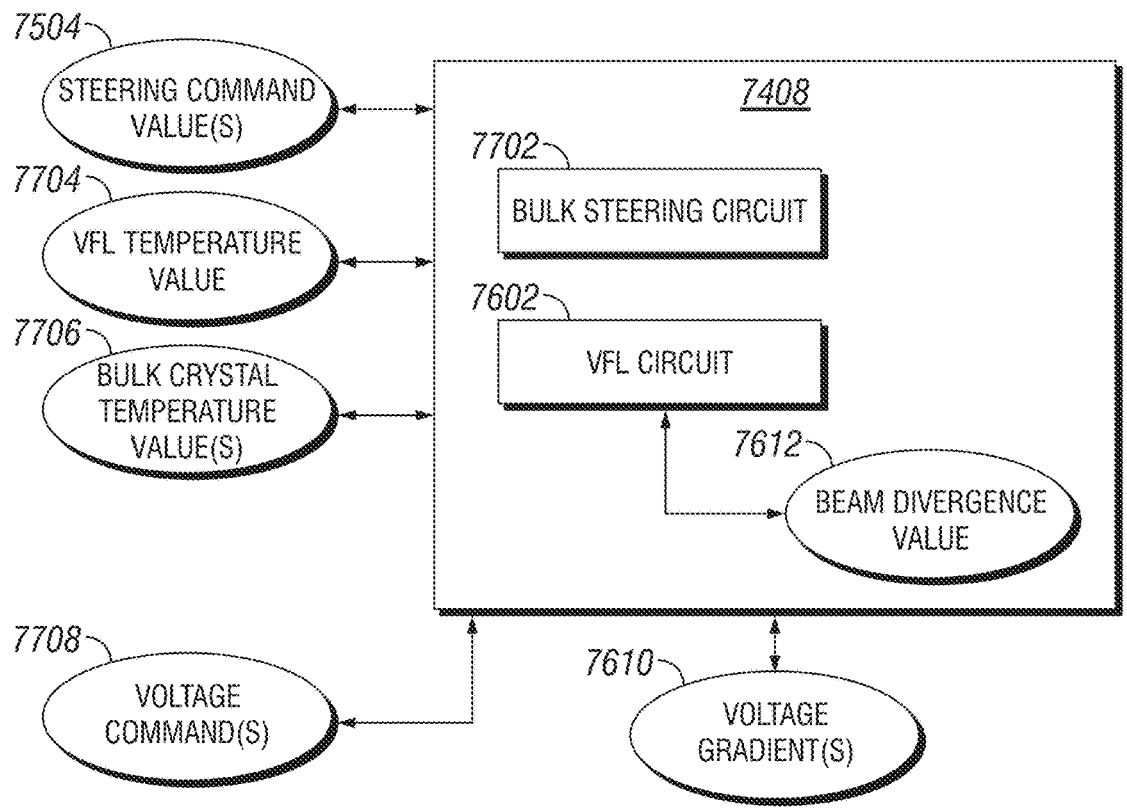
FIG. 77 is a schematic block diagram of a beam steering controller.

Referencing FIG. 77, an example controller 7408 includes a bulk steering circuit 7702 structured to interpret a steering command value 7504 (e.g., a location and/or steering angle for the incident EM beam), and to provide a voltage commands 7708 to high-side electrodes of a beam steering device 6400 in response to the steering command value 7504. For example, the bulk steering circuit 7702 may receive the steering command value 7504, and apply a steering trajectory across the beam steering portions to steer the incident EM beam in accordance with the steering command value 7504. An example bulk steering circuit 7702 further provides low-side voltage commands (e.g., as a part of the voltage commands 7708) to low-side electrodes of the beam steering device—for example where the both the high-side and low-side electrodes are operated at a voltage to provide for the scheduled voltage differential for a given steering portion. In certain embodiments, the high-side electrodes and low-side electrodes may be operated at the same voltage magnitude, with opposite signs, to enhance the voltage differential while minimizing the magnitude of the operating voltages in the beam steering device 6400. In certain embodiments, the low-side electrodes may be operated as ground electrodes, and/or may be operated at a lower, or negative, voltage relative to the high-side electrodes, but not with a same magnitude as the voltage of the high-side electrodes. In certain embodiments, it may be desirable to operate the high-side electrodes at a similar voltage, to progressively steer the beam and to minimize voltage differences between adjacent steering portions, but the high-side electrodes may be operated at any voltage including distinct and/or highly varying voltages. In certain embodiments, steering control may be simplified if only a portion of the available steering portions are activated (e.g., when a small steering angle is being implemented), and accordingly the high-side electrode voltages may be varied.

The example controller 7408 further includes a VFL circuit 7602 structured to provide a voltage gradient 7610 command in response to the steering command value 7504. In certain embodiments, the VFL is responsive to the voltage gradient 7610 command (e.g., in response to a voltage controller applying a voltage in accordance with the voltage gradient 7610 command), thereby applying a lensing effect to the incident EM beam at a selected focal length. The example VFL circuit 7602 may command voltages to the high-side electrodes, and/or command voltages to the low-side electrode. In certain embodiments, the VFL circuit 7602 determines a beam divergence value 7612, for example determined in response to the steering command value 7504, and/or determined in response to a curvature of or divergence incurred by the concave face 5902 of the beam steering device (including potentially at the targeted steering location), and to further provide the voltage gradient 7610 command in response to the beam divergence value 7612. An example VFL circuit 7602 further determines a VFL temperature value 7704, and further determines the voltage gradient 7610 command in response to the VFL temperature value 7704. An example bulk steering circuit 7702 further determines one or more bulk crystal temperature values 7706, and further provides the voltage command(s) 7708 in response to the bulk crystal temperature value(s) 7706. In certain embodiments, the bulk steering circuit 7702 may adjust high-side electrode voltage commands and/or low-side electrode voltage commands in response to the bulk crystal temperature value(s) 7706.

Figure 78:
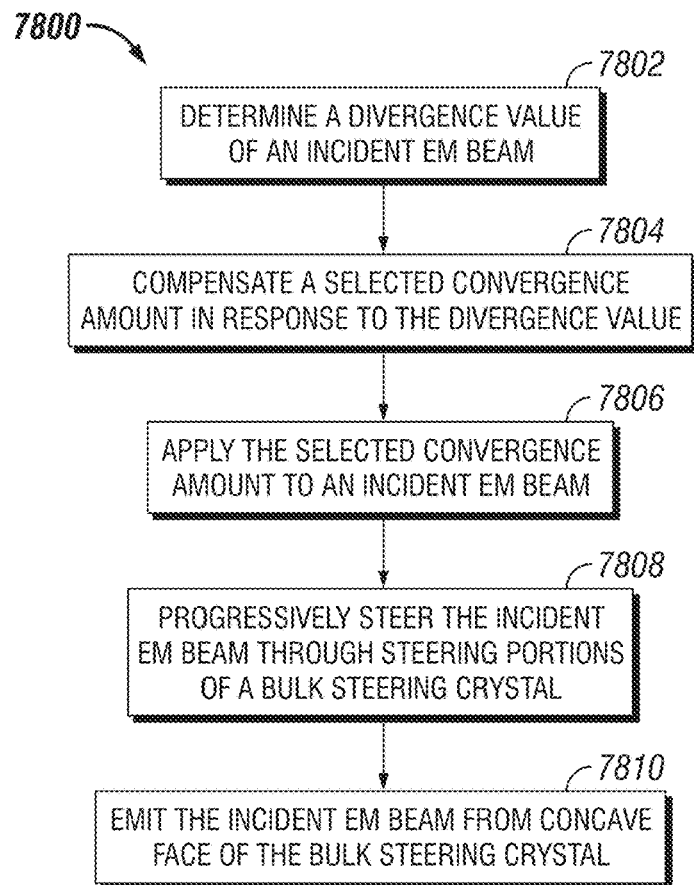
FIG. 78 is a schematic flow diagram of a procedure for beam steering.

Referencing FIG. 78, an example procedure 7800 for steering an incident EM beam is depicted. The example procedure 7800 includes an operation 7802 to determine a divergence value of an incident EM beam (e.g., as emitted from the beam steering device), and an operation 7806 to apply a selected convergence amount to an incident EM beam (e.g., utilizing a VFL). In certain embodiments, the procedure 7800 includes an operation 7804 to compensate the selected convergence amount in response to the divergence value. The example procedure 7800 further includes an operation 7808 to progressively steer the incident EM beam through steering portions of a bulk steering crystal, and an operation 7810 to emit the incident EM beam from a concave face of the bulk steering crystal.

Figure 79:
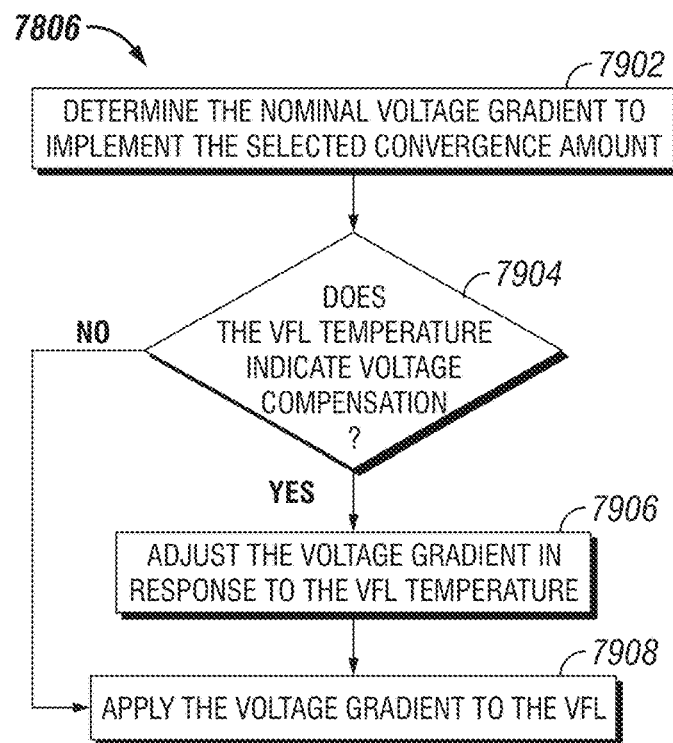
FIG. 79 is a schematic flow diagram of a procedure for applying a selected convergence amount to an incident electromagnetic beam.

Referencing FIG. 79, an example procedure 7806 for operating a VFL to apply a selected convergence amount, and/or to implement a target focal length, is depicted. The example procedure 7806 includes an operation 7902 to determine a nominal voltage gradient to implement a selected convergence amount and/or a target focal length for the VFL. The example procedure 7806 further includes an operation 7904 to determine whether a VFL temperature value indicates that voltage compensation for the VFL is indicated. In response to operation 7904 determining YES, the example procedure 7806 includes an operation 7906 to adjust the voltage gradient in response to a temperature of the VFL, and an operation 7908 to apply the compensated voltage gradient to the VFL. In response to operation 7904 determining NO, the example procedure 7806 includes the operation 7908 to apply the voltage gradient to the VFL.

Figure 80:
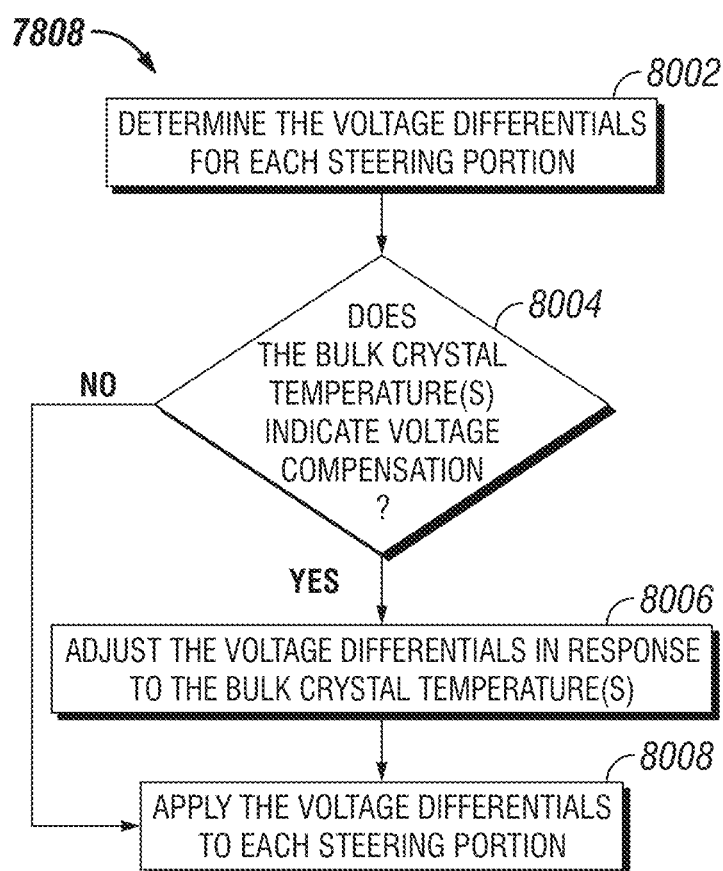
FIG. 80 is a schematic flow diagram of a procedure for progressively steering an incident electromagnetic beam through steering portions of a bulk steering crystal.

Referencing FIG. 80, an example procedure 7808 to apply voltage differential to a number of steering portions of a beam steering device is depicted. The example procedure 7808 includes an operation 8002 to determine voltage differentials for each steering portion of the beam steering device, and an operation 8004 to determine whether bulk crystal temperature(s) indicate that voltage compensation for one or more steering portions should be provided. In response to operation 8004 indicating YES, the procedure 7808 includes an operation 8006 to compensate one or more of the voltage differentials in response to the bulk crystal temperature(s), and an operation 8008 to apply the compensated voltage differentials to each of the steering portions. In response to operation 8004 indicating NO, the procedure

7808 includes an operation 8006 to apply the voltage differentials to each of the steering portions.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another.

The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system, comprising:
    a bulk steering crystal apparatus having:
    a first lens face and a second concave face; and
    a plurality of steering portions interposed between the first lens face and the second concave face, wherein each of the plurality of steering portions comprises:
        a bulk substrate portion comprising an electro-optical material; and
        a corresponding high-side electrode electrically coupled to the corresponding one of the plurality of steering portions,
    wherein the bulk steering portions comprise an increasing width in at least a steered axis.

2. The system of claim 1, wherein each of the corresponding high-side electrodes are positioned on a side of the bulk steering crystal.

3. The system of claim 2, further comprising a low-side electrode positioned on an opposing side of the bulk steering crystal to at least one of the corresponding high-side electrodes.

4. The system of claim 2, wherein each of the corresponding high-side electrodes are positioned on a same side of the bulk steering crystal.

5. The system of claim 4, further comprising a low-side electrode positioned on an opposing side of the bulk steering crystal.

6. The system of claim 5, wherein the low-side electrode is positioned as the low-side electrode for a plurality of the steering portions.

7. The system of claim 5, wherein the low-side electrode is positioned as the low-side electrode for all of the steering portions.

8. The system of claim 1, further comprising a bulk steering circuit structured to interpret a steering command value, and to provide voltage commands to each of the corresponding high-side electrodes in response to the steering command value.

9. The system of claim 8, further comprising:
    a low-side electrode positioned on an opposing side of the bulk steering crystal to at least one of the corresponding high-side electrodes; and
    wherein the bulk steering circuit is further structured to provide a low-side voltage command to the low-side electrode in response to the steering command value.

10. The system of claim 9, wherein the low-side voltage command comprises a negative voltage value, and wherein a corresponding high-side voltage command comprises a positive voltage value.

11. The system of claim 10, wherein the low-side voltage command comprises a same magnitude as the corresponding high-side voltage command.

12. The system of claim 1, further comprising a first portion of the plurality of steering portions configured to steer an incident electromagnetic (EM) beam in a first axis, and a second portion of the plurality of steering portions configured to steer the incident EM beam in a second axis.

13. The system of claim 12, wherein the bulk substrate portions corresponding to the first portion of the plurality of steering portions are oriented in a first direction, and wherein the bulk substrate portions corresponding to the second portion of the plurality of steering portions are oriented in a second direction.

14. The system of claim 13, wherein the bulk substrate portions corresponding to the first portion of the plurality of steering portions are traversed by the incident EM beam before the second portion of the plurality of steering portions.

15. The system of claim 12, wherein the bulk substrate portions corresponding to the first portion of the plurality of steering portions are traversed by the incident EM beam before the second portion of the plurality of steering portions.

16. The system of claim 15, further comprising at least one of an anti-reflective coating or a half-wave plate optically interposed between an interface of at least one of the bulk substrate portions corresponding to the first portion of the plurality of steering portions and at least one of the bulk substrate portions corresponding to the second portion of the plurality of steering portions.

17. The system of claim 12, wherein the concave face comprises at least one shape selected from the shapes consisting of: a spherical cap; an ellipsoid cap; a hyperboloid cap; and an elliptic paraboloid cap.

18. The system of claim 1, wherein the concave face comprises at least one shape selected from the shapes consisting of: a circular cross-section; a parabolic cross-section; a hyperbolic cross-section; and rotations of any one of the foregoing.

19. The system of claim 1, wherein the increasing width is monotonically increasing between the first lens face and the second concave face.

20. The system of claim 1, wherein the bulk substrate portions comprise a solid material.

21. A system, comprising:
a bulk steering crystal apparatus having:
a first lens face and a second concave face;
a plurality of steering portions interposed between the first lens face and the second concave face, wherein a first portion of the plurality of steering portions are configured to steer an incident electromagnetic (EM) beam in a first axis, and a second portion of the plurality of steering portions are configured to steer the incident EM beam in a second axis, wherein each of the plurality of steering portions comprises:
a bulk substrate portion comprising an electro-optical material, wherein the bulk substrate portions corresponding to the first portion of the plurality of steering portions are oriented in a first direction, and wherein the bulk substrate portions corresponding to the second portion of the plurality of steering portions are oriented in a second direction; and
a corresponding high-side electrode electrically coupled to the corresponding one of the plurality of steering portions; and
an anti-reflective coating optically interposed between an interface of at least one of the bulk substrate portions corresponding to the first portion of the plurality of steering portions and at least one of the bulk substrate portions corresponding to the second portion of the plurality of steering portions.

22. A system, comprising:
a bulk steering crystal apparatus having:
a first lens face and a second concave face;
a plurality of steering portions interposed between the first lens face and the second concave face, wherein each of the plurality of steering portions comprises:
a bulk substrate portion comprising an electro-optical material; and
a corresponding high-side electrode electrically coupled to the corresponding one of the plurality of steering portions;
a bulk steering circuit structured to interpret a steering command value, and to provide voltage commands to each of the corresponding high-side electrodes in response to the steering command value;
a varifocal lens (VFL) positioned at the first lens face; and
a VFL circuit structured to provide a voltage gradient command in response to the steering command value.

23. The system of claim 22, wherein the VFL circuit is further structured to determine a beam divergence value in response to the steering command value, and to provide the voltage gradient command further in response to the steering command value.

24. The system of claim 23, wherein the VFL circuit is further structured to determine a VFL temperature value corresponding to the VFL, and to provide the voltage gradient command further in response to the VFL temperature value.

25. The system of claim 22, wherein the VFL comprises:
a VFL substrate comprising an electro-optical material;
a transparent low-side electrode positioned on a first side of the VFL substrate; and
a high-side electrode positioned in electrical proximity to a second side of the VFL substrate.

26. The system of claim 25, wherein the high-side electrode comprises a closed loop electrode positioned on the second side of the VFL substrate.

27. The system of claim 26, wherein the closed loop electrode comprises a symmetrically closed loop.

28. The system of claim 26, wherein the closed loop electrode comprises at least one of a circular electrode or an elliptical electrode.

29. The system of claim 25, wherein the high-side electrode comprises a first high-side electrode positioned along a first edge of a viewing area of the VFL substrate, and a second high-side electrode positioned along a second edge of the viewing area of the VFL substrate.

30. The system of claim 29, wherein the first high-side electrode and the second high-side electrode are positioned outside an optical path of the viewing area of the VFL substrate.

31. The system of claim 29, wherein the first high-side electrode and the second high-side electrode are positioned within an optical path of the viewing area of the VFL substrate.

32. The system of claim 31, wherein the first high-side electrode and the second high-side electrode are transparent.

33. The system of claim 29, wherein the VFL circuit is further structured to provide the voltage gradient command by commanding a first voltage value to the first high-side electrode, and by commanding a second voltage value to the second high-side electrode.

34. The system of claim 33, wherein the first voltage value and the second voltage value have an equal magnitude, and an opposite sign.

35. The system of claim 33, wherein the VFL circuit is further structured to provide the voltage gradient by commanding a third voltage value to the transparent low-side electrode.

36. The system of claim 25, wherein the VFL substrate comprises a solid material.

37. A system, comprising:
a bulk steering crystal apparatus having:
a first lens face and a second concave face;
a plurality of steering portions interposed between the first lens face and the second concave face, wherein each of the plurality of steering portions comprises:
a bulk substrate portion comprising an electro-optical material; and
a corresponding high-side electrode electrically coupled to the corresponding one of the plurality of steering portions;
a bulk steering circuit structured to interpret a steering command value, and to provide voltage commands to each of the corresponding high-side electrodes in response to the steering command value,
wherein the bulk steering circuit is further structured to determine a bulk crystal temperature value corresponding to at least one of the bulk steering portions, and to provide the voltage commands to each of the corresponding high-side electrodes further in response to the bulk crystal temperature value.

38. The system of claim 37, further comprising:

a low-side electrode positioned on an opposing side of the bulk steering crystal corresponding to the at least one of the bulk steering portions; and wherein the bulk steering circuit is further structured to provide a low-side voltage command to the low-side electrode in response to the steering command value and the bulk crystal temperature value.

39. A system, comprising:

a bulk steering crystal apparatus having:

a first lens face and a second concave face;

a plurality of steering portions interposed between the first lens face and the second concave face, wherein a first portion of the plurality of steering portions are configured to steer an incident electromagnetic (EM) beam in a first axis, and a second portion of the plurality of steering portions are configured to steer the incident EM beam in a second axis, wherein each of the plurality of steering portions comprises:

a bulk substrate portion comprising an electro-optical material, wherein the bulk substrate portions corresponding to the first portion of the plurality of steering portions are traversed by the incident EM beam before the second portion of the plurality of steering portions; and a corresponding high-side electrode electrically coupled to the corresponding one of the plurality of steering portions; and at least one of an anti-reflective coating or a half-wave plate optically interposed between an interface of at least one of the bulk substrate portions corresponding to the first portion of the plurality of steering portions and at least one of the bulk substrate portions corresponding to the second portion of the plurality of steering portions.

* * * * *

UNITED STATES PATENT AND TRADEMARK OFFICE
CERTIFICATE OF CORRECTION

PATENT NO. : 10,989,982 B2  
APPLICATION NO. : 16/916731  
DATED : April 27, 2021  
INVENTOR(S) : Abtin Ataei et al.

Page 1 of 2

It is certified that error appears in the above-identified patent and that said Letters Patent is hereby corrected as shown below:

In the Drawings

On sheet 30 of 32, in Figure 76, reference numeral 7604, Line 1, delete "COVERGENCE" and insert -- CONVERGENCE --, therefor.

In the Specification

In Column 10, Line 16, delete "2nπ" and insert -- 2πn --, therefor.

In Columns 10-11, Lines 59-67 (Column 10) and 1-3 (Column 11), delete "Additionally, each phase delay progression stage 102 may be distinct from one or more of the other phase delay progression stages 102, for example where a first stage 102 provides a 2π phase shift, and where a second stage 102 provides a 4π phase shift (e.g., utilizing twice the distance along the position axis, thereby providing the designed unfolded phase profile 104). Additionally or alternatively, phase delay progression stages 102 need not be in the same plane—for example where the incident EM beam encounters one of the phase delay progression stages 102 on a first plane, and a second one of the phase delay progression stages 102 on a second plane (e.g., reference FIG. 12)." and insert the same on Column 10, Line 58 as a continuation of same paragraph.

In Column 21, Line 56, delete "or and" and insert -- and/or --, therefor.

In Column 22, Line 17, delete "SrTiO3" and insert -- $SrTiO_3$ --, therefor.

In Column 27, Line 10, delete "No" and insert -- No. --, therefor.

In Column 39, Line 38, delete "modulated" and insert -- modulation --, therefor.

In Column 44, Line 47, delete "of the of" and insert -- of the --, therefor.

In Column 47, Line 14, delete "of the of" and insert -- of the --, therefor.  
In Column 49, Line 26, delete "0X," and insert -- 10λ, --, therefor.

Signed and Sealed this  
Twenty-third Day of May, 2023

Katherine Kelly Vidal  
*Director of the United States Patent and Trademark Office*

CERTIFICATE OF CORRECTION (continued)
U.S. Pat. No. 10,989,982 B2

In Column 61, Line 46, delete "of the of" and insert -- of the --, therefor.

In Column 62, Line 11, delete "of the of" and insert -- of the --, therefor.

In Column 74, Line 5, delete "FIG." and insert -- FIGS. --, therefor.

In Column 83, Line 20, delete "+/–30" and insert -- +/–30° --, therefor.

In Column 85, Line 25, delete "$V_o$" and insert -- $V_0$ --, therefor.

In Column 85, Line 41, delete "$V_o$" and insert -- $V_0$ --, therefor.

In Column 86, Line 19, delete "PMNPT." and insert -- PMN-PT. --, therefor.

In Column 86, Line 23, delete "$V_o$" and insert -- $V_0$ --, therefor.